(12) United States Patent
Kuriki et al.

(10) Patent No.: US 11,955,612 B2
(45) Date of Patent: Apr. 9, 2024

(54) NEURAL NETWORK, POWER STORAGE SYSTEM, VEHICLE, AND ELECTRONIC DEVICE

(71) Applicant: SEMICONDUCTOR ENERGY LABORATORY CO., LTD., Atsugi (JP)

(72) Inventors: Kazutaka Kuriki, Kanagawa (JP); Ryota Tajima, Kanagawa (JP); Kouhei Toyotaka, Kanagawa (JP); Hideaki Shishido, Kanagawa (JP); Toshiyuki Isa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 18/093,833

(22) Filed: Jan. 6, 2023

(65) Prior Publication Data

US 2023/0155199 A1 May 18, 2023

Related U.S. Application Data

(63) Continuation of application No. 16/603,487, filed as application No. PCT/IB2018/052744 on Apr. 20, 2018, now Pat. No. 11,594,770.

(30) Foreign Application Priority Data

May 3, 2017 (JP) .................................. 2017-092024
Jun. 26, 2017 (JP) .................................. 2017-124077
Aug. 4, 2017 (JP) .................................. 2017-151306

(51) Int. Cl.
*H01M 10/48* (2006.01)
*G06N 3/04* (2023.01)
(Continued)

(52) U.S. Cl.
CPC ............ *H01M 10/482* (2013.01); *G06N 3/04* (2013.01); *G06N 3/065* (2023.01);
(Continued)

(58) Field of Classification Search
USPC .......................... 320/106, 107, 108, 109, 110
See application file for complete search history.

(56) References Cited

U.S. PATENT DOCUMENTS 6,064,180 A    5/2000  Sullivan et al.
6,757,591 B2   6/2004  Kramer
(Continued)

FOREIGN PATENT DOCUMENTS

CN    001753240 A    3/2006
CN    101087074 A    12/2007
(Continued)

OTHER PUBLICATIONS

International Search Report (Application No. PCT/IB2018/052744) dated May 29, 2018.
(Continued)

*Primary Examiner* — Brian Ngo
(74) *Attorney, Agent, or Firm* — NIXON PEABODY LLP; Jeffrey L. Costellia

(57) ABSTRACT

A power storage system with excellent characteristics is provided. A power storage system with a high degree of safety is provided. A power storage system with less deterioration is provided. A storage battery with excellent characteristics is provided. The power storage system includes a neural network and a storage battery. The neural network includes an input layer, an output layer, and one or more hidden layers between the input layer and the output layer. The predetermined hidden layer is connected to the previous hidden layer or the previous input layer by a predetermined weight coefficient, and connected to the next hidden layer or
(Continued)

the next output layer by a predetermined weight coefficient. In the storage battery, voltage and time at which the voltage is obtained are measured as one of sets of data. The sets of data measured at different times are input to the input layer and the operational condition of the storage battery is changed in accordance with a signal output from the output layer.

10 Claims, 36 Drawing Sheets

(51) Int. Cl.
    *G06N 3/065*           (2023.01)
    *H01M 10/44*          (2006.01)
    *H02J 7/00*            (2006.01)

(52) U.S. Cl.
    CPC ....... *H01M 10/441* (2013.01); *H01M 10/486* (2013.01); *H02J 7/0013* (2013.01); *H02J 7/0047* (2013.01); *H02J 7/007* (2013.01)

(56) References Cited

U.S. PATENT DOCUMENTS

| | | | |
|---|---|---|---|
| 8,132,026 | B2 | 3/2012 | Koyama |
| 8,306,781 | B2 | 11/2012 | Xu et al. |
| 8,482,262 | B2 | 7/2013 | Takami et al. |
| 9,553,465 | B2 | 1/2017 | Raghavan et al. |
| 10,205,333 | B2 | 2/2019 | Morikawa et al. |
| 10,554,064 | B2 | 2/2020 | Morikawa et al. |
| 2002/0113593 | A1 | 8/2002 | Meissner et al. |
| 2004/0207367 | A1 | 10/2004 | Taniguchi et al. |
| 2004/0267408 | A1 | 12/2004 | Kramer |
| 2006/0068272 | A1 | 3/2006 | Takami et al. |
| 2006/0181245 | A1 | 8/2006 | Mizuno et al. |
| 2008/0234956 | A1 | 9/2008 | Mizuno et al. |
| 2013/0278221 | A1 | 10/2013 | Maeda |
| 2016/0003912 | A1 | 1/2016 | Iwane et al. |
| 2016/0343452 | A1 | 11/2016 | Ikeda et al. |
| 2017/0023649 | A1 | 1/2017 | You et al. |
| 2017/0031404 | A1 | 2/2017 | Yamamoto et al. |

FOREIGN PATENT DOCUMENTS

| | | | | |
|---|---|---|---|---|
| CN | 102324582 | A | | 1/2012 |
| CN | 102738525 | A | | 10/2012 |
| CN | 103941191 | A | * | 7/2014 |
| CN | 103941191 | A | | 7/2014 |
| CN | 105680109 | A | | 6/2016 |
| CN | 105932762 | A | | 9/2016 |
| CN | 106796267 | A | | 5/2017 |
| EP | 1469321 | A | | 10/2004 |
| EP | 1702219 | B | | 5/2012 |
| EP | 1702219 | B1 | * | 5/2012 ............. B60L 58/12 |
| EP | 2937928 | A | | 10/2015 |
| EP | 3168954 | A | | 5/2017 |
| JP | 04-172574 | A | | 6/1992 |
| JP | 2000-329834 | A | | 11/2000 |
| JP | 2003-249271 | A | | 9/2003 |
| JP | 2004-333472 | A | | 11/2004 |
| JP | 2007-240521 | A | | 9/2007 |
| JP | 2008-232758 | A | | 10/2008 |
| JP | 2010-519691 | | | 6/2010 |
| JP | 2012-029451 | A | | 2/2012 |
| JP | 2013-219996 | A | | 10/2013 |
| JP | 2015-207555 | A | | 11/2015 |
| JP | 2016-090346 | A | | 5/2016 |
| JP | 2016-219011 | A | | 12/2016 |
| JP | 2017-060373 | A | | 3/2017 |
| KR | 2016-0000317 | A | | 1/2016 |
| KR | 2016-0048667 | A | | 5/2016 |
| KR | 2017-0035825 | A | | 3/2017 |
| TW | 539932 | | | 7/2003 |
| WO | WO-2002/015365 | | | 2/2002 |
| WO | WO-2012/091076 | | | 7/2012 |
| WO | WO-2014/141796 | | | 9/2014 |
| WO | WO-2016/006462 | | | 1/2016 |
| WO | WO-2017/022037 | | | 2/2017 |

OTHER PUBLICATIONS

Written Opinion (Application No. PCT/IB2018/052744) dated May 29, 2018.
Taiwanese Office Action (Application No. 107114571) dated Jan. 25, 2022.
Zhao.Q, "Impairment grade foreshadowing for valve regulated lead acid battery based on fuzzy neural network", Chinese Journal of Power Sources, Dec. 1, 2006, vol. 30, No. 12, pp. 1009-1012.
Chinese Office Action (Application No. 201880025241.8) dated Sep. 27, 2022.
Speech Signal Processing, Jul. 1, 2009, p. 270.
Chinese Office Action (Application No. 201880025241.8) dated Dec. 18, 2023.

* cited by examiner

FIG. 17A
FIG. 17B
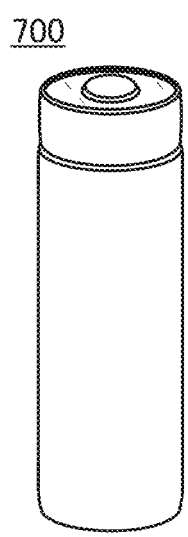
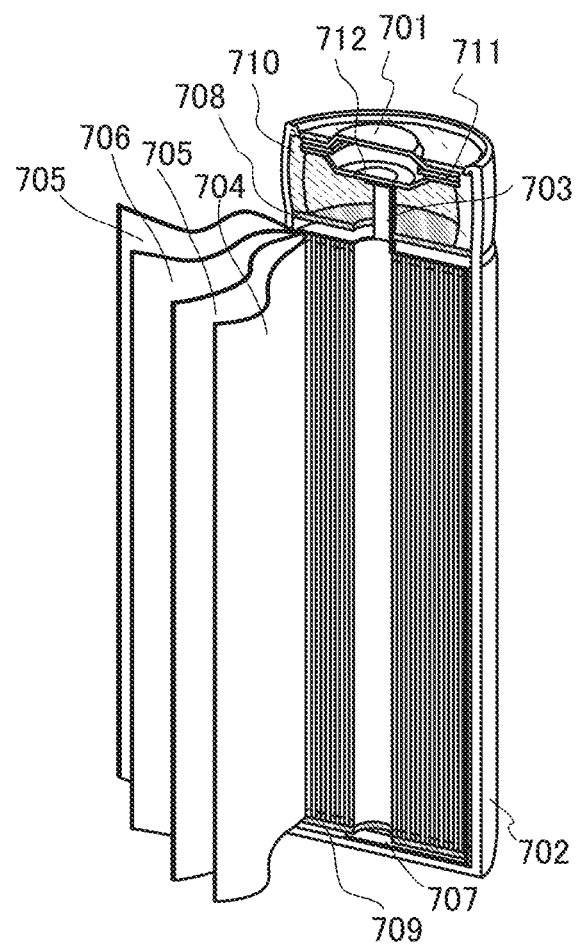

NEURAL NETWORK, POWER STORAGE SYSTEM, VEHICLE, AND ELECTRONIC DEVICE

TECHNICAL FIELD

One embodiment of the present invention relates to a storage battery and a power storage system using the storage battery. Another embodiment of the present invention relates to a vehicle using a storage battery. Another embodiment of the present invention relates to an electronic device using a storage battery.

Furthermore, one embodiment of the present invention relates to a semiconductor device.

Another embodiment of the present invention relates to a neural network and a power storage system using the neural network. Another embodiment of the present invention relates to a vehicle using a neural network. Another embodiment of the present invention relates to an electronic device using a neural network. Another embodiment of the present invention relates to a control system using a neural network.

In this specification and the like, a semiconductor device generally means a device that can function by utilizing semiconductor characteristics. A display device, a light-emitting device, a memory device, an electro-optical device, a power storage device, a semiconductor circuit, and an electronic device each may include a semiconductor device.

One embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter.

BACKGROUND ART

In recent years, machine learning techniques using an artificial neural network (hereinafter referred to as neural network) or the like have been actively developed.

Patent Document 1 discloses an example where a neural network is used for arithmetic operation of remaining capacity of a storage battery.

In recent years, transistors including oxide semiconductors or metal oxides in their channel formation regions (oxide semiconductor transistors, hereinafter referred to as OS transistors) have attracted attention. The off-state current of an OS transistor is extremely low. Applications that employ OS transistors to utilize their low off-state currents have been proposed. For example, Patent Document 2 discloses an example where an OS transistor is used for learning in a neural network.

PATENT DOCUMENTS

[Patent Document 1] United States Published Patent Application No. 2006/0181245
[Patent Document 2] Japanese Published Patent Application No. 2016-219011

DISCLOSURE OF INVENTION

An object of one embodiment of the present invention is to provide a power storage system with excellent characteristics. Another object of one embodiment of the present invention is to provide a power storage system with a high degree of safety. Another object of one embodiment of the present invention is to provide a power storage system with less deterioration.

Another object of one embodiment of the present invention is to provide a storage battery with excellent characteristics. Another object of one embodiment of the present invention is to provide a storage battery with a high degree of safety. Another object of one embodiment of the present invention is to provide a storage battery with less deterioration. Another object of one embodiment of the present invention is to provide an electronic device provided with a power storage system with excellent characteristics. Another object of one embodiment of the present invention is to provide a vehicle provided with a power storage system with excellent characteristics. Another object of one embodiment of the present invention is to provide a novel semiconductor device.

Note that the description of a plurality of objects does not mutually preclude the existence. One embodiment of the present invention does not necessarily achieve all the objects. Objects other than those listed above are apparent from the description of the specification, drawings, and claims, and also such objects could be an object of one embodiment of the present invention.

One embodiment of the present invention is a power storage system including a neural network and a storage battery. The neural network includes an input layer, an output layer, and one or more hidden layers between the input layer and the output layer. The predetermined hidden layer is connected to the previous hidden layer or the previous input layer by a predetermined weight coefficient, and the predetermined hidden layer is connected to the next hidden layer or the next output layer by a predetermined weight coefficient. In the storage battery, a voltage of the storage battery and time at which the voltage is obtained are measured as one of sets of data. The sets of data measured at different times are input to the input layer. An operational condition of the storage battery is determined in accordance with a signal output from the output layer.

In the above structure, it is preferable that the set of data be measured in the storage battery in a period for charging the storage battery, and when a first signal is output from an output layer, the operation of the storage battery be stopped.

In the above structure, it is also preferable that the set of data be measured in the storage battery in a period for charging the storage battery, and charging of the storage battery be stopped when the first signal is output from the output layer, and charging be continued when the second signal is output from the output layer.

Another embodiment of the present invention is a power storage system including a neural network and n storage batteries (n is an integer greater than or equal to 2). The neural network includes an input layer, an output layer, and one or more hidden layers between the input layer and the output layer. The predetermined hidden layer is connected to the previous hidden layer or the previous input layer by a predetermined weight coefficient, and the predetermined hidden layer is connected to the next hidden layer or the next output layer by a predetermined coefficient. In the n storage batteries, the first to (n−1)-th storage batteries are electrically connected in series. A set of data measured in each of the first to (n−1)-th storage batteries is supplied to the input layer. The set of data of a voltage and time at which the voltage is obtained is measured in each of the first to (n−1)-th storage batteries. Operation of the first storage battery is stopped in accordance with a signal output from the output layer, and the first storage battery is replaced with the n-th storage battery. The n-th storage battery is electrically connected to the second to (n−1)-th storage battery in series.

In the above structures, it is preferable that: the neural network include the first circuit; the first circuit have a function of performing a product-sum operation; the first circuit include the first transistor, a capacitor, and the second transistor; one of a source and a drain of the first transistor be electrically connected to one electrode of the capacitor and a gate of the second transistor; the first transistor include a metal oxide in its channel formation region; the metal oxide contain indium and an element M; the element M is one or more elements selected from aluminum, gallium, tin, boron, silicon, titanium, iron, nickel, germanium, yttrium, zirconium, molybdenum, lanthanum, cerium, neodymium, hafnium, tantalum, and tungsten; and a potential corresponding to analog data be retained in one of the source and the drain of the first transistor.

In the above structures, the second transistor preferably contains silicon in its channel formation region. Alternatively, the second transistor preferably contains the second metal oxide in its channel formation region. The second metal oxide preferably contains indium and an element M2, and the element M2 is preferably one or more elements selected from aluminum, gallium, tin, boron, silicon, titanium, iron, nickel, germanium, yttrium, zirconium, molybdenum, lanthanum, cerium, neodymium, hafnium, tantalum, and tungsten.

Another embodiment of the present invention is a power storage system including a storage battery and the first circuit. A voltage of the storage battery and time at which the voltage is obtained are measured as one of sets of data. The set of data is measured in the storage battery in a period for charging the storage battery. The sets of data measured at different times are input to the first circuit. The first circuit changes the operational condition of the storage battery in accordance with the set of data.

Another embodiment of the present invention is a vehicle including the power storage system described in any of the above.

Another embodiment of the present invention is an electronic device including the power storage system described in any of the above.

Another embodiment of the present invention is a neural network including an input layer, an output layer, one or more hidden layers between the input layer and the output layer, and the first circuit. The predetermined hidden layer is connected to the previous hidden layer or the previous input layer by a predetermined weight coefficient, and the predetermined hidden layer is connected to the next hidden layer or the next output layer by a predetermined weight coefficient. The first value and time at which the first value is obtained are measured as one of sets of data. The sets of data measured at different times are supplied to the input layer. The second value depending on the set of data supplied to the input layer is output from the output layer. The first circuit has a function of performing a product-sum operation. The first circuit includes the first transistor, a capacitor, and the second transistor. One of a source and a drain of the first transistor is electrically connected to one electrode of the capacitor and a gate of the second transistor. The first transistor includes a metal oxide in its channel formation region. The metal oxide contains indium and an element M. The element M is one or more elements selected from aluminum, gallium, tin, boron, silicon, titanium, iron, nickel, germanium, yttrium, zirconium, molybdenum, lanthanum, cerium, neodymium, hafnium, tantalum, and tungsten. A potential corresponding to analog data is retained in one of the source and the drain of the first transistor.

According to one embodiment of the present invention, a power storage system with excellent characteristics can be provided. According to another embodiment of the present invention, a power storage system with a high degree of safety can be provided. According to another embodiment of the present invention, a power storage system with less deterioration can be provided.

According to another embodiment of the present invention, a storage battery with excellent characteristics can be provided. According to another embodiment of the present invention, a storage battery with a high degree of safety can be provided. According to another embodiment of the present invention, a storage battery with less deterioration can be provided. According to another embodiment of the present invention, an electronic device provided with a power storage system with excellent characteristics can be provided. According to another embodiment of the present invention, a vehicle provided with a power storage system with excellent characteristics can be provided. According to another embodiment of the present invention, a novel semiconductor device can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIGS. 17A and 17B are perspective views illustrating an example of a secondary battery;

BEST MODE FOR CARRYING OUT THE INVENTION

Figure 1A:
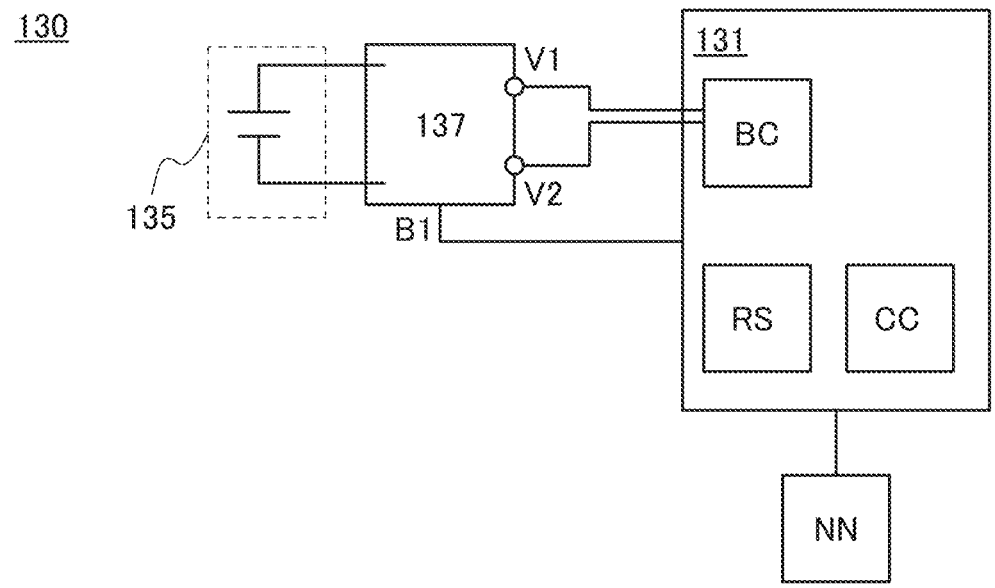
FIGS. 1A and 1B each illustrate an example of a power storage system.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, the size, the layer thickness, or the region is not limited to the illustrated scale. Note that the drawings are schematic views showing ideal examples, and embodiments of the present invention are not limited to shapes or values shown in the drawings.

Furthermore, in the present specification, any of the embodiments described below can be combined as appropriate. In addition, in the case where a plurality of structure examples are described in one embodiment, some of the structure examples can be combined as appropriate.

In this specification, the neural network indicates a general model having the capability of solving problems, which is modeled on a biological neural network and determines the connection strength of neurons by the learning. The neural network includes an input layer, a middle layer (also referred to as hidden layer), and an output layer.

In the description of the neural network in this specification, to determine a connection strength of neurons (also referred to as weight coefficient) from the existing data is called "leaning" in some cases.

In this specification, to form a neural network using the connection strength obtained by the learning, to lead to a new conclusion, is called "inference" in some cases.

A system using the neural network of one embodiment of the present invention can be achieved, for example, with a circuit using a transistor including an oxide semiconductor or a metal oxide in its channel formation region.

In addition, a system using the neural network of one embodiment of the present invention can be formed using software and hardware. As a memory of the hardware, a memory provided with a transistor including an oxide semiconductor or a metal oxide in its channel formation region or a well-known memory may be used. For the operating system of software, a variety of operating systems such as Windows (registered trademark), UNIX (registered trademark), and macOS (registered trademark) can be used. A variety of programing languages such as Python (registered trademark), Go, Perl, Ruby, Prolog, Visual Basic (registered trademark), C, C++, Swift, Java (registered trademark), and NET can be used for the software application. The application may be formed using a framework such as Chainer (registered trademark) (it can be used with Python), Caffe (it can be used with Python and C++), and TensorFlow (it can be used with C, C++, and Python).

In embodiments described in this specification, a dedicated computer or a general-purpose computer including a variety of pieces of computer hardware or software is used. A computer-readable recording medium can be mounted on the embodiments described in this specification. Examples of the recording medium may include a RAM, a ROM, an optical disk, a magnetic disk, and other appropriate storage media that can be accessed by a computer. Software or a combination of hardware and software can be executed by algorithms, components, flows, programs, and the like shown as examples in embodiments described in this specification.

Embodiment 1

In this embodiment, an example where parameters of a storage battery are input to a neural network and the state of the storage battery is analyzed will be described.

As the storage battery of one embodiment of the present invention, a secondary battery is preferably used, for example. Examples of the secondary battery include a secondary battery that utilizes an electrochemical reaction, such as a lithium ion battery, an electrochemical capacitor such as an electric double-layer capacitor or a redox capacitor, an air battery, and a fuel battery.

As a positive electrode material of the secondary battery, for example, a material including an element A, an element X, and oxygen can be used. The element A is preferably one or more elements selected from elements belonging to Group 1 and elements belonging to Group 2. Examples of the elements belonging to Group 1 include alkali metals such as lithium, sodium, and potassium. Examples of the elements belonging to Group 2 include calcium, beryllium, and magnesium. Examples of the element X include one or more elements selected from metal elements, silicon, and phosphorus. The element X is preferably one or more elements selected from cobalt, nickel, manganese, iron, and vanadium.

Stable operation of a storage battery is required for the safe use of equipment provided with the storage battery, for example, a vehicle, an electronic device, and the like.

Inside the storage battery, a phenomenon which reduces the safety of the storage battery might occur in addition to reversible reactions of charging and discharging. Examples of the phenomenon include a side reaction such as decomposition of an electrolytic solution, deposition of a metal on a surface of an electrode, and the like. These phenomena reduce not only the capacity of the storage battery but also the safety of the storage battery in some cases.

An example of the phenomenon that reduces the safety of the storage battery will be described in more detail below. When a short circuit (also referred to as a short) occurs between a positive electrode and a negative electrode in the storage battery, electrolytic solution is significantly decomposed and a gas is generated, or the temperature of the storage battery rises and decomposition reaction of the electrode material is caused, in some cases. These phenomena reduce the safety of the storage battery in some cases. For example, in a lithium ion battery, a lithium metal may be deposited on the negative electrode, which causes a short circuit in some cases.

In a power storage system of one embodiment of the present invention, parameters such as voltage and current are measured in the process of charging and discharging of the storage battery to analyze the state of the storage battery, and the operational condition of the storage battery is determined in accordance with its state. More specifically, charge and discharge curves are analyzed. Here, the charge curve indicates, for example, a temporal shift in voltage or capacity in the process of charging. Similarly, the discharge curve indicates, for example, a temporal shift in voltage or capacity in the process of discharging.

With the use of the power storage system of one embodiment of the present invention, for example, a phenomenon that reduces the safety of the storage battery can be detected or predicted, and the operational condition can be changed in accordance with the detection or the prediction; thus, the safety of the storage battery can be ensured. The power storage system according to one embodiment of the present invention can reduce deterioration of the storage battery. Thus, decrease in the capacity of the storage battery can be inhibited in some cases. The power storage system according to one embodiment of the present invention can inhibit decrease in the capacity with increasing number of charge and discharge cycles in some cases. The power storage system according to one embodiment of the present invention can suppress a temperature rise in the storage battery in some cases. Thus, the lifetime of the storage battery can be lengthened in some cases.

Improving the safety of a storage battery, which is mounted on a device to be worn by a user, a vehicle driven by a user, or the like, enables the safe use by the user. Furthermore, by inhibiting decrease in the capacity of the storage battery, it is possible to reduce replacement frequency or eliminate the necessity for replacement of the storage battery in the device or the like; thus, convenience can be improved and cost can be reduced. In addition, by inhibiting decrease in the capacity of the storage battery, the operating time of a device or the like provided with the storage battery can be lengthened. For example, the mileage of a vehicle can be increased. Increasing the operating time reduces charging frequency and thus reduces the amount of consumed electricity, so that damage on environment can be reduced.

FIG. 1A illustrates an example of the power storage system 130 corresponding to the power storage system of one embodiment of the present invention. The power storage system 130 in FIG. 1A includes a storage battery 135, a protection circuit 137 which is electrically connected to the storage battery 135, a control circuit 131 which is electrically connected to the storage battery 135 through the protection circuit 137 and controls the operation of the storage battery 135, and a neural network NN which is electrically connected to the control circuit 131 and supplied with parameters from the storage battery 135 through the control circuit 131. The control circuit 131 controls the operation of the storage battery 135 through the protection circuit 137, for example. Output from the neural network NN is supplied to the control circuit 131, and the operational condition of the storage battery 135 is determined in accordance with the output result. The control circuit 131 preferably includes a resistor RS, a coulomb counter CC, and a circuit BC. The circuit BC has a function of controlling the operation of the storage battery, for example.

Figure 1B:
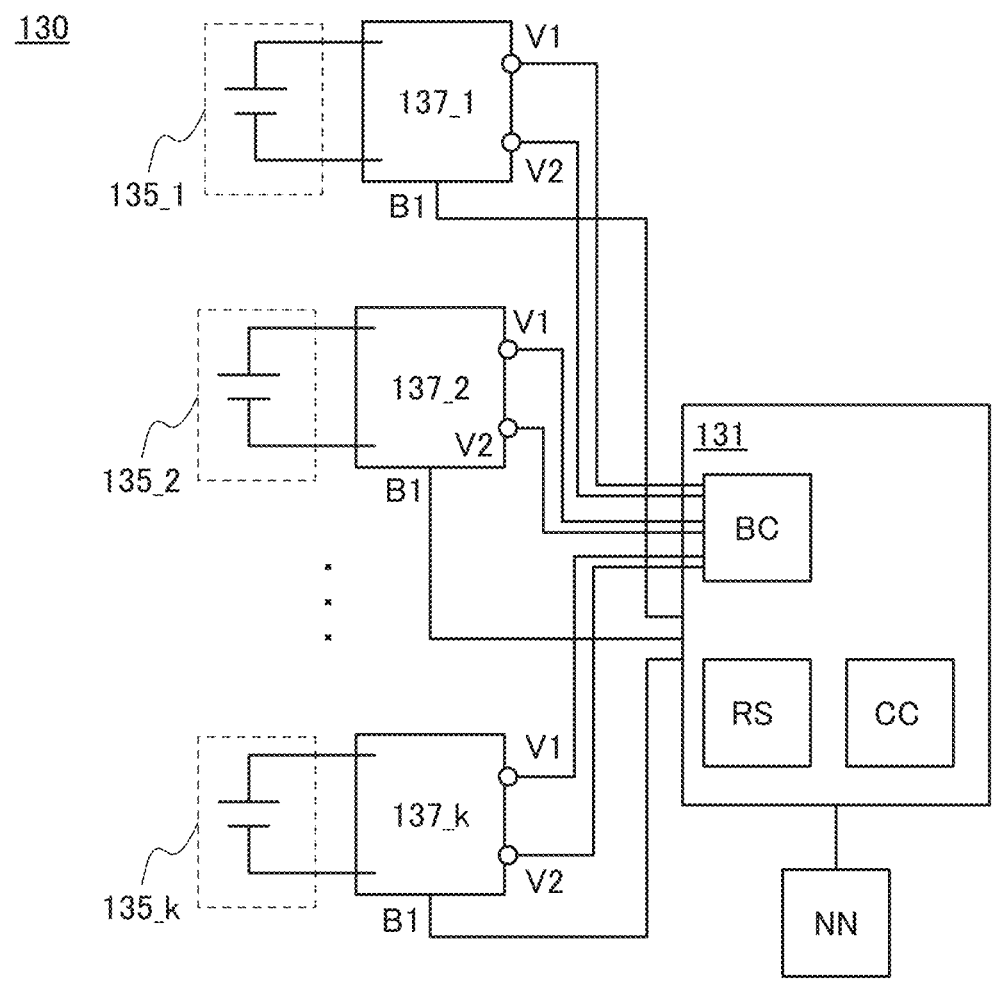

As illustrated in FIG. 1B, the power storage system 130 may include a plurality of storage batteries. The power storage system in FIG. 1B includes k storage batteries and k protection circuits. Each storage battery is electrically connected to the corresponding protection circuit. Here, the protection circuit to which the m-th storage battery is connected is the m-th protection circuit. Note that k is an integer greater than or equal to 1 and m is an integer greater than or equal to 1 and less than or equal to k. Each of k protection circuits is connected to the control circuit 131. Although each storage battery is connected to the corresponding protection circuit in the example illustrated in FIG. 1B, the power storage system 130 may have a configuration in which the control circuit 131 includes a protection circuit, k storage batteries are each electrically connected to the control circuit 131 and controlled by the protection circuit in the control circuit 131. The description of the storage battery 135 can be applied to a storage battery 135_m.

A terminal V1 and a terminal V2 included in the protection circuit 137 are electrically connected to the control circuit 131. In the examples illustrated in FIGS. 1A and 1B, the terminals V1 and V2 are electrically connected to the circuit BC. The terminals V1 and V2 are electrically connected to both electrodes of the storage battery 135 through the protection circuit 137. Both the electrodes of the storage battery 135 may be electrically connected to the control circuit 131 not through the protection circuit 137.

The protection circuit 137 may include a terminal other than the terminals V1 and V2. In the examples illustrated in FIGS. 1A and 1B, the protection circuit 137 includes a terminal B1 which is electrically connected to the control circuit 131. For example, the terminal B1 may output parameters such as current, voltage, and temperature of the storage battery 135 measured at each time.

Figure 2:
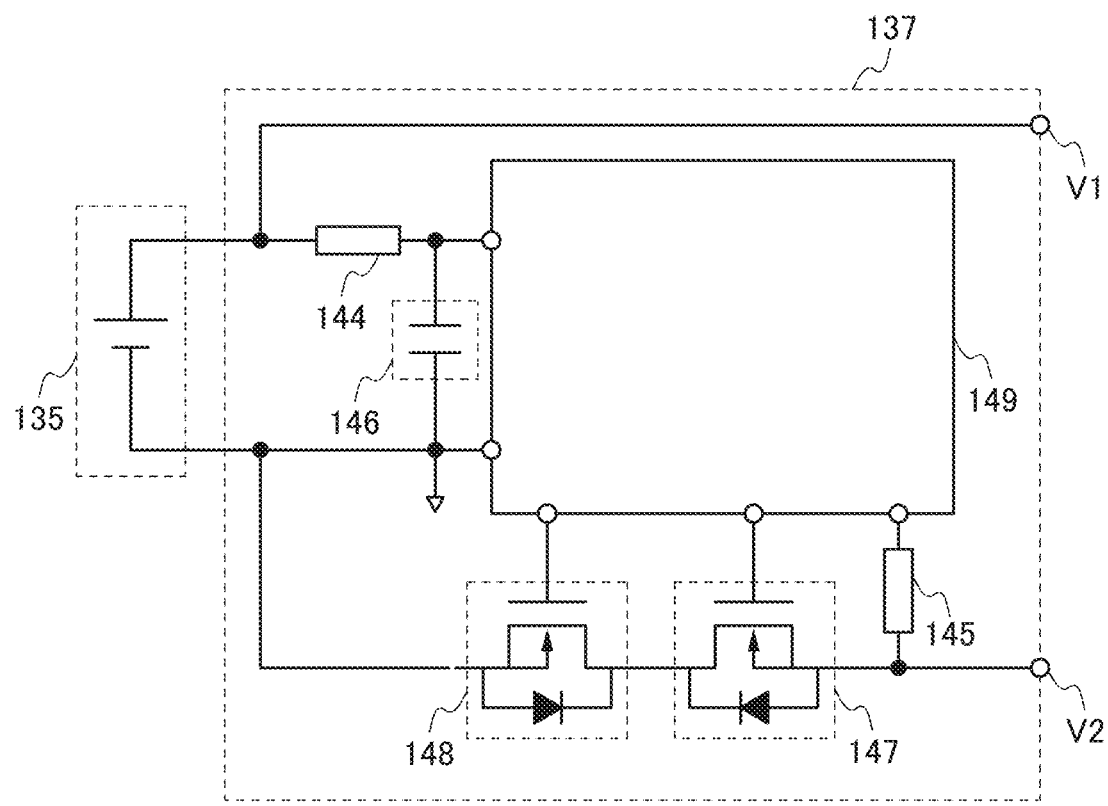
FIG. 2 illustrates an example of a protection circuit.

FIG. 2 illustrates an example of the protection circuit 137. The protection circuit 137 includes the terminal V1 and the terminal V2. The terminal V1 is electrically connected to the positive electrode of the storage battery 135, and the terminal V2 is electrically connected to the negative electrode of the storage battery 135. The protection circuit 137 also includes an integrated circuit 149, a transistor 147, and a transistor 148. The transistor 147 and the transistor 148 are preferably MOSFETs having parasitic diodes, and the transistor 147 and the transistor 148 are connected such that the directions of the respective parasitic diodes are opposite to each other. Instead of the parasitic diodes, other diode elements may be electrically connected. The transistor 148 is electrically connected to the negative electrode of the storage battery 135. The transistor 147 and the transistor 148 are provided in a path of charging or discharging the storage battery 135 from the terminal V2. The transistor 147 functions as a charge switch, and the transistor 148 functions as a discharge switch. In the case where a voltage out of the range of voltages used for charging and discharging is applied and a current out of the range of currents used for charging and discharging is supplied between the terminal V1 and the terminal V2, the transistor 147 or the transistor 148 is turned off to protect the storage battery 135.

The protection circuit 137 preferably includes a resistor 144 whose one electrode is electrically connected to the terminal V1 and a resistor 145 whose one electrode is electrically connected to the terminal V2. The other electrode of the resistor 144 and the other electrode of the resistor 145 are electrically connected to the integrated circuit 149.

The protection circuit 137 may include a capacitor 146 connected in parallel to the storage battery 135.

In the neural network of one embodiment of the present invention, measurement data of the storage battery is preferably used as an input parameter. For example, the current and voltage of the storage battery can be sampled at the same time as one set of data, at regular time intervals. Then, predetermined number of sets of data can be stored and used as input parameters. Alternatively, time and a set of data of the current and voltage of the storage battery at each time can be used as input parameters, for example. Here, the voltage of the storage battery is, for example, a potential difference between the electrodes of the storage battery.

A set of data of capacity and voltage of the storage battery can be used as an input parameter. The capacity of the storage battery can be obtained, for example, by the product of the current and time of the storage battery. The capacity of the storage battery may be obtained using the coulomb counter CC.

As an input parameter, the state of charge (SOC) of the storage battery may be used. The SOC of the storage battery means, for example, a ratio of the value obtained by subtracting the absolute value of the discharge capacity from the absolute value of the charge capacity of the storage battery to the full charge capacity. The SOC of the storage battery may be estimated from the voltage of the storage battery.

When the storage battery is charged or discharged, the voltage generally changes depending on the amount of current. For example, the value of a voltage drop due to the resistance of the storage battery varies depending on the amount of current. Therefore, in some cases, the resistance of the storage battery can be calculated from the relationship between the amount of current and voltage. The resistance value calculated in this manner may be used as an input parameter.

As an input parameter, the open circuit voltage (OCV) of the storage battery may be used. The open circuit voltage of the storage battery is, for example, a potential difference between the electrodes of the storage battery in a state where no current flows therein. Here, the state where no current flows in the storage battery means, for example, a state where no load is applied to the storage battery and a state where a charge circuit is not electrically connected to the storage battery. The resistance of the storage battery can be calculated by comparing the open circuit voltage and the voltage in a state where a noticeable amount of current flows in the storage battery, in some cases.

The parameters of the storage battery 135 supplied to the control circuit 131 are preferably stored in a register RS. For example, the parameters of the storage batteries 135_1 to 135_k are stored in the register RS and the parameters are sequentially analyzed by the neural network NN.

In another case, time-series data of the storage battery 135 is stored in the register RS, and data comparison and analysis may be performed. For example, time-series data of a charge or discharge cycle may be analyzed.

Alternatively, an input parameter of the x-th charge and discharge cycle of the storage battery (x is an integer greater than or equal to 1) may be stored in the register RS, and compared to that of the y-th charge and discharge cycle (y is an integer greater than or equal to x). For example, a difference in voltage between the y-th charge and discharge cycle and x-th charge and discharge cycle may be calculated to be used as an input parameter.

Parameters such as current, voltage, and capacity may be differentiated with respect to time to be used as an input parameter.

[Learning]

The neural network of one embodiment of the present invention preferably performs learning to determine whether or not the operational condition of the storage battery needs to be changed. Examples of changing operational condition of the storage battery include: stopping the operation of the storage battery; changing the charge or discharge rate of the storage battery, for example, changing the upper limit of the charging or discharging current of the storage battery, or changing the charging or discharging voltage of the storage battery, for example, changing the upper limit or the lower limit of charging or discharging voltage of the storage battery.

The storage battery is measured to be divided into two groups: one is a group of storage batteries judged from the measurement data to be preferable to be changed in their operational conditions (Group A), and the other is a group of storage batteries judged from the measurement data to need no change in their operational conditions (Group B). The criterion for grouping is determined by the observer of the measurement result. Alternatively, grouping may be performed based on the value of the measurement parameter of the storage battery. Examples of the measurement parameter of the storage battery include the above-mentioned current, voltage, capacity, and time at which these parameters are measured. Note that the time may be a relative time. For example, the start time of charging may be used as a reference time. Other examples of the measurement parameter of the storage battery include the temperature, battery expansion (change in volume) of the storage battery, and the like. For example, when the difference in temperature between the surface of the storage battery and the environment where the measurement is performed is larger than a predetermined value, the storage battery is judged to be Group A.

Alternatively, in the case where the number of conditions to which the operational condition of the storage battery can be changed is two or more, the grouping may be performed in accordance with the number of conditions. For example, the storage batteries may be divided into three or more groups.

In the power storage system of one embodiment of the present invention, a parameter input to the neural network is, for example, measurement data stored in a certain period. For example, voltage of the storage battery at each time and time at which the voltage is measured are regarded as one set, and a plurality of sets of data are input to the neural network. Alternatively, voltage of the storage battery at each time, externally-supplied current, and time at which the voltage and the current are measured are regarded as one set, and a plurality of sets of data may be input to the neural network. In the neural network of one embodiment of the present invention, a temporal shift in the parameter of the storage battery in a certain period, for example, a temporal shift in voltage, is preferably analyzed.

Figure 3A:
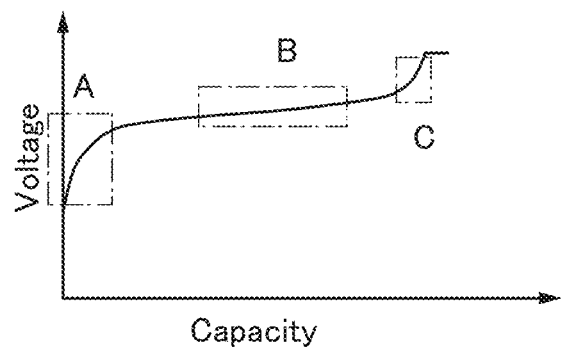
FIGS. 3A to 3D each show an example of a charge curve of a storage battery.

In the power storage system of one embodiment of the present invention, measurement data, which is a set including time, such as time and voltage, time, voltage, and current, and time and capacity, is measured at each time and input to the neural network. Here, the frequency of obtaining the sets of data with respect to time (or capacity) may be different for each section. For example, the regions surrounded by the dashed-dotted lines in FIG. 3A are a section A, a section B, and a section C. In the section A and the section C, which are the early period and the later period of charging, respectively, the amount of shift in voltage with respect to capacity is larger than that in the section B, which is the middle period of charging. Therefore, it is preferable that analysis in the section A and the section C be performed more intensively than in the section B. For example, the frequency of obtaining data input to the neural network with respect to time (or capacity) is preferably increased.

An example in which grouping is performed according to the criterion determined by the observer based on the charge measurement result will be described below. Although the charge measurement is performed in the following example, discharge measurement or charge and discharge measurements may be performed. Alternatively, the measurement result of the storage battery in which neither charge nor discharge is performed may be used.

As a measurement result, charge data of different storage batteries, charge data at different cycle numbers in the same storage battery, or the like, can be used.

FIGS. 3A to 3D show four measurement results of charge data of the storage battery. In the charge data, the horizontal axis represents capacity and the vertical axis represents voltage.

Figure 3B:
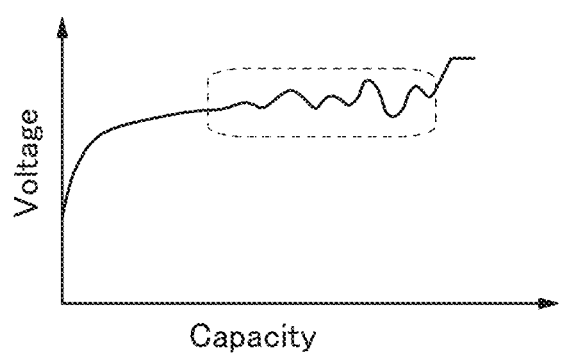
Figure 3C:
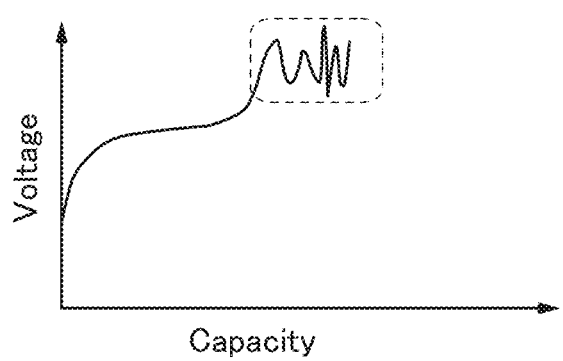
Figure 3D:
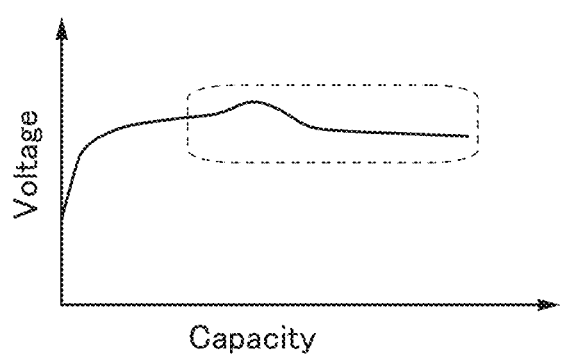

According to the criterion determined by the observer of the measurement result, FIG. 3A is classified as a group in which the operational condition of the storage battery is not changed, that is Group B. FIGS. 3B to 3D are classified as a group in which the operational condition of the storage battery is preferably changed, that is Group A. The regions surrounded by dashed lines in FIGS. 3B to 3D are judged as abnormal data by the observer. The reasons for judging that data is abnormal are, for example, a large change in current, a large number of maximum points and minimum points in the data, irregular cycles of maximum and minimum points, and the like. However, by inputting these data to the neural network NN for learning, the feature amount can be extracted by the arithmetic operation in the neural network, even if the observer does not extract the feature as a parameter. At that time, a feature which the observer fails to notice may be extracted in some cases. Thus, by analyzing the operation of the storage battery using the neural network, for example, the safety of the storage battery can be improved in some cases. In addition, the performance of the storage battery can be improved in some cases.

Since it is not abnormal that voltage changes with a change in externally-supplied current, in that case, the storage battery is preferably classified as Group B in which the operational condition of the storage battery is not changed. In contrast, voltage decreases when a short circuit occurs inside the storage battery, although a current that is externally controlled is hardly changed. Since there is an abnormality in that case, the storage battery needs to be classified as Group A in which the operational condition is preferably changed. Therefore, when current is included in the set of data in addition to voltage and time, more accurate learning and inference can be performed, leading to more accurate detection of abnormality.

Furthermore, the temperature of the storage battery is preferably included in the set of data. When the temperature of the storage battery suddenly rises, there is a high possibility that a serious safety problem such as a short circuit has already occurred inside the storage battery. In that case, the storage battery needs to be classified as Group A in which the operational condition is preferably changed. Therefore, when the temperature of the storage battery is included in the set of data, abnormality can be detected more accurately.

Figure 4A:
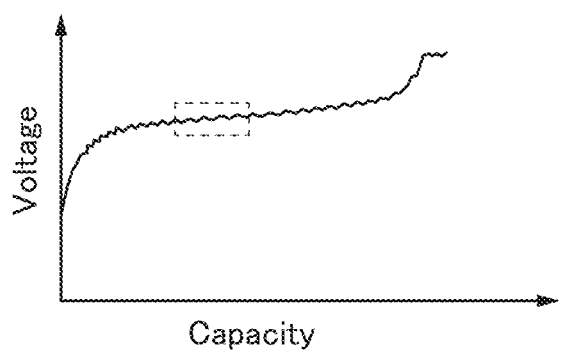
FIGS. 4A to 4C each show an example of a charge curve of a storage battery.
Figure 4B:
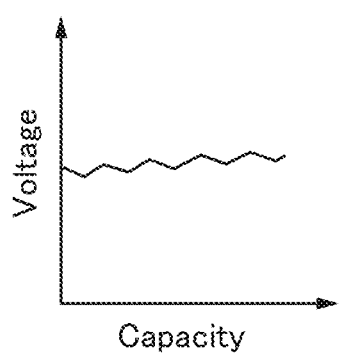
Figure 4C:
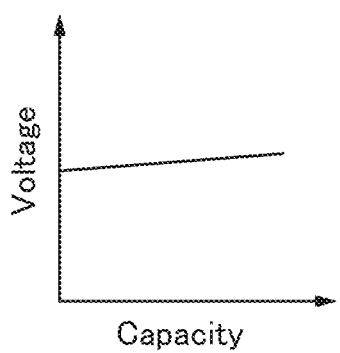

Here, smoothing treatment for a charge curve may be performed. FIGS. 4A to 4C show examples of charge curves. In FIG. 4A, voltage fluctuates minutely. FIG. 4B is an enlarged view showing a region surrounded by dashed lines in FIG. 4A.

FIG. 4C shows an example of the result of the smoothing treatment for the charge curve in FIG. 4B. It can be seen that voltage fluctuations are reduced by the smoothing treatment.

Since the voltage range of the storage battery can be determined from the materials of positive and negative electrodes in the storage battery, only the voltage in the range on which attention should be focused can be used for learning, and data of the other range can be deleted. The voltage in the range on which attention should be focused may be normalized. For example, when a positive electrode active material is lithium iron phosphate and a negative electrode active material is graphite, the data of voltage from 2.5 V to around 4.0 V (the maximum voltage) in the charge curve may be used for learning, and the data of voltage lower than or equal to 2.5 V may be deleted. The voltage from 2.5 V to the maximum may be normalized to be 0 to 1.

In addition, the final time of the data may be determined from the charge curve with the longest charge time. In the charge curve under the other conditions, padding at the maximum voltage may be performed for the period with no data after charging until the final time of the data.

For the data arranged in chronological order, data may be interpolated using a linear function or the like, in which case the data can be easily applied to learning even if measurements are performed at irregular intervals. Furthermore, association between the memories in the neural network NN may be weakened if the number of measuring points is too large, so the data may be decimated.

Next, input parameters for corresponding measurement results are input to the neural network NN.

Graphs of the examples in FIGS. 3A to 3D are made using the data of the storage battery and the observer visually judges the graph as an image. Therefore, for example, a graph in which the horizontal axis represents time and the vertical axis represents voltage, a graph in which the horizontal axis represents capacity and the vertical axis represents voltage, or the like may be made. Then, the graphs may be converted into images to be used as input parameters for the neural network NN.

Next, weight coefficients of the neural network NN are determined so that the outputs from the neural network NN differ between Group A and Group B. For example, the weight coefficients are determined such that a high voltage signal (hereinafter referred to as H) is output when data of the storage battery of Group A is input, and a low voltage signal (hereinafter referred to as L) is output when the data of the storage battery of Group B is input.

In the case where the storage batteries are divided into three or more groups, the weight coefficients can be determined so that the outputs corresponding to the inputs of the groups have different values.

Here, for example, in FIGS. 3B to 3D, data corresponding to all the regions shown in the graphs may be used as input parameters, or data corresponding to the regions surrounded by dashed lines, which are the sections determined to be abnormal, may be used as input parameters. In this manner, by inputting data in the section with noticeable characteristics to the neural network for learning, a highly accurate result can be obtained from the neural network in some cases.

Here, the measurement data of the storage battery included in the power storage system 130 may be used as input parameters for learning, or external parameters may be used as input parameters for learning. Alternatively, the result of learning performed outside may be supplied as a weight coefficient of the neural network NN.

[Inference]

Next, the state of the storage battery is analyzed using the neural network NN that has performed learning.

Figure 5A:
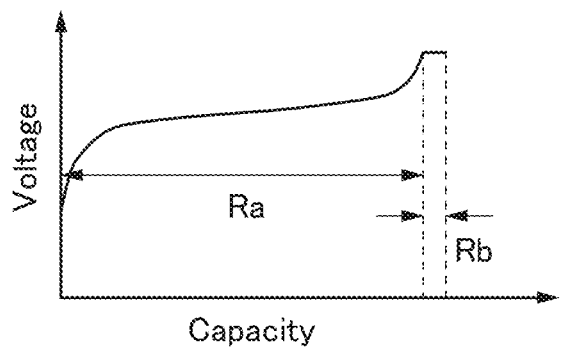
FIGS. 5A and 5B each show an example of a charge curve of a storage battery, and FIGS. 5C and 5D each show an example of charge and discharge curves of a storage battery.
Figure 5B:
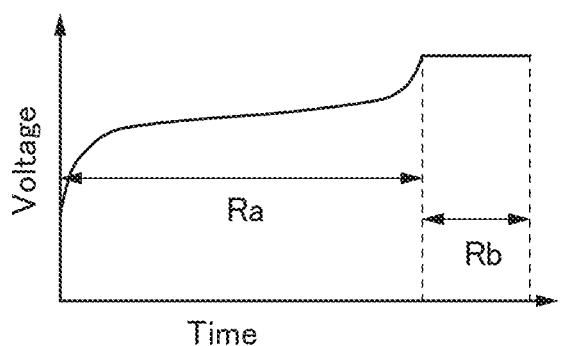

FIG. 5A shows an example of a charge curve. In FIG. 5A, the horizontal axis represents capacity and the vertical axis represents voltage. In FIG. 5A, constant current charging is performed in a section Ra and constant voltage charging is performed in a section Rb. FIG. 5B is a graph obtained by replacing capacity on the horizontal axis of the graph in FIG. 5A with time.

Figure 5C:
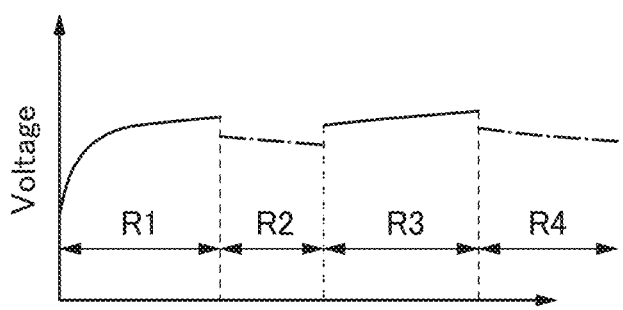

In the examples shown in FIGS. 5A and 5B, the storage battery is almost fully charged by a user; however, when the storage battery is used during charging, the storage battery may be discharged before it is almost fully charged, as shown in FIG. 5C.

Figure 5D:
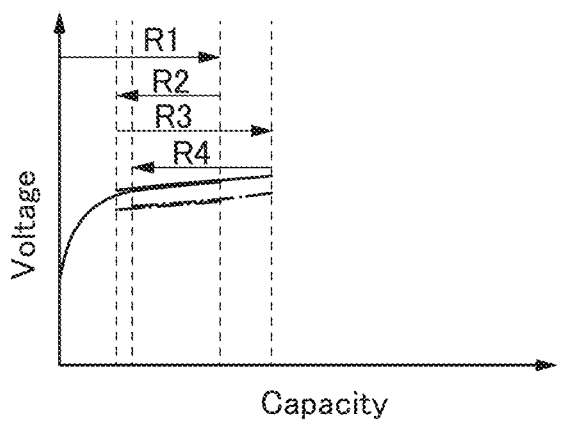

In FIG. 5C, the horizontal axis represents time and the vertical axis represents voltage. FIG. 5C shows an example in which the storage battery is charged in a section R1, discharged in a section R2, charged in a section R3, and discharged in a section R4. FIG. 5D is a graph obtained by replacing time on the horizontal axis of the graph in FIG. 5C with capacity.

Note that the directions of charging current and discharging current are different. Therefore, the polarities of charging current and discharging current to be supplied to the neural network NN may be opposite, for example, the charging current may be positive and the discharging current may be negative. Alternatively, the charging current and the discharging current may be the absolute values.

Figure 6:
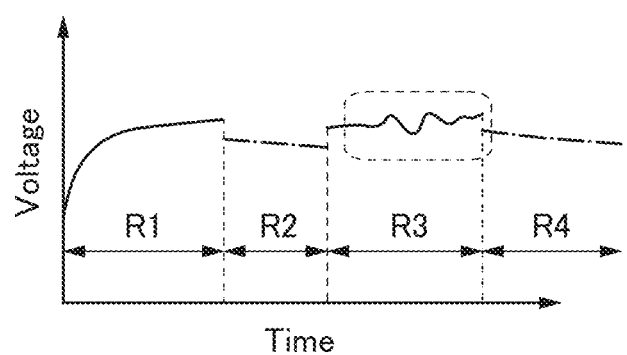
FIG. 6 shows an example of a charge and discharge curve of a storage battery.

FIG. 6 shows an example in which the minute fluctuations of voltage are observed in the section R3. Only charge data, that is, the data of the sections R1 and R3 in FIG. 6, may be input to the neural network NN. Alternatively, both charge and discharge data, that is, the data of the sections R1 to R4 in FIG. 6, may be input to the neural network NN.

If the learning is performed sufficiently, the neural network NN can determine that the charge data of the section R3 belongs to Group A, in other words, the operational condition of the storage battery is preferably changed.

Here, the examples shown in FIGS. 3A to 3D are the charge curves in which SOC approximately from 0% to 100% is used as the data for learning. On the other hand, only some sections in the charge curve are analyzed when a user uses the storage battery during charging, as shown in FIG. 6

Next, a procedure for inference will be described with reference to a flow chart in FIG. 7.

The power storage system 130 is electrically connected to a power supplied device such as an electronic device. In the power storage system 130, the storage battery 135 operates, for example, the storage battery 135 is charged or discharged. A parameter measured in the storage battery 135 is input to the neural network NN (Step S001).

The neural network NN outputs the value depending on the input parameter to the control circuit 131 (Step S002).

Next, the control circuit 131 determines in accordance with the value output from the neural network NN. Such operation is referred to as "classification" based on the output value from the neural network NN, in some cases. In the example shown in FIG. 7, the process proceeds to Step S004 when the output value is H, and the process returns to Step S001 when the output value is not H, for example, L.

In Step S004, the control circuit 131 changes the operational condition of the storage battery 135. For example, the operation of the storage battery is stopped. Here, when the power storage system of one embodiment of the present invention is used for the plurality of storage batteries 135, measurement data of the storage batteries 135 can be input to the neural network NN, and then the storage batteries 135 can be analyzed. Alternatively, measurement may be performed on the plurality of storage batteries which are connected in series or in parallel, and the data may be input to be analyzed.

A connection example of the plurality of storage batteries will be described later.

Figure 8:
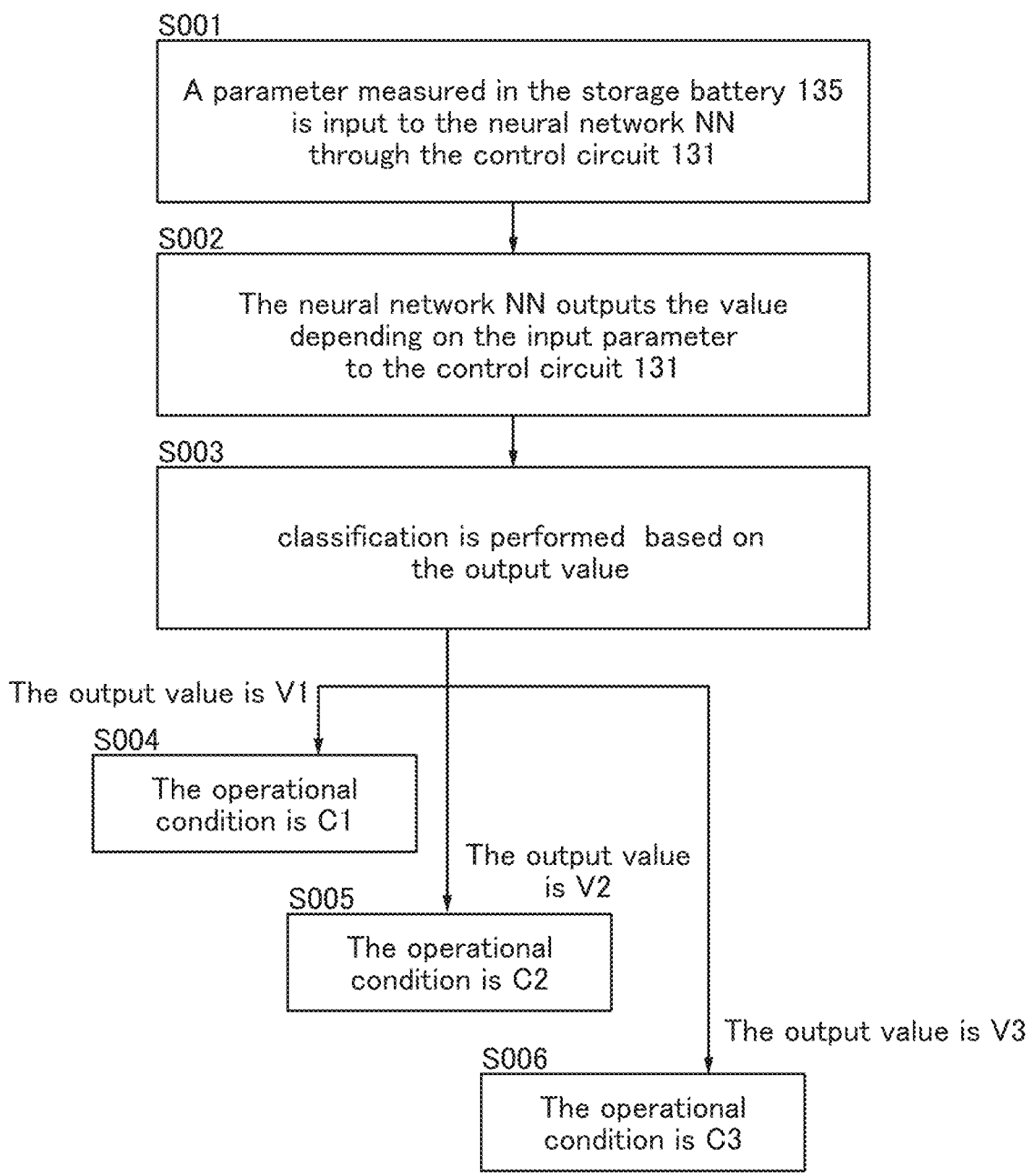
FIG. 8 is a flowchart showing an operation of a power storage system.

FIG. 8 is an example describing the further details of the classification.

Figure 7:
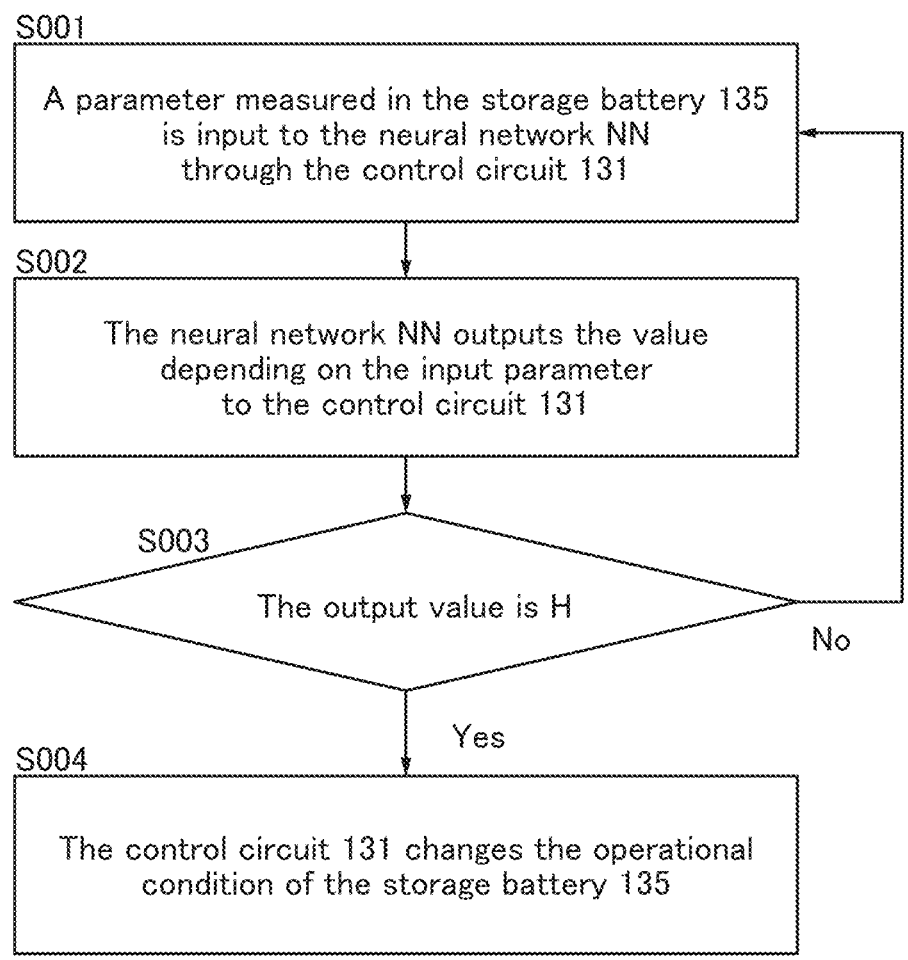
FIG. 7 is a flowchart showing an operation of a power storage system.

In FIG. 8, the descriptions of Step S001 and Step S002 are omitted because they are the same as those shown in FIG. 7.

Here, a case where the control circuit 131 can output three values of V1, V2, and V3 in Step S002 is considered. Note that although three values can be output in this example, four or more values can be output. In Step S003, classification is performed based on the output value. The process proceeds to Step S004 when the output value is V1, Step S005 when the output value is V2, and Step S006 when the output value is V3.

The operational conditions in Steps S004, S005, and S006 are C1, C2, and C3, respectively. Through the above steps, the state of the storage battery can be analyzed and the classification can be performed.

Examples of changing the operational condition include changing parameters such as the charge and discharge rate of the storage battery (the current density) and the upper limit voltage and the lower limit voltage, and stopping the above-mentioned operation.

Note that the characteristics of the storage battery depend on the materials of the positive and negative electrodes. Therefore, input parameters such as voltage, current, capacity, SOC, resistance, time, temperature, charge curve, and discharge curve depend on the materials of the positive and negative electrodes in some cases. In addition, the criterion for determining whether or not the operational condition of the storage battery needs to be changed depends on the materials of positive and negative electrodes in some cases.

For the above reason, it is preferable that learning and inference be performed separately for each combination of positive and negative electrodes. For example, when performing learning about a storage battery whose positive electrode active material is lithium cobalt oxide and whose negative electrode active material is graphite, the weight coefficient of the neural network NN is associated with information on the combination of "lithium cobalt oxide for the positive electrode and graphite for the negative electrode". Similarly, when performing learning about a storage battery whose positive electrode active material is lithium iron phosphate and whose negative electrode active material is graphite, a storage battery whose positive electrode active material is nickel-manganese-cobalt oxide and whose negative electrode active material is lithium titanate, or the like, the weight coefficient is associated with information on the combination of the active materials.

In addition, when the state of the storage battery is analyzed using the neural network NN that has performed learning, the combination of the positive electrode active material and the negative electrode active material included in the storage battery is determined by an analyzer. Then, analysis is performed using the weight coefficient linked to the information on the combination.

Thus, by performing learning and inference for each combination of materials of positive and negative electrodes, an abnormality can be detected more accurately.

This embodiment can be combined with any of the other embodiments as appropriate.

Embodiment 2

In this embodiment, an example of the configuration of a neural network NN will be described.

Figure 9:
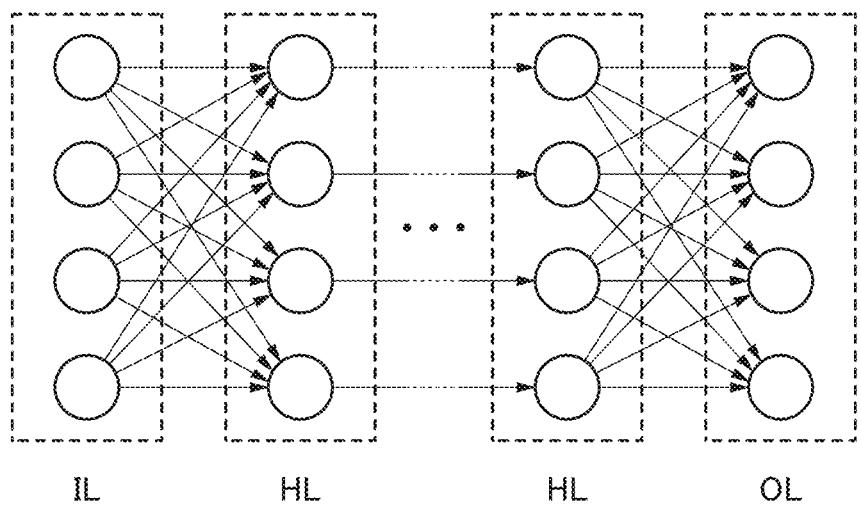
FIG. 9 illustrates a configuration example of a neural network.

FIG. 9 illustrates an example of a neural network of one embodiment of the present invention. The neural network NN illustrated in FIG. 9 includes an input layer IL, an output layer OL, and a hidden layer (middle layer) HL. The neural network NN can be a network including a plurality of hidden layers HL, that is, a deep neural network (DNN). Note that the learning using such a DNN is referred to as deep learning in some cases. The output layer OL, the input layer IL, and the hidden layers HL each include a plurality of neuron circuits, and the neuron circuits provided in the different layers are connected to each other through a synapse circuit.

To the neural network NN, a function of analyzing the state of a storage battery is added by learning. When a parameter of the storage battery that has been measured is input to the neural network NN, arithmetic processing is performed in each layer. The arithmetic processing in each layer is executed by, for example, the product-sum operation of an output of the neuron circuits in the previous layer and a weight coefficient. Note that the connection between layers may be a full connection where all of the neuron circuits are connected or a partial connection where some of the neuron circuits are connected.

For example, a convolutional neural network (CNN), which includes a convolution layer and a pooling layer and in which only specific units in adjacent layers have connection, may be used. A CNN is used for image processing, for example. In the convolution layer, the product-sum operation using image data and a filter is performed. The pooling layer is preferably provided directly after the convolution layer.

The convolution layer has a function of performing convolution on the image data. In the convolution, the product-sum operation using part of the image data and the filter value of a weight filter is repeatedly performed. As a result of the convolution by the convolution layer, a feature of an image is extracted.

For the convolution, the weight filter can be used. The image data input to the convolution layer is subjected to filter processing using the filter.

The data subjected to the convolution is converted using an activation function, and then output to the pooling layer. As the activation function, a rectified linear unit (ReLU) or the like can be used. An ReLU is a function that produces an output "0" when a negative value is input and outputs the input value as it is when the input value is greater than or equal to 0. As the activation function, a sigmoid function, a tanh function, or the like may be used.

The pooling layer has a function of performing pooling on the image data input from the convolution layer. In the pooling, the image data is partitioned into a plurality of regions, and predetermined data is extracted from each of the regions and the data are arranged in a matrix. The pooling can reduce the size of the image data without losing the feature extracted in the convolution layer. As the pooling, max pooling, average pooling, Lp pooling, or the like can be used.

In the CNN, the feature extraction is performed using the convolution and the pooling. Note that the CNN can include a plurality of convolution layers and a plurality of pooling layers.

A fully-connected layer is preferably provided after several convolution layers and several pooling layers that are arranged alternately, for example. Two or more fully-connected layers may be provided. The fully-connected layer preferably has a function of determining an image using the image data obtained through the convolution and the pooling.

Figure 10A:
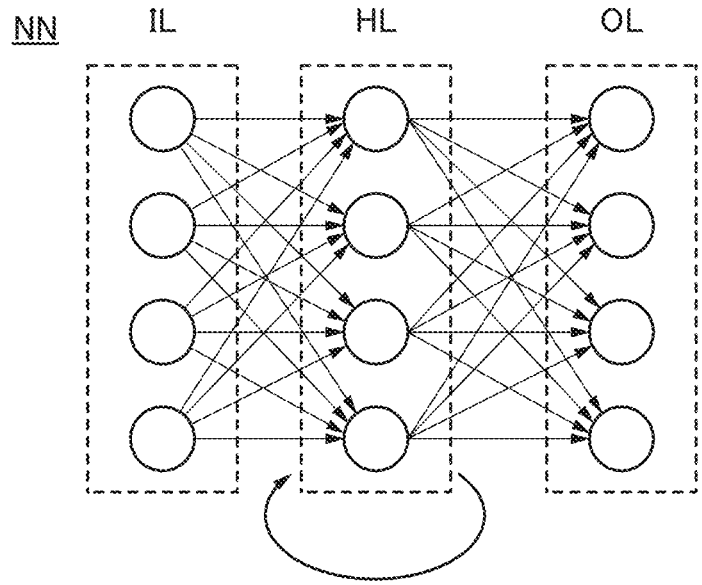
FIGS. 10A to 10C each illustrate a configuration example of a neural network.

A configuration example of a neural network NN illustrated in FIG. 10A is referred to as recurrent neural network (RNN) in some cases. In the RNN in FIG. 10A, a hidden layer HL includes a feedback loop, and the output from the hidden layer HL returns (is fed back) to itself. The use of the RNN allows time-series data to be analyzed to predict data. For example, in the neural network of one embodiment of the present invention, data to be obtained after predetermined time can be predicted on the basis of past charge and discharge curves, in some cases.

Figure 10B:
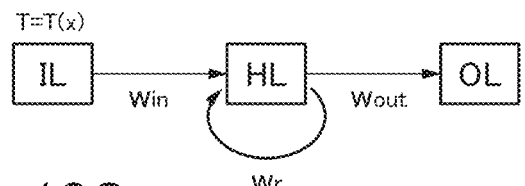

FIG. 10B illustrates a simplified RNN at Time T=T(x). Note that Win represents a weight coefficient for an input from the input layer IL to the hidden layer HL; Wout represents a weight coefficient for an input from the hidden layer HL to the output layer OL; and Wr represents a weight coefficient that is fed back from the hidden layer HL.

Figure 10C:
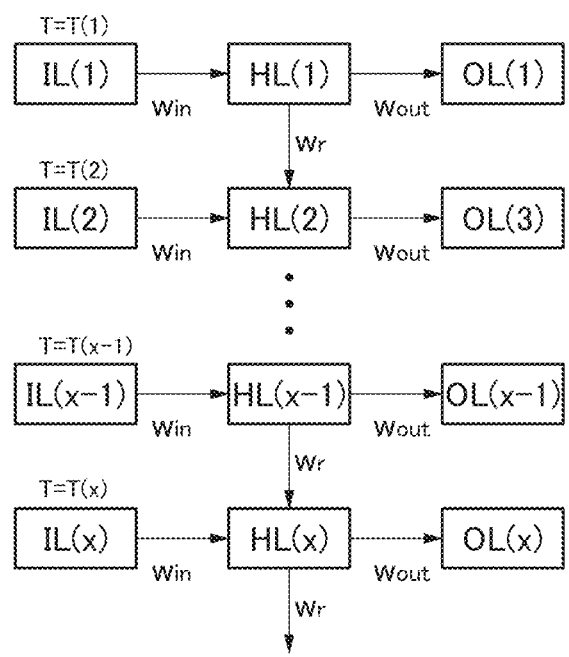

As illustrated in FIG. 10C, in the RNN, which is developed in the time-axis direction, layers (input layers IL(1) to IL(x), hidden layers HL(1) to HL(x), and output layers OL(1) to OL(x)) can be considered different depending on time (Time T(1) to Time T(x) in FIGS. 10A to 10C). An RNN developed in the time-axis direction can be regarded as a forward propagation network without a feedback loop, like that in FIG. 10C.

Furthermore, as a neural network, a configuration called a long short-term memory (LSTM) can be used. An LSTM, which is different from an RNN in that a hidden layer includes a memory cell so that a state is stored, is capable of analyzing, e.g., predicting data of a longer period of time.

Figure 11A:
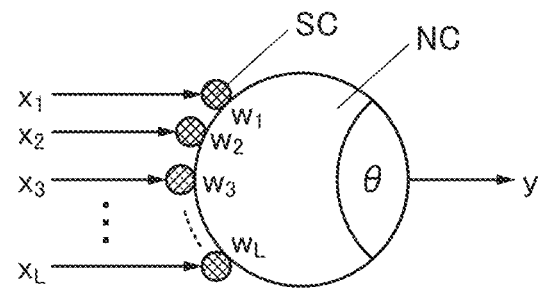
FIGS. 11A to 11C each illustrate a configuration example of a neural network.
Figure 11B:
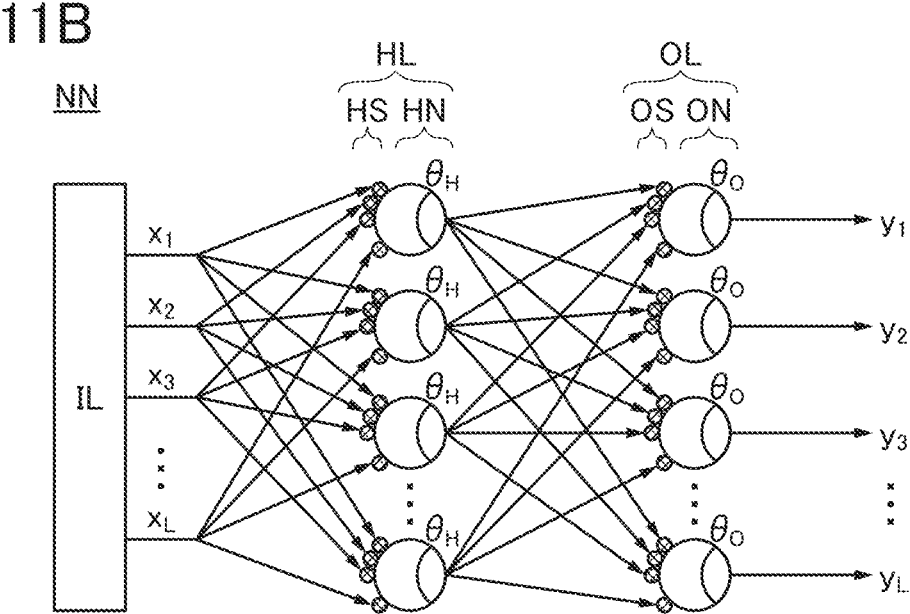
Figure 11C:
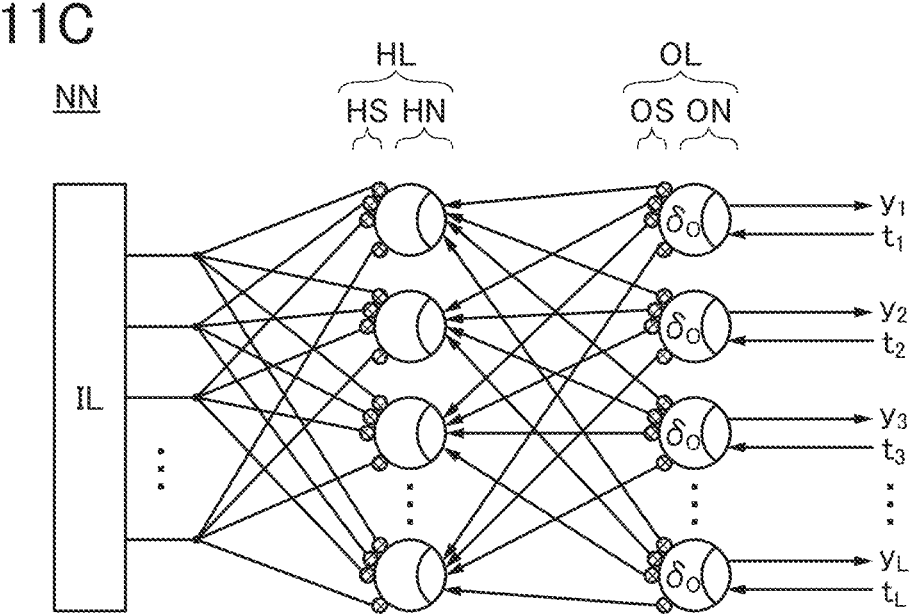

Next, configuration examples of a neural network having a learning function will be described. FIGS. 11A to 11C illustrate configuration examples of a neural network NN. The neural network NN includes neuron circuits NC and synapse circuits SC provided between the neuron circuits.

FIG. 11A illustrates a configuration example of a neuron circuit NC and synapse circuits SC of the neural network NN. Input data $x_1$ to $x_L$ (L is a natural number) are input to the synapse circuits SC. In addition, the synapse circuits SC each have a function of storing a weight coefficient $w_k$ (k is an integer of 1 to L inclusive). The weight coefficient $w_k$ corresponds to the connection strength between the neuron circuits NC.

When the input data $x_1$ to $x_L$ are input to the synapse circuits SC, the sum of the products $(x_k w_k)$ for k=1 to L (i.e., $x_1 w_1 + x_2 w_2 + \ldots + x_L w_L$) of input data $x_k$ input to the synapse circuit SC and the weight coefficient $w_k$ stored in the synapse circuit SC, that is, a value obtained by the product-sum operation of $x_k$ and $w_k$ is supplied to the neuron circuit NC. When the value is larger than the threshold θ of the neuron circuit NC, the neuron circuit NC outputs a high-level signal y. This phenomenon is referred to as firing of the neuron circuit NC.

FIG. 11B shows a model of a hierarchical perceptron neural network NN using the neuron circuits NC and the synapse circuits SC. The neural network NN includes an input layer IL, a hidden layer (middle layer) HL, and an output layer OL.

The input data $x_1$ to $x_L$ are output from the input layer IL. The hidden layer HL includes hidden synapse circuits HS and hidden neuron circuits HN. The output layer OL includes output synapse circuits OS and output neuron circuits ON.

A value obtained by the product-sum operation using the input data $x_k$ and the weight coefficient $w_k$ that is held in the hidden synapse circuit HS is supplied to the hidden neuron circuit HN. Then, a value obtained by the product-sum operation using the output of the hidden neuron circuit HN and the weight coefficient $w_k$ that is held in the output synapse circuit OS is supplied to the output neuron circuit ON. Then, output data $y_1$ to $y_L$ are output from the output neuron circuits ON.

As described above, the neural network NN to which given input data is supplied has a function of outputting, as output data, values corresponding to weight coefficients held in the synapse circuits SC and the thresholds θ of the neuron circuits.

In addition, the neural network NN can perform supervised learning by the input of teacher data. FIG. 11C shows a model of the neural network NN which performs supervised learning using backpropagation.

Backpropagation is a method for changing the weight coefficient $w_k$ of a synapse circuit so that the error between output data from a neural network and teacher data is reduced. Specifically, the weight coefficient $w_k$ of the hidden synapse circuit HS is changed in accordance with an error $\delta_O$ that is determined on the basis of the output data (data $y_1$ to $y_L$) and the teacher data (data $t_1$ to $t_L$). In addition, the weight coefficient $w_k$ of a synapse circuit SC in the previous layer is changed in accordance with the amount of change in the weight coefficient $w_k$ of the hidden synapse circuit HS. In this manner, weight coefficients of the synapse circuits SC are sequentially changed on the basis of the teacher data $t_1$ to $t_L$, so that the neural network NN can perform learning.

Note that the number of hidden layers HL is one in each of FIGS. 11B and 11C, but can be two or greater. The use of a neural network including two or more hidden layers HL (such a neural network is referred to as a deep neural network (DNN)) enables deep learning. Thus, the state of the storage battery can be predicted with high accuracy.

As described with reference to FIG. 10C, an RNN developed in the time-axis direction can be regarded as a forward propagation network without a feedback loop. In the forward propagation network, a weight coefficient can be changed on the basis of teacher data by backpropagation described above.

This embodiment can be combined with any of the other embodiments as appropriate.

Embodiment 3

In this embodiment, a specific example of an analog product-sum operation circuit that can be used in the neural network described in the above embodiment will be described.

Arithmetic processings in the whole neural networks illustrated in FIG. 9, FIGS. 10A to 10C, and FIGS. 11A to 11C are performed with an enormous number of product-sum operations. In the case where the arithmetic processings are performed by a digital circuit, a huge number of transistors are needed, resulting in inefficiency and high power consumption. Thus, the product-sum operations are preferably performed by an analog product-sum operation circuit (hereinafter referred to as an analog product-sum circuit (APS)). The APS preferably includes an analog memory. The APS stores a weight coefficient obtained by learning in the analog memory, whereby it can perform the product-sum operations using analog data as it is. Consequently, the APS enables efficient construction of a neural network with a small number of transistors.

Note that "analog memory" in this specification refers to a memory device capable of storing analog data, and "analog data" in this specification refers to data having a resolution of three bits (eight levels) or more. Multilevel data is referred to as analog data, in some cases.

Examples of the analog memory include a multilevel flash memory, a resistive random access memory (ReRAM), a magnetoresistive random access memory (MRAM), and a memory using an OS transistor (OS memory).

A channel formation region of an OS transistor preferably includes a metal oxide. The metal oxide in the channel formation region preferably contains indium (In). The metal oxide in the channel formation region that contains indium increases the carrier mobility (electron mobility) of the OS transistor. The metal oxide in the channel formation region is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements may be used in combination as the element M. The element M is an element having high bonding energy with oxygen, for example. The element M is an element whose bonding energy with oxygen is higher than that of indium, for example. The metal oxide in the channel formation region is preferably a metal oxide containing zinc (Zn). The metal oxide containing zinc is easily crystallized in some cases.

Figure 12:
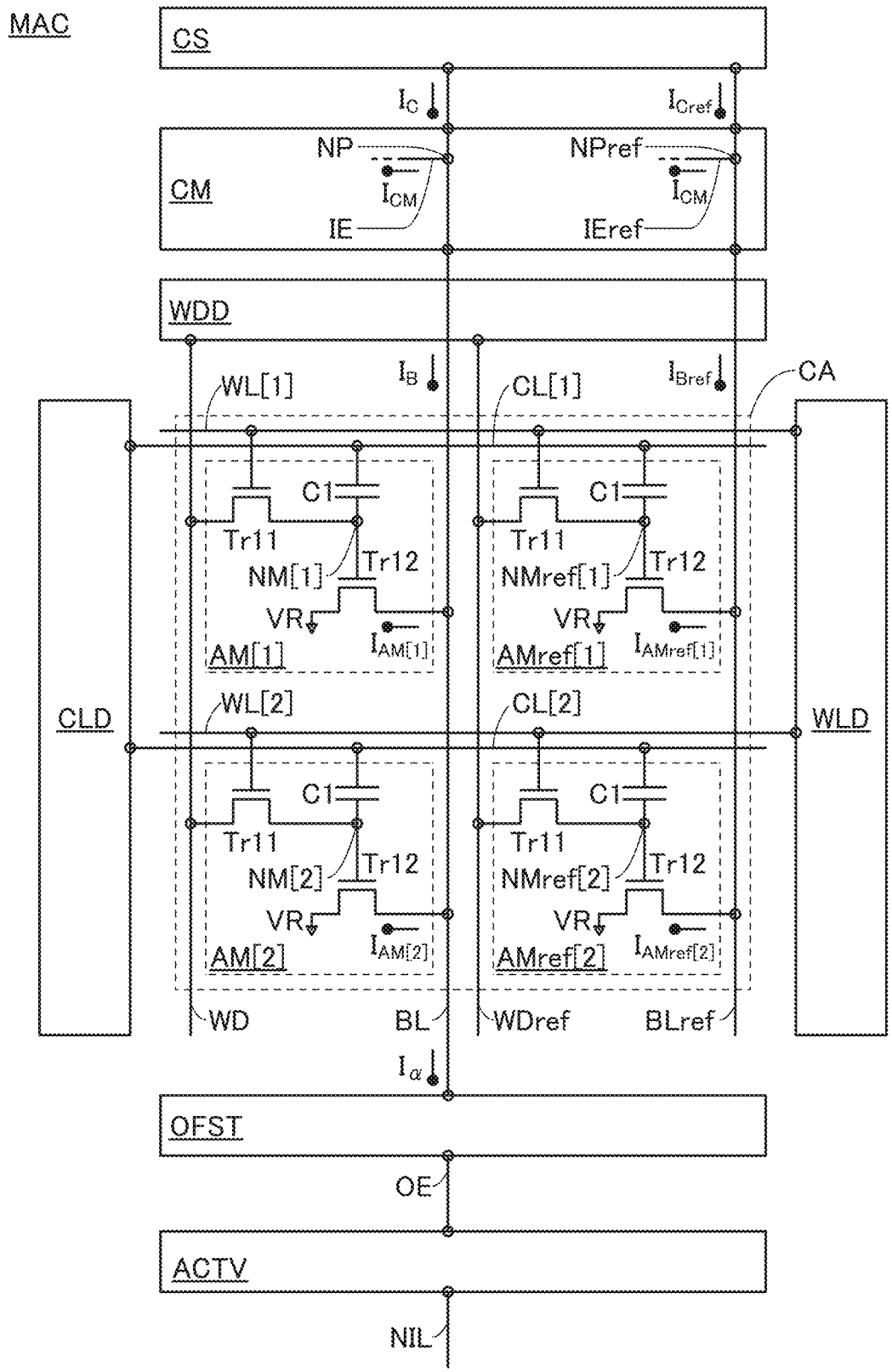
FIG. 12 is a block diagram illustrating a configuration example of a product-sum operation circuit.

The metal oxide in the channel formation region is not limited to a metal oxide containing indium. The metal oxide in the channel formation region may be, for example, a metal oxide that does not contain indium and contains any of zinc, gallium, and tin (e.g., zinc tin oxide and gallium tin oxide). FIG. 12 illustrates a configuration example of a product-sum operation circuit. A product-sum operation circuit MAC in FIG. 12 is a circuit that performs a product-sum operation using first data retained in a memory cell described below and input second data. Note that the first data and the second data can be analog data or multilevel data (discrete data).

The product-sum operation circuit MAC includes a current supply circuit CS, a current mirror circuit CM, a circuit WDD, a circuit WLD, a circuit CLD, an offset circuit OFST, an activation function circuit ACTV, and a memory cell array CA.

The memory cell array CA includes a memory cell AM[1], a memory cell AM[2], a memory cell AMref[1], and a memory cell AMref[2]. The memory cell AM[1] and the memory cell AM[2] each have a function of retaining first data, and the memory cell AMref[1] and the memory cell AMref[2] each have a function of retaining reference data that is needed to perform a product-sum operation. The reference data can be analog data or multilevel data (discrete data), like the first data and the second data.

Although memory cells are arranged in a matrix of two rows and two columns in the memory cell array CA in FIG. 12, memory cells may be arranged in a matrix of three or more rows and three or more columns in the memory cell array CA. In the case where multiplication is performed instead of a product-sum operation, memory cells may be arranged in a matrix of one row and two or more columns in the memory cell array CA.

The memory cell AM[1], the memory cell AM[2], the memory cell AMref[1], and the memory cell AMref[2] each include a transistor Tr11, a transistor Tr12, and a capacitor C1.

Note that the transistor Tr11 is preferably an OS transistor.

The use of an OS transistor as the transistor Tr12 allows the transistor Tr12 to be formed concurrently with the transistor Tr11, leading to a reduction in the number of manufacturing steps for the product-sum operation circuit, in some cases. A channel formation region of the transistor Tr12 may be formed using amorphous silicon, polycrystalline silicon, or the like instead of an oxide.

In each of the memory cell AM[1], the memory cell AM[2], the memory cell AMref[1], and the memory cell AMref[2], a first terminal of the transistor Tr11 is electrically connected to a gate of the transistor Tr12. A first terminal of the transistor Tr12 is electrically connected to a wiring VR. A first terminal of the capacitor C1 is electrically connected to the gate of the transistor Tr12.

In the memory cell AM[1], a second terminal of the transistor Tr11 is electrically connected to a wiring WD, and a gate of the transistor Tr11 is electrically connected to a wiring WL[1]. A second terminal of the transistor Tr12 is electrically connected to a wiring BL, and a second terminal of the capacitor C1 is electrically connected to a wiring CL[1]. In FIG. 12, in the memory cell AM[1], a connection portion of the first terminal of the transistor Tr11, the gate of the transistor Tr12, and the first terminal of the capacitor C1 is a node NM[1]. In addition, $I_{AM[1]}$ represents a current that flows from the wiring BL to the second terminal of the transistor Tr12.

In the memory cell AM[2], a second terminal of the transistor Tr11 is electrically connected to the wiring WD, and a gate of the transistor Tr11 is electrically connected to a wiring WL[2]. A second terminal of the transistor Tr12 is electrically connected to the wiring BL, and a second terminal of the capacitor C1 is electrically connected to a wiring CL[2]. In FIG. 12, in the memory cell AM[2], a connection portion of the first terminal of the transistor Tr11, the gate of the transistor Tr12, and the first terminal of the capacitor C1 is a node NM[2]. In addition, $I_{AM[2]}$ represents a current that flows from the wiring BL to the second terminal of the transistor Tr12.

In the memory cell AMref[1], a second terminal of the transistor Tr11 is electrically connected to a wiring WDref, and a gate of the transistor Tr11 is electrically connected to the wiring WL[1]. A second terminal of the transistor Tr12 is electrically connected to a wiring BLref, and a second terminal of the capacitor C1 is electrically connected to the wiring CL[1]. In FIG. 12, in the memory cell AMref[1], a connection portion of the first terminal of the transistor Tr11, the gate of the transistor Tr12, and the first terminal of the capacitor C1 is a node NMref[1]. In addition, $I_{AMref[1]}$ represents a current that flows from the wiring BLref to the second terminal of the transistor Tr12.

In the memory cell AMref[2], a second terminal of the transistor Tr11 is electrically connected to the wiring WDref, and a gate of the transistor Tr11 is electrically connected to the wiring WL[2]. A second terminal of the transistor Tr12 is electrically connected to the wiring BLref, and a second terminal of the capacitor C1 is electrically connected to the wiring CL[2]. In FIG. 12, in the memory cell AMref[2], a connection portion of the first terminal of the transistor Tr11, the gate of the transistor Tr12, and the first terminal of the capacitor C1 is a node NMref[2]. In addition, $I_{AMref[2]}$ represents a current that flows from the wiring BLref to the second terminal of the transistor Tr12.

The node NM[1], the node NM[2], the node NMref[1], and the node NMref[2] function as retention nodes of respective memory cells.

The wiring VR is for supplying a current between the first terminal and the second terminal of the transistor Tr12 of each of the memory cell AM[1], the memory cell AM[2], the memory cell AMref[1], and the memory cell AMref[2]. Thus, the wiring VR functions as a wiring for supplying a predetermined potential. In this embodiment, a potential to be supplied from the wiring VR is a reference potential or lower than the reference potential.

The current supply circuit CS is electrically connected to the wiring BL and the wiring BLref. The current supply circuit CS has a function of supplying a current to the wiring BL and the wiring BLref. Different amounts of current may be supplied to the wiring BL and the wiring BLref. In this configuration example, a current that is supplied from the current supply circuit CS to the wiring BL is represented by $I_C$, and a current that is supplied from the current supply circuit CS to the wiring BLref is represented by $I_{Cref}$.

The current mirror circuit CM has a wiring IE and a wiring IEref. The wiring IE is electrically connected to the wiring BL, and in FIG. 12, a connection point of the wiring IE and the wiring BL is shown as a node NP. The wiring IEref is electrically connected to the wiring BLref, and in FIG. 12, a connection point of the wiring IEref and the wiring BLref is shown as a node NPref. The current mirror circuit CM has a function of letting out a current depending on the potential of the node NPref from the node NPref of the wiring BLref to the wiring IEref, and letting out the same amount of current as the current depending on the potential of the node Npref from the node NP of the wiring BL to the wiring IE. In FIG. 12, a current that is let out from the node NP to the wiring IE and a current that is let out from the node NPref to the wiring IEref are represented by $I_{CM}$. A current that flows from the current mirror circuit CM to the memory cell array CA through the wiring BL is represented by $I_B$, and a current that flows from the current mirror circuit CM to the memory cell array CA through the wiring BLref is represented by $I_{Bref}$.

The circuit WDD is electrically connected to the wiring WD and the wiring WDref. The circuit WDD has a function of transmitting data that is to be stored in each memory cell of the memory cell array CA.

The circuit WLD is electrically connected to the wiring WL[1] and the wiring WL[2]. The circuit WLD has a function of selecting a memory cell to which data is written in data writing to the memory cell in the memory cell array CA.

The circuit CLD is electrically connected to the wiring CL[1] and the wiring CL[2]. The circuit CLD has a function of supplying a potential to the second terminal of the capacitor C1 of each memory cell in the memory cell array CA.

The circuit OFST is electrically connected to the wiring BL and a wiring OE. The circuit OFST has a function of measuring the amount of current flowing from the wiring BL to the circuit OFST and/or a variation in the amount of current flowing from the wiring BL to the circuit OFST. In addition, the circuit OFST has a function of outputting the measurement result to the wiring OE. Note that the circuit OFST may output the measurement result as a current to the wiring OE or convert the measurement result into voltage and then output the voltage to the wiring OE. In FIG. 12, $I_\alpha$ represents a current flowing from the wiring BL to the circuit OFST.

Figure 13:
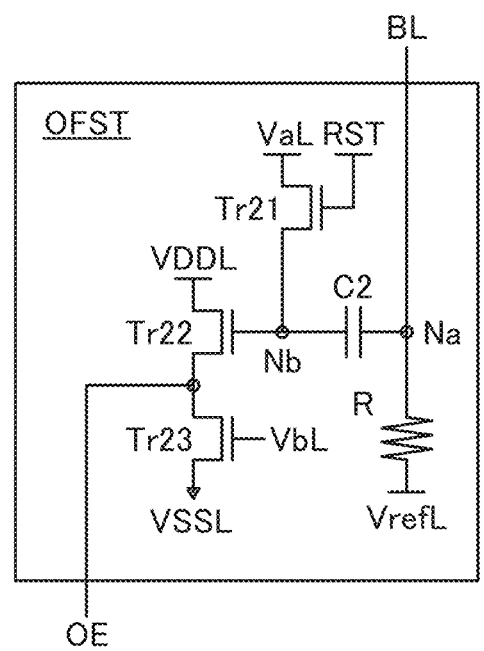
FIG. 13 is a circuit diagram illustrating a configuration example of a circuit.

For example, the circuit OFST can have a configuration in FIG. 13. In FIG. 13, the circuit OFST includes transistors Tr21, Tr22, and Tr23, a capacitor C2, and a resistor R. A first terminal of the capacitor C2 is electrically connected to the wiring BL, and a first terminal of the resistor R is electrically connected to the wiring BL. A second terminal of the capacitor C2 is electrically connected to a first terminal of the transistor Tr21, and the first terminal of the transistor Tr21 is electrically connected to a gate of the transistor Tr22. A first terminal of the transistor Tr22 is electrically connected to a first terminal of the transistor Tr23, and the first terminal of the transistor Tr23 is electrically connected to the wiring OE. An electrical connection point of the first terminal of the capacitor C2 and the first terminal of the resistor R is referred to as a node Na, and an electrical connection point of the second terminal of the capacitor C2, the first terminal of the transistor Tr21, and the gate of the transistor Tr22 is referred to as a node Nb.

A second terminal of the resistor R is electrically connected to a wiring VrefL. A second terminal of the transistor Tr21 is electrically connected to a wiring VaL, and a gate of the transistor Tr21 is electrically connected to a wiring RST. A second terminal of the transistor Tr22 is electrically connected to a wiring VDDL. A second terminal of the transistor Tr23 is electrically connected to a wiring VSSL, and a gate of the transistor Tr23 is electrically connected to a wiring VbL.

The wiring VrefL is for supplying a potential Vref, the wiring VaL is for supplying a potential Va, and the wiring VbL is for supplying a potential Vb. The wiring VDDL is for supplying a potential VDD, and the wiring VSSL is for supplying a potential VSS. Particularly in this configuration example of the circuit OFST, the potential VDD is set to a high-level potential and the potential VSS is set to a low-level potential. The wiring RST is for supplying a potential for switching the on/off state of the transistor Tr21.

In the circuit OFST in FIG. 13, a source follower circuit is composed of the transistor Tr22, the transistor Tr23, the wiring VDDL, the wiring VSSL, and the wiring VbL.

In the circuit OFST in FIG. 13, through the resistor R and the wiring VrefL, a potential depending on a current through the wiring BL and the resistance of the resistor R is supplied to the node Na.

An operation example of the circuit OFST in FIG. 13 will be described. When a first-time current (hereinafter referred to as a first current) flows through the wiring BL, a potential depending on the first current and the resistance of the resistor R is supplied to the node Na through the resistor R and the wiring VrefL. At this time, the transistor Tr21 is turned on so that the potential Va is supplied to the node Nb. After that, the transistor Tr21 is turned off.

Next, when a second-time current (hereinafter referred to as a second current) flows through the wiring BL, a potential depending on the second current and the resistance of the resistor R is supplied to the node Na through the resistor R and the wiring VrefL as in the case where the first current flows. At this time, the node Nb is in a floating state; thus, a variation in the potential of the node Na changes the potential of the node Nb owing to capacitive coupling. When the variation in the potential of the node Na is $\Delta V_{Na}$ and the capacitive coupling coefficient is 1, the potential of the node Nb is $Va+\Delta V_{Na}$. When the threshold voltage of the transistor Tr22 is $V_{th}$, a potential $Va+\Delta V_{Na}-V_{th}$ is output through the wiring OE. When the potential Va is the threshold voltage $V_{th}$ here, the potential $\Delta V_{Na}$ can be output through the wiring OE.

The potential $\Delta V_{Na}$ is determined by a variation between the first current and the second current, the resistor R, and the potential Vref. The resistor R and the potential Vref can be regarded as known; therefore, the use of the circuit OFST in FIG. 13 allows a variation in current flowing through the wiring BL to be obtained from the potential $\Delta V_{Na}$.

The activation function circuit ACTV is electrically connected to the wiring OE and a wiring NIL. The variation in the amount of current measured by the circuit OFST is input to the activation function circuit ACTV through the wiring OE. The activation function circuit ACTV performs an arithmetic operation according to functions defined in advance on the variation in the amount of current measured by the circuit OFST. Examples of the functions include a sigmoid function, a tanh function, a softmax function, an ReLU function, and a threshold function, and these functions are used as activation functions in a neural network.

<Operation Example of Product-Sum Operation Circuit>

Next, an operation example of the product-sum operation circuit MAC will be described.

Figure 14:
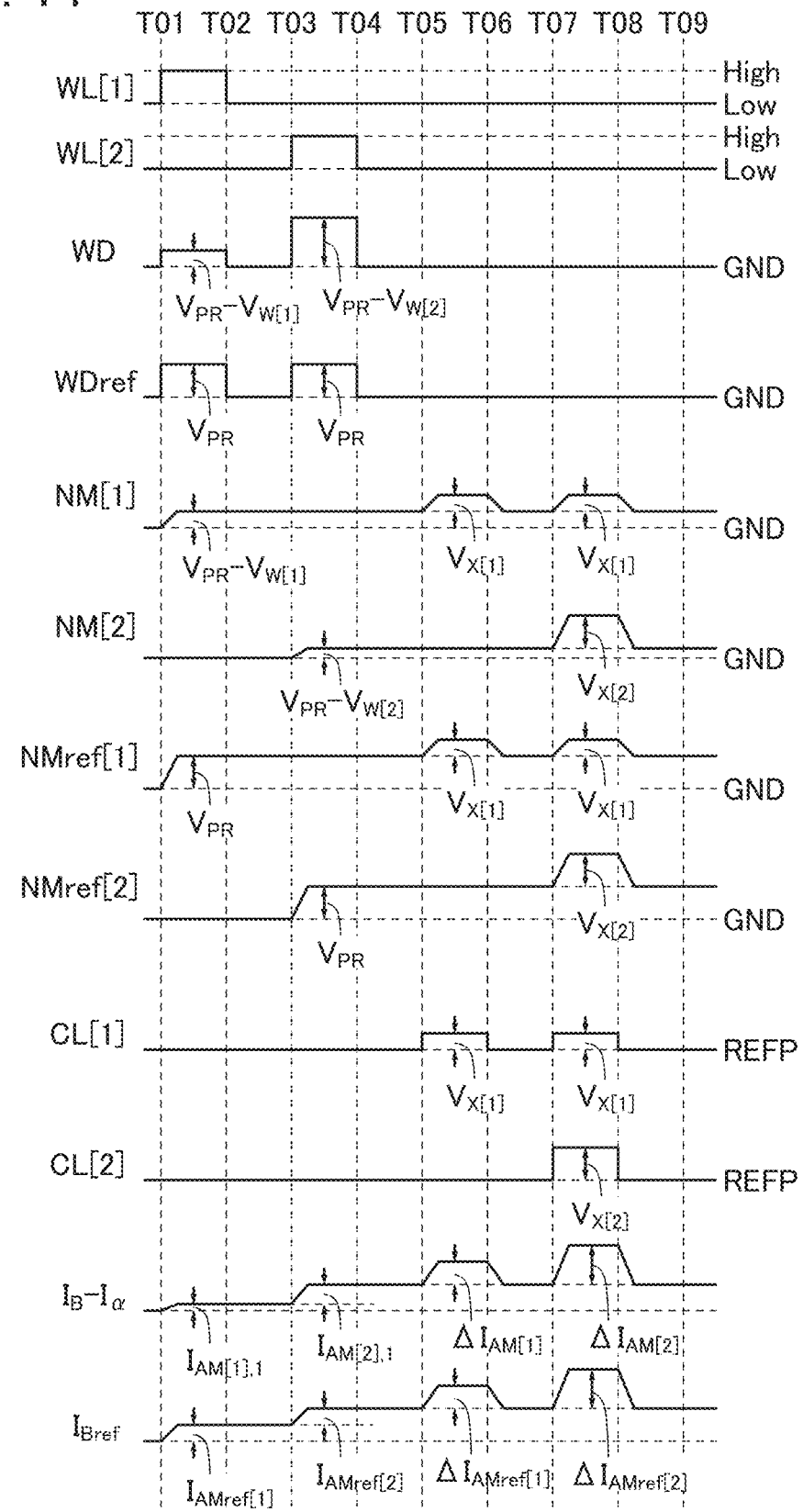
FIG. 14 is a timing chart showing an operation example of a product-sum operation circuit.

FIG. 14 shows a timing chart of the operation example of the product-sum operation circuit MAC. The timing chart of FIG. 14 shows variations in the potentials of the wiring WL[1], the wiring WL[2], the wiring WD, the wiring WDref, the node NM[1], the node NM[2], the node NMref[1], the node NMref[2], the wiring CL[1], and the wiring CL[2] and variations in current $I_B-I_\alpha$ and current $I_{Bref}$ from Time T01 to Time T09. In particular, the current $I_B-I_C$ represents the total amount of current that flows through the wiring BL to the memory cells AM[1] and AM[2] in the memory cell array CA.

<<Period from Time T01 to Time T02>>

During a period from Time T01 to Time T02, the high-level potential (denoted by High in FIG. 14) is supplied to the wiring WL[1], and the low-level potential (denoted by Low in FIG. 14) is supplied to the wiring WL[2]. Furthermore, a potential higher than the ground potential (denoted by GND in FIG. 14) by $V_{PR}-V_{W[1]}$ is supplied to the wiring WD, and a potential higher than the ground potential by $V_{PR}$ is supplied to the wiring WDref. Moreover, a reference potential (denoted by REFP in FIG. 14) is supplied to the wiring CL[1] and the wiring CL[2].

The potential $V_{W[1]}$ corresponds to one piece of first data. The potential $V_{PR}$ corresponds to the reference data.

In this period, the high-level potential is supplied to the gates of the transistors Tr11 in the memory cell AM[1] and the memory cell AMref[1]; accordingly, the transistors Tr11 in the memory cell AM[1] and the memory cell AMref[1] are turned on. Thus, the potential of the node NM[1] becomes $V_{PR}-V_{W[1]}$, and the potential of the node NMref[1] becomes $V_{PR}$.

The current $I_{AM[1],0}$ flowing from the wiring BL to the first terminal of the transistor Tr12 in the memory cell AM[1] through the second terminal thereof can be expressed by the following formula.

[Formula 1]

$$I_{AM[1],0} = k(V_{PR} - V_{W[1]} V_{th})^2 \quad (E1)$$

In the formula, k is a constant determined by the channel length, the channel width, the mobility, the capacitance of a gate insulating film, and the like of the transistor Tr12. Furthermore, $V_{th}$ is the threshold voltage of the transistor Tr12.

Similarly, the current $I_{AMref[1],0}$ flowing from the wiring BLref to the first terminal of the transistor Tr12 in the memory cell AMref[1] through the second terminal thereof can be expressed by the following formula.

[Formula 2]

$$I_{AMref[1],0} = k(V_{PR} - V_{th})^2 \quad (E2)$$

Note that since the low-level potential is supplied to the gates of the transistors Tr11 in the memory cell AM[2] and the memory cell AMref[2], the transistors Tr11 in the memory cell AM[2] and the memory cell AMref[2] are turned off. Thus, the potentials are not held at the node NM[2] and the node NMref[2].

<<Period from Time T02 to Time T03>>

During a period from Time T02 to Time T03, the low-level potential is supplied to the wiring WL[1]. At this time, the low-level potential is supplied to the gates of the transistors Tr11 in the memory cell AM[1] and the memory cell AMref[1], and accordingly, the transistors Tr11 in the memory cells AM[1] and AMref[1] are turned off.

The low-level potential is continuously supplied to the wiring WL[2] since before Time T02. Thus, the transistors Tr11 in the memory cell AM[2] and the memory cell AMref[2] remain off since before Time T02. Thus, the potentials at the node NM[1], the node NM[2], the node NMref[1], and the node NMref[2] are held in a period from Time T02 to Time T03. When an OS transistor is used as each of the transistors Tr11, the amount of leakage current flowing between the first terminal and the second terminal of each of the transistors Tr11 can be made small, which makes it possible to hold the potentials at the nodes for a long time. Since the ground potential is supplied to the wiring WD and the wiring WDref and each of the transistors Tr11 is off, the potentials held at the nodes are not rewritten by supplying potentials from the wiring WD and the wiring WDref.

<<Period from Time T03 to Time T04>>

During a period from Time T03 to Time T04, the low-level potential is supplied to the wiring WL[1], and the high-level potential is supplied to the wiring WL[2]. Furthermore, a potential higher than the ground potential by $V_{PR} - V_{w[2]}$ is supplied to the wiring WD, and a potential higher than the ground potential by $V_{PR}$ is supplied to the wiring WDref. Moreover, the reference potential is continuously supplied to the wiring CL[1] and the wiring CL[2] since before Time T02.

Note that the potential $V_{w[2]}$ corresponds to one piece of first data.

In this period, the high-level potential is supplied to the gates of the transistors Tr11 in the memory cell AM[2] and the memory cell AMref[2], and accordingly, the transistors Tr11 in the memory cell AM[2] and the memory cell AMref[2] are turned on. Thus, the potential of the node NM[2] becomes $V_{PR} - V_{W[2]}$, and the potential of the node Nref[2] becomes $V_{PR}$.

The current $I_{AM[2],0}$ flowing from the wiring BL to the first terminal of the transistor Tr12 in the memory cell AM[2] through the second terminal thereof can be expressed by the following formula.

[Formula 3]

$$I_{AM[2],0} = k(V_{PR} - V_{W[2]} - V_{th})^2 \quad (E3)$$

Similarly, the current $I_{AMref[2],0}$ flowing from the wiring BLref to the first terminal of the transistor Tr12 in the memory cell AMref[2] through the second terminal thereof can be expressed by the following formula.

[Formula 4]

$$I_{AMref[2],0} = k(V_{PR} - V_{th})^2 \quad (E4)$$

<<Period from Time T04 to Time T05>>

Here, currents that flow through the wiring BL and the wiring BLref during a period from Time T04 to Time T05 will be described.

A current from the current supply circuit CS is supplied to the wiring BLref. In addition, current is let out from the current mirror circuit CM, the memory cell AMref[1], and the memory cell AMref[2] to the wiring BLref. When the current supplied from the current supply circuit CS through the wiring BLref is $I_{Cref}$ and the current let out from the current mirror circuit CM through the wiring BLref is $I_{CM,0}$, the following formula is satisfied according to Kirchhoff's law.

[Formula 5]

$$I_{Cref} - I_{CM,0} = I_{AMref[1],0} + I_{AMref[2],0} \quad (E5)$$

The current supplied from the current supply circuit CS through the wiring BL is $I_{C,0}$ and the current that flows from the wiring BL to the circuit OFST is $I_{\alpha,0}$, the following formula is satisfied according to Kirchhoff's law.

[Formula 6]

$$I_C - I_{CM,0} = I_{AM[1],0} + I_{AM[2],0} + I_{\alpha,0} \quad (E6)$$

<<Period from Time T05 to Time T06>>

During a period from Time T05 to Time T06, a potential higher than the reference potential by $V_{X[1]}$ is supplied to the wiring CL[1]. At this time, the potential $V_{X[1]}$ is supplied to the second terminals of the capacitors C1 in the memory cell AM[1] and the memory cell AMref[1], so that the potentials of the gates of the transistors Tr12 increase.

The potential $V_{X[1]}$ corresponds to one piece of second data.

An increase in the potential of the gate of the transistor Tr12 corresponds to the potential obtained by multiplying a change in the potential of the wiring CL[1] by a capacitive coupling coefficient determined by the memory cell configuration. The capacitive coupling coefficient is calculated on the basis of the capacitance of the capacitor C1, the gate capacitance of the transistor Tr12, and the parasitic capacitance. In this operation example, to avoid complexity of description, an increase in the potential of the wiring CL[1] is equal to an increase in the potential of the gate of the transistor Tr12, which corresponds to a case where the capacitive coupling coefficient in each of the memory cell AM[1] and the memory cell AMref[1] is set to 1.

When the potential $V_{X[1]}$ is supplied to the second terminals of the capacitors C1 in the memory cell AM[1] and the memory cell AMref[1] on the assumption that the capacitive coupling coefficient is 1, the potentials of the node NM[1] and the node NMref[1] each increase by $V_{X[1]}$.

The current flowing from the second to first terminal of the transistor Tr12 in each of the memory cell AM[1] and the memory cell AMref[1] will be described. The current $I_{AM[1],1}$ flowing from the wiring BL to the first terminal of the transistor Tr12 in the memory cell AM[1] through the second terminal thereof can be expressed by the following formula.

[Formula 7]

$$I_{AM[1],1} = k(V_{PR} - V_{W[1]} + V_{X[1]} - V_{th})^2 \quad (E7)$$

In other words, by supplying the potential $V_{X[1]}$ to the wiring CL[1], the current flowing from the wiring BL to the first terminal of the transistor Tr12 in the memory cell AM[1] through the second terminal thereof increases by $I_{AM[1],1} - I_{AM[1],0}$ (denoted by $\Delta I_{AM[1]}$ in FIG. 14).

Similarly, the current $I_{AMref[1],1}$ flowing from the wiring BLref to the first terminal of the transistor Tr12 in the memory cell AMref[1] through the second terminal thereof can be expressed by the following formula.

[Formula 8]

$$I_{AMref[1],1} = k(V_{PR} + V_{X[1]} - V_{th})^2 \quad (E8)$$

In other words, by supplying the potential $V_{X[1]}$ to the wiring CL[1], the current flowing from the wiring Bref to the first terminal of the transistor Tr12 in the memory cell AMref[1] through the second terminal thereof increases by $I_{AMref[1],1} - I_{AMref[1],0}$ (denoted by $\Delta I_{AMref[1]}$ in FIG. 14).

When the current let out from the current mirror circuit CM through the wiring BLref is $I_{CM,1}$, the following formula is satisfied according to Kirchhoff's law.

[Formula 9]

$$I_{Cref} - I_{CM,1} = I_{AMref[1],1} + I_{AMref[2],1} \quad (E9)$$

When the current that flows from the wiring BL to the circuit OFST is $I_{\alpha,1}$, the following formula is satisfied according to Kirchhoff's law.

[Formula 10]

$$I_C - I_{CM,1} = I_{AM[1],1} + I_{AM[2],0} + I_{\alpha,1} \quad (E10)$$

Note that $\Delta I_\alpha$ represents the difference between a current $I_{\alpha,0}$ flowing from the wiring BL to the wiring OFST during the period from Time T04 to Time T05 and a current $I_{\alpha,1}$ flowing from the wiring BL to the wiring OFST during the period from Time T05 to Time T06. Hereinafter, $\Delta I_\alpha$ is referred to as a difference current in the product-sum operation circuit MAC. The difference current $\Delta I_\alpha$ can be expressed by the following formula, using Formulae (E1) to (E10).

[Formula 11]

$$\Delta I_\alpha = I_{\alpha,1} - I_{\alpha,0} = 2kV_{W[1]}V_{X[1]} \quad (E11)$$

<<Period from Time T06 to Time T07>>

During a period from Time T06 to Time T07, the ground potential is supplied to the wiring CL[1]. The ground potential is supplied to the second terminals of the capacitors Cl in the memory cell AM[1] and the memory cell AMref[1]. Thus, the potentials of the node NM[1] and the node NMref[1] return to the potentials during the period from Time T04 to Time T05.

<<Period from Time T07 to Time T08>>

During a period from Time T07 to Time T08, a potential higher than the reference potential by $V_{X[1]}$ is supplied to the wiring CL[1], and a potential higher than the reference potential by $V_{X[2]}$ is supplied to the wiring CL[2]. At this time, the potential $V_{X[1]}$ is supplied to the second terminals of the capacitors Cl in the memory cell AM[1] and the memory cell AMref[1] and the potential $V_{X[2]}$ is supplied to the second terminals of the capacitors Cl in the memory cell AM[2] and the memory cell AMref[2]. Consequently, the potentials of the gates of the transistors Tr12 in the memory cells AM[1], AM[2], AMref[1], and AMref[2] increase.

The current $I_{AM[2],1}$ flowing from the wiring BL to the first terminal of the transistor Tr12 in the memory cell AM[2] through the second terminal thereof can be expressed by the following formula.

[Formula 12]

$$I_{AM[2],1} = k(V_{PR} - V_{W[2]} + V_{X[2]} - V_{th})^2 \quad (E12)$$

Similarly, the current $I_{AMref[2],1}$ flowing from the wiring BLref to the first terminal of the transistor Tr12 in the memory cell AMref[2] through the second terminal thereof can be expressed by the following formula.

[Formula 13]

$$I_{AMref[2],1} = k(V_{PR} + V_{X[2]} + V_{th})^2 \quad (E13)$$

When the current let out from the current mirror circuit CM through the wiring BLref is $I_{CM,2}$, the following formula is satisfied according to Kirchhoff's law.

[Formula 14]

$$I_{Cref} - I_{CM,2} = I_{AMref[1],1} + I_{AMref[2],1} \quad (E14)$$

The current that flows from the wiring BL to the circuit OFST is $I_{\alpha,3}$, the following formula is satisfied according to Kirchhoff's law.

[Formula 15]

$$I_C - I_{CM,0,2} = I_{AM[1],1} + I_{AM[2],1} + I_{\alpha,3} \quad (E15)$$

The difference current AL, the difference between the current $I_{\alpha,0}$ flowing from the wiring BL to the wiring OFST during the period from Time T04 to Time T05 and a current $I_{\alpha,3}$ flowing from the wiring BL to the wiring OFST during the period from Time T07 to Time T08, can be expressed by the following formula, using Formulae (E1) to (E8) and (E12) to (E15).

[Formula 16]

$$\Delta I_\alpha = I_{\alpha,0} - I_{\alpha,3} = 2k(V_{W[1]}V_{X[1]} + V_{W[2]}V_{X[2]}) \quad (E16)$$

According to Formula (E16), the difference current $\Delta I_\alpha$ input to the circuit OFST is a value corresponding to the sum of products of the potential $V_W$, which is a plurality of pieces of first data, and the potential $V_X$, which is a plurality of pieces of second data. Thus, when the difference current $\Delta I_\alpha$ is measured by the circuit OFST, the value of the sum of products of the first data and the second data can be obtained.

<<Period from Time T08 to Time T09>>

During a period from Time T08 to Time T09, the reference potential is supplied to the wiring CL[1] and the wiring CL[2]. The reference potential is supplied to the second terminals of the capacitors Cl in the memory cells AM[1], AM[2], AMref[1], and AMref[2]. Thus, the potentials of the nodes NM[1], NM[2], NMref[1], and NMref[2] return to the potentials during the period from Time T06 to Time T07.

Although $V_{X[1]}$ is supplied to the wiring CL[1] during the period from Time T05 to Time T06 and $V_{X[1]}$ and $V_{X[2]}$ are supplied to the wiring CL[1] and the wiring CL[2], respectively, during the period from Time T07 to Time T08, potentials that are supplied to the wiring CL[1] and the wiring CL[2] may be lower than the reference potential REFP. In the case where a potential lower than the reference potential REFP is supplied to the wiring CL[1] and/or the wiring CL[2], the potential of a retention node of a memory cell connected to the wiring CL[1] and/or the wiring CL[2] can be decreased by capacitive coupling. Thus, multiplication of first data and one piece of second data, which is a negative value, can be performed in the product-sum operation. For example, in the case where $-V_{X[2]}$ instead of $V_{X[2]}$ is supplied to the wiring CL[2] during the period from Time T07 to Time T08, the difference current AJ can be expressed by the following formula.

[Formula 17]

$$\Delta I_\alpha = I_{\alpha,1} - I_{\alpha,3} = 2k(V_{W[1]}V_{X[1]} - V_{W[2]}V_{X[2]}) \quad (E17)$$

Although the memory cell array CA including memory cells arranged in a matrix of two rows and two columns is used in this operation example, a product-sum operation can be similarly performed in a memory cell array including memory cells arranged in a matrix of one row and two or more columns and a memory cell array including memory cells arranged in a matrix of three or more rows and three or more columns. In the product-sum operation circuit of this operation example, one of the plurality of columns of memory cells are used as memory cells for retaining reference data (potential $V_{PR}$), whereby the product-sum operation of the other columns of memory cells can be executed concurrently. That is, increasing the number of columns in a memory cell array of an arithmetic circuit enables the high-speed product-sum operation of the arithmetic circuit. Increasing the number of rows in a memory cell array allows an increase in the number of terms to be added to each other in the product-sum operation. The difference current $\Delta I_\alpha$ when the number of rows is increased can be expressed by the following formula.

[Formula 18]

$$\Delta I_\alpha = 2k \sum_i V_{W[i]} V_{X[i]} \quad (E18)$$

In the product-sum operation circuit described in this embodiment, the number of the rows of the memory cells AM in one layer corresponds to the number of neurons in the previous layer. In other words, the number of the rows of the memory cells AM in one layer corresponds to the number of output signals of the neurons in the previous layer that are input to the one layer. The number of the columns of the memory cells AM in one layer corresponds to the number of neurons in the next layer. In other words, the number of the columns of the memory cells AM in one layer corresponds to the number of output signals of the neurons that are output from the next layer. That is to say, the number of the rows and the number of the columns in one layer of the memory cell array of the product-sum operation circuit are determined depending on the number of neurons in the previous layer and the number of neurons in the next layer. Thus, in order to design a neural network, the number of the rows and the number of the columns of the memory cell array are determined depending on the desired configuration of the neural network.

This embodiment can be combined with any of the other embodiments as appropriate.

EMBODIMENT 4

In this embodiment, a power storage system including a plurality of storage batteries will be described.

A case will be described in which the power storage system 130 including a plurality of storage batteries as described in FIG. 1B includes a spare storage battery to be replaced with the storage battery whose operation is determined to be stopped.

Figure 15:
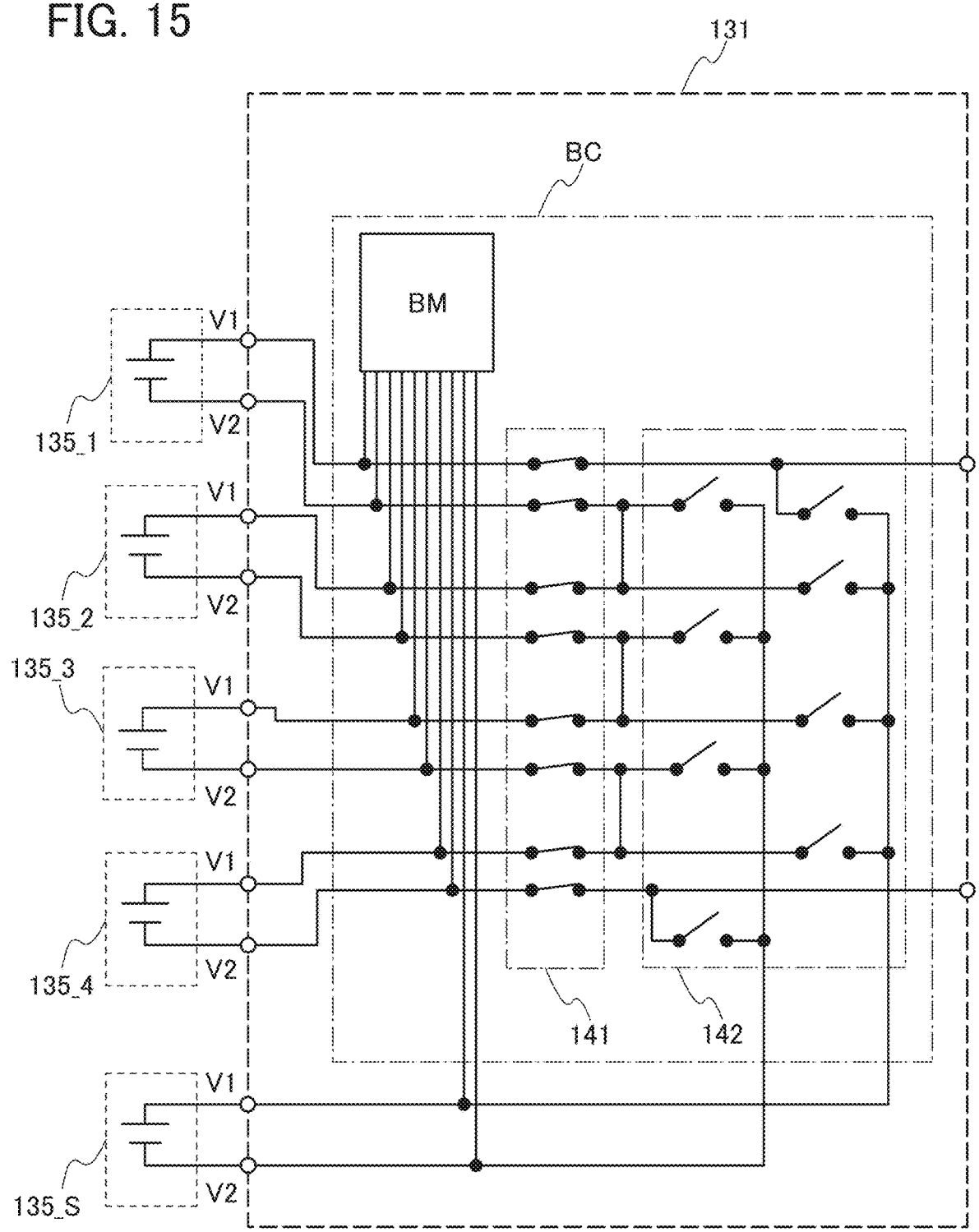
FIG. 15 illustrates a configuration example of a storage battery and a circuit.

FIG. 15 shows an example in which the storage batteries 135_1 to 135_4 are electrically connected to the control circuit 131. Note that in FIG. 15, both electrodes of the storage battery are electrically connected to the terminals V1 and V2 not through a protection circuit, and the terminals V1 and V2 are electrically connected to the control circuit 131. The control circuit 131 includes the circuit BC. The circuit BC includes a circuit BM. The circuit BM is electrically connected to the terminals V1 and V2 of the storage batteries. The circuit BM functions as a protection circuit of the storage batteries, for example. In the circuit BM, voltages of the storage batteries are preferably measured. The circuit BM preferably has a function of performing charging and discharging of the storage batteries.

It is preferable that the circuit BM include a comparator and the voltages of the storage batteries be compared by the comparator. For example, the circuit BM may compare the measured voltages of the storage batteries and may control the operation of the storage batteries in accordance with the comparison result. For example, a storage battery charged with high voltage compared to a storage battery charged with the lowest voltage may be stopped being charged. Alternatively, the storage battery charged with high voltage may be discharged until the voltage decreases to be close to the voltage of the storage battery charged with the lowest voltage. In the process of discharging, the released charge may be supplied to other storage batteries.

The terminals V1 and V2 are electrically connected to a switch group 141 in the circuit BC.

In FIG. 15, the storage batteries 135_1 to 135_4 are electrically connected in series.

In FIG. 15, a storage battery 135_S is a spare storage battery and electrically connected to the circuit BC. The terminals V1 and V2 connected to the storage battery 135_S are electrically connected to a switch group 142.

Figure 16:
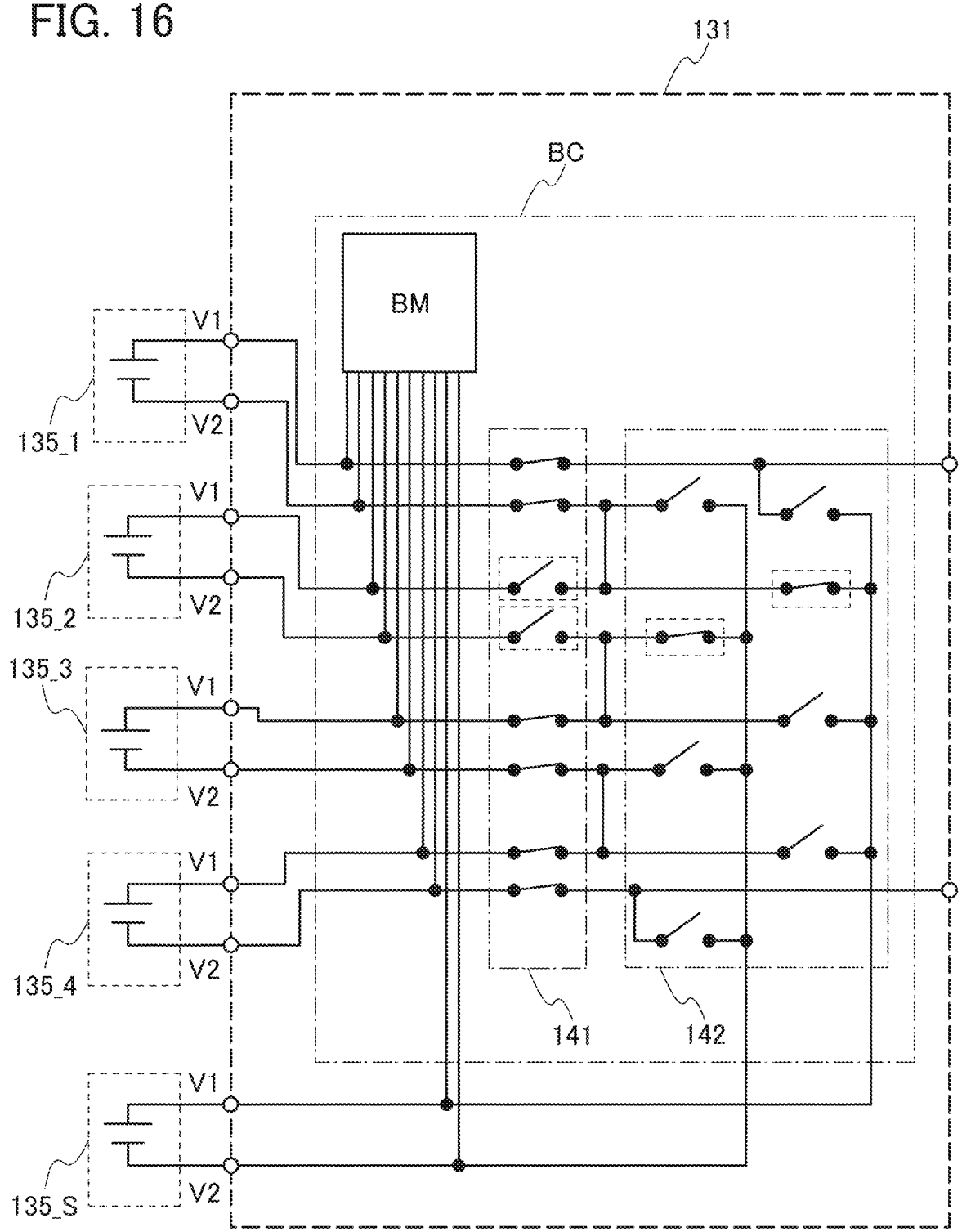
FIG. 16 illustrates a configuration example of a storage battery and a circuit.

A case in which the storage battery whose operation is determined to be stopped is replaced with the spare storage battery will be described with reference to FIG. 16. In FIG. 16, an example in which the storage battery 135_2 is replaced with the storage battery 135_S when the operation of the storage battery 135_2 is determined to be stopped by inference using the above-mentioned neural network NN.

In the switch group 141, the switches connected to the terminals V1 and V2 which is connected to the storage battery 135_2 are turned off.

In the switch group 142, the terminals V1 and V2 connected to the storage battery 135_S are electrically connected to the wiring of the row to which the storage battery 135_2 was connected. Through this operation, the storage battery 135_S is electrically connected to the storage batteries 135_1 and 135_3 in series.

Although FIGS. 15 and 16 show examples in each of which four storage batteries are connected in series, five or more storage batteries may be connected. Also in a case where the storage batteries are connected in parallel, the storage battery whose operation is determined to be stopped can be replaced with a spare battery.

This embodiment can be combined with any of the other embodiments as appropriate.

Embodiment 5

In this embodiment, examples of secondary batteries will be described.

[Cylindrical Secondary Battery]

Next, an example of a cylindrical secondary battery will be described with reference to FIGS. 17A and 17B. As illustrated in FIG. 17A, a cylindrical secondary battery 700 includes a positive electrode cap (battery cap) 701 on the top surface and a battery can (outer can) 702 on the side surface and bottom surface. The positive electrode cap 701 and the battery can 702 are insulated from each other by a gasket (insulating gasket) 710.

FIG. 17B is a diagram schematically illustrating a cross section of the cylindrical secondary battery. Inside the battery can 702 having a hollow cylindrical shape, a battery element in which a strip-like positive electrode 704 and a strip-like negative electrode 706 are wound with a strip-like separator 705 interposed therebetween is provided. Although not illustrated, the battery element is wound around a center pin. One end of the battery can 702 is close and the other end thereof is open. For the battery can 702, a metal having a corrosion-resistant property to an electrolytic solution, such as nickel, aluminum, or titanium, an alloy of such a metal, or an alloy of such a metal and another metal (e.g., stainless steel or the like) can be used. The battery can 702 is preferably covered by nickel, aluminum, or the like in order to prevent corrosion due to the electrolytic solution. Inside the battery can 702, the battery element in which the positive electrode, the negative electrode, and the separator are wound is provided between a pair of insulating plates 708 and 709 which face each other. Furthermore, a nonaqueous electrolytic solution (not illustrated) is injected inside the battery can 702 provided with the battery element. As the nonaqueous electrolytic solution, a nonaqueous electrolytic solution that is similar to those of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 703 is connected to the positive electrode 704, and a negative electrode terminal (negative electrode current collecting lead) 707 is connected to the negative electrode 706. Both the positive electrode terminal 703 and the negative electrode terminal 707 can be formed using a metal material such as aluminum. The positive electrode terminal 703 and the negative electrode terminal 707 are resistance-welded to a safety valve mechanism 712 and the bottom of the battery can 702, respectively. The safety valve mechanism 712 is electrically connected to the positive electrode cap 701 through a positive temperature coefficient (PTC) element 711. The safety valve mechanism 712 cuts off electrical connection between the positive electrode cap 701 and the positive electrode 704 when the internal pressure of the secondary battery exceeds a predetermined threshold value. The PTC element 711, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

Although examples of lithium-ion secondary batteries are described in this embodiment, one embodiment of the present invention is not limited to a lithium-ion secondary battery. As a positive electrode material of a secondary battery, a material containing an element A, an element X, and oxygen can be used, for example. The element A is preferably one or more elements selected from elements belonging to Group 1 and elements belonging to Group 2. Examples of the elements belonging to Group 1 include alkali metals such as lithium, sodium, and potassium. Examples of the elements belonging to Group 2 include calcium, beryllium, and magnesium. The element X can be, for example, one or more elements selected from a metal element, silicon, and phosphorus, and is preferably one or more elements selected from cobalt, nickel, manganese, iron, and vanadium. Typical examples of the positive electrode material include lithium-cobalt composite oxide ($LiCoO_2$) and lithium iron phosphate ($LiFePO_4$).

The negative electrode includes a negative electrode active material layer and a negative electrode current collector. The negative electrode active material layer may include a conductive additive and a binder.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g.

The secondary battery preferably includes a separator. As the separator, a fiber containing cellulose, such as paper; nonwoven fabric; a glass fiber; ceramics; a synthetic fiber containing nylon (polyamide), vinylon (polyvinyl alcohol based fiber), polyester, acrylic, polyolefin, or polyurethane; or the like can be used, for example.

Furthermore, the secondary battery preferably includes an electrolytic solution. The electrolytic solution preferably contains a solvent and an electrolyte. As the solvent of the electrolytic solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

The use of one or more kinds of ionic liquids (room temperature molten salts) which have features of non-flammability and non-volatility as a solvent of the electrolytic solution can prevent a secondary battery from exploding or catching fire even when the secondary battery internally shorts out or the internal temperature increases owing to overcharging or the like. In the case where a secondary battery is provided in an appliance such as a portable terminal and a vehicle, the appliance can possibly be used in the state where the user is close to the secondary battery. If the secondary battery explodes or catches fire, for example, the user's body would be in danger. When the solvent of the electrolytic solution contains an ionic liquid, users can more safely use a portable terminal, a vehicle, and the like each provided with the secondary battery. An ionic liquid contains a cation and an anion, specifically, an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_1Cl_2$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

As a solvent of the electrolytic solution used in the secondary battery, a mixed solvent of an organic solvent and an ionic liquid may be used.

The electrolytic solution used for a secondary battery is preferably highly purified and contains few dust particles and few elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate (VC), propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolytic solution. The concentration of such an additive agent in the whole solvent is, for example, higher than or equal to 0.1 wt % and lower than or equal to 5 wt %.

A polymer gelled electrolyte obtained in such a manner that a polymer is swelled with an electrolytic solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The polymer may be porous.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the storage battery is markedly increased.

As a secondary battery of one embodiment of the present invention, an all-solid-state battery can be used. The secondary battery of one embodiment of the present invention is composed of a plurality of laminated secondary batteries. FIG. 18D illustrates an example of a laminated secondary battery that is an all-solid-state battery.

The laminated secondary battery 500 illustrated in FIG. 18D includes a positive electrode lead electrode 510 and a negative electrode lead electrode 511.

A procedure for manufacturing the laminated secondary battery will be briefly described. First, a positive electrode and a negative electrode are prepared. The positive electrode includes a positive electrode current collector, and a surface of the positive electrode current collector is provided with a positive electrode active material layer. The positive electrode includes a region in which part of the positive electrode current collector is exposed (hereinafter, the region is referred to as a tab region). The negative electrode includes a negative electrode current collector, and a surface of the negative electrode current collector is provided with a negative electrode active material layer. The negative electrode includes a region in which part of the negative electrode current collector is exposed, i.e., a tab region.

Then, the negative electrode, a solid electrolyte layer, and the positive electrode are stacked. Here, an example including five negative electrodes and four positive electrodes will be described. After that, the tab regions of the positive electrodes are bonded to each other, and the positive electrode lead electrode 510 is bonded to the tab region of the outermost positive electrode. The bonding can be performed by ultrasonic welding, for example. In a similar manner, the tab regions of the negative electrodes are bonded to each other, and the negative electrode lead electrode 511 is bonded to the tab region of the outermost negative electrode.

Then, the negative electrode, the solid electrolyte layer, and the positive electrode are provided over an exterior body. The solid electrolyte layer may be a material layer containing a solid component with lithium-ion conductivity (e.g., a ceramic layer). As the solid electrolyte layer, for example, a sheet is formed using slurry made from ceramic powder or glass powder. Note that "ceramic" is defined as a metal or non-metal material of an inorganic compound such as an oxide, a carbide, a nitride, and a boride. Glass is defined as an amorphous material having a glass transition phenomenon, and microcrystalline glass may be called ceramic glass. Ceramic glass, which has crystallinity, can be identified by X-ray diffraction. Examples of the solid electrolyte include an oxide solid electrolyte and a sulfide solid electrolyte. Each of the positive electrode active material layer and the negative electrode active material layer also contains a solid electrolyte and may include a conductive additive. The conductive additive can be any material with electron conductivity, such as a carbon material and a metal material.

Examples of an oxide solid electrolyte used as a positive electrode active material include $Li_3PO_4$, $Li_3BO_3$, $Li_4SiO_4$, $Li_4GeO_4$, $LiNbO_3$, $LiVO_2$, $LiTiO_3$, and $LiZrO_3$. Other examples are composite compounds thereof, such as $Li_3BO_3$—$Li_4SiO_4$. At least part of the surface of the solid electrolyte may be covered with a coat layer with a thickness of 1 nm to 20 nm, inclusive. As a material of the coat layer, an oxide with lithium-ion conductivity is used.

Examples of an oxide solid electrolyte used as a negative electrode active material include $Nb_2O_5$, $Li_4Ti_5O_{12}$, and SiO. In this specification and the like, SiO refers, for example, to silicon monoxide. Note that SiO may be expressed as $SiO_x$, which refers to a material with a higher silicon content than $SiO_2$. Here, x preferably has an approximate value of 1. For example, x is preferably 0.2 or more and 1.5 or less, more preferably 0.3 or more and 1.2 or less.

Examples of a sulfide solid electrolyte used as a positive electrode active material include a material containing Li and S, such as $Li_7P_3S_{11}$, $Li_2S$—$SiS_2$, and $Li_2S$—$P_2S_5$.

Next, the exterior body is bent. Then, the outer edge of the exterior body is bonded. For the exterior body, a laminated film in which metal foil such as aluminum foil or stainless steel foil and an organic resin film are stacked can be used, for example. For the bonding, thermocompression bonding is performed, for example. In the above manner, the laminated secondary battery 500 illustrated in FIG. 18D can be fabricated. Although the bonding is performed using one laminated film in this example, two stacked laminated films may be sealed with the outer edges thereof attached with each other.

Figure 18A:
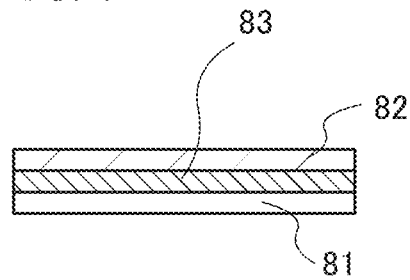
FIGS. 18A to 18C are cross-sectional views each illustrating an example of a secondary battery and FIG. 18D is a perspective view illustrating an example of a secondary battery.

FIG. 18A is a conceptual view of a solid-state battery including a solid electrolyte layer 83 between a positive electrode 81 and a negative electrode 82. Examples of the solid-state battery include a thin-film-type all-solid-state battery and a bulk-type all-solid-state battery. The thin-film-type all-solid-state battery is obtained by stacking thin films, and the bulk-type all-solid-state battery is obtained by depositing microscopic particles.

Figure 18B:
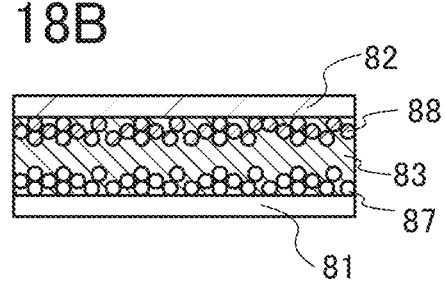

FIG. 18B is an example of a bulk-type all-solid battery including a positive electrode active material 87 in the form of particles near the positive electrode 81 and a negative electrode active material 88 in the form of particles near the negative electrode 82. The solid electrolyte layer 83 is provided to fill a space between the positive electrode active material 87 and the negative electrode active material 88. A space between the positive electrode 81 and the negative electrode 82 is filled with a plurality of kinds of particles by pressing.

Figure 18C:
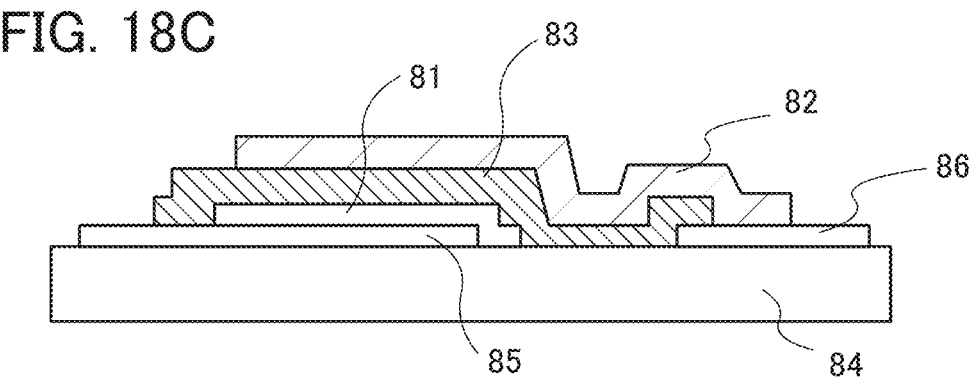
Figure 18D:
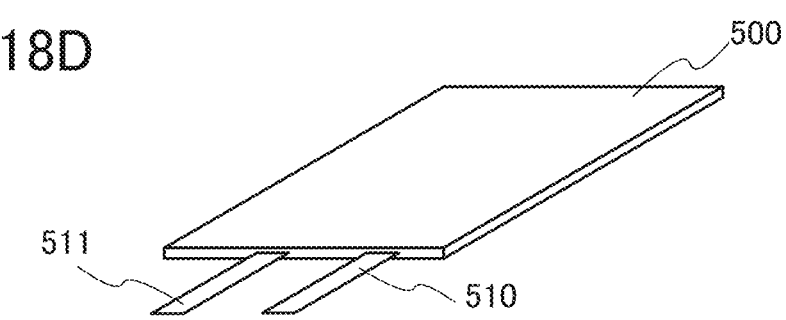

FIG. 18C illustrates an example of a thin-film-type all-solid-state battery. Components of the thin-film-type all-solid-state battery are deposited by a gas phase method (e.g., a vacuum deposition method, a spraying method, a pulsed laser deposition method, an ion plating method, a cold spray method, an aerosol deposition method, and a sputtering method). FIG. 18C illustrates an example of fabricating a lithium-ion storage battery in such a manner that wiring electrodes 85 and 86 are formed on a substrate 84, a positive electrode 81 is formed on the wiring electrode 85, the solid electrolyte layer 83 is formed on the positive electrode 81, the negative electrode 82 is formed on the solid electrolyte layer 83 and the wiring electrode 86. As the substrate 84, a ceramic substrate, a glass substrate, a plastic substrate, a metal substrate, and the like can be used.

This embodiment can be combined with any of the other embodiments as appropriate.

Embodiment 6

In this embodiment, examples of vehicles each including the power storage system of one embodiment of the present invention will be described. Examples of vehicles include an automobile, a motorcycle, and a bicycle.

The use of power storage systems in vehicles enables production of next-generation clean energy vehicles such as hybrid electric vehicles (HEVs), electric vehicles (EVs), and plug-in hybrid electric vehicles (PHEVs).

Figure 19A:
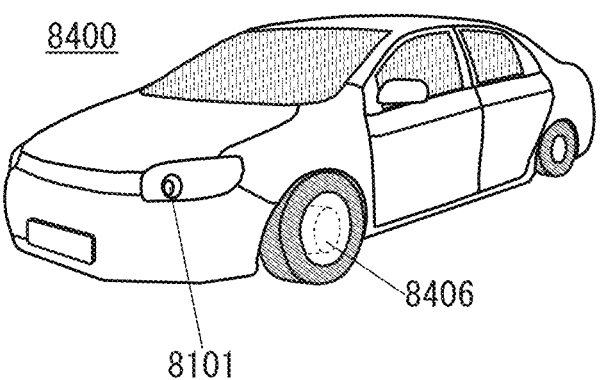
FIGS. 19A to 19C each illustrate an example of a vehicle.
Figure 19B:
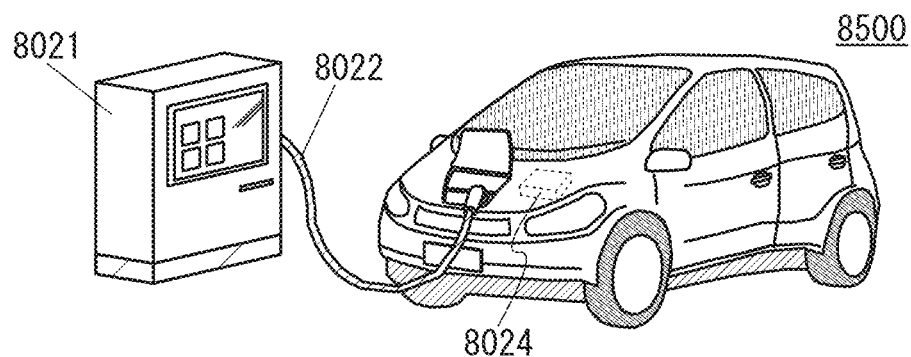
Figure 19C:
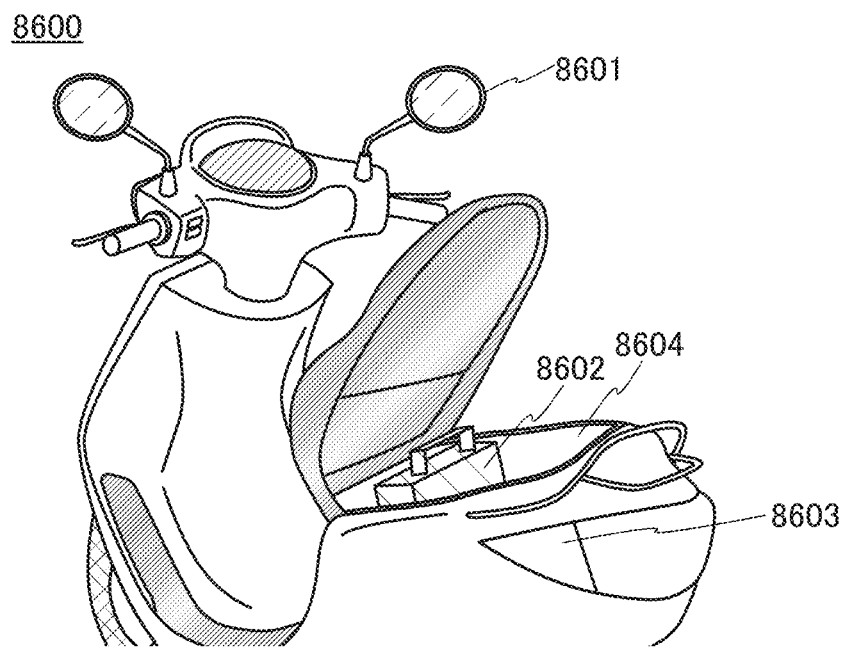

FIGS. 19A to 19C each illustrate an example of a vehicle using one embodiment of the present invention. An automobile 8400 illustrated in FIG. 19A is an electric vehicle that runs on the power of an electric motor. Alternatively, the automobile 8400 is a hybrid electric vehicle capable of driving appropriately using either an electric motor or an engine. The use of the secondary battery of one embodiment of the present invention allows fabrication of a high-mileage vehicle. The automobile 8400 includes the power storage system. The power storage system is used not only for driving an electric motor 8406, but also for supplying electric power to a light-emitting device such as a headlight 8401 or a room light (not illustrated).

The power storage system can also supply electric power to a display device of a speedometer, a tachometer, or the like included in the automobile 8400. Furthermore, the power storage system can supply electric power to a navigation system included in the automobile 8400.

FIG. 19B illustrates an automobile 8500 including a power storage system 8024. The automobile 8500 can be charged when the power storage system 8024 is supplied with electric power through external charging equipment by a plug-in system, a contactless power feeding system, or the like. In FIG. 19B, the power storage system 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage system 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage system when the automobile stops or moves. To supply electric power in such a contactless manner, an electromagnetic induction method or a magnetic resonance method can be used.

FIG. 19C shows an example of a motorcycle using the power storage system of one embodiment of the present invention. A motor scooter 8600 illustrated in FIG. 19C includes a power storage system 8602, side mirrors 8601, and indicators 8603. The power storage system 8602 can supply electric power to the indicators 8603.

Furthermore, in the motor scooter 8600 illustrated in FIG. 19C, the power storage system 8602 can be held in a storage unit under seat 8604. The power storage system 8602 can be held in the storage unit under seat 8604 even with a small size.

Figure 20A:
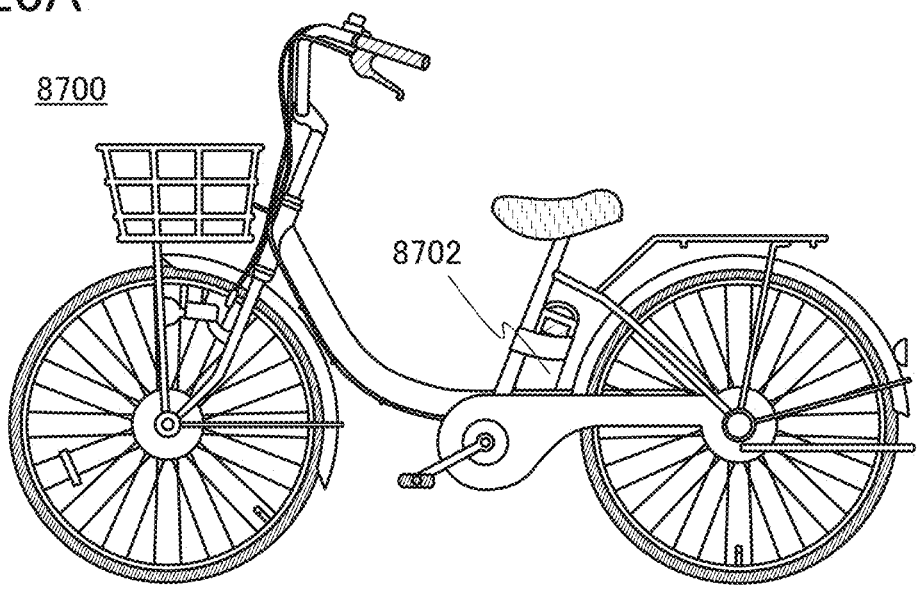
FIGS. 20A to 20C each illustrate an example of a vehicle.

FIG. 20A is an example of an electric bicycle using the power storage system of one embodiment of the present invention. The power storage system of one embodiment of the present invention can be used for an electric bicycle 8700 in FIG. 20A. The power storage system of one embodiment of the present invention includes a plurality of storage batteries, a plurality of protection circuits, and a neural network, for example.

Figure 20B:
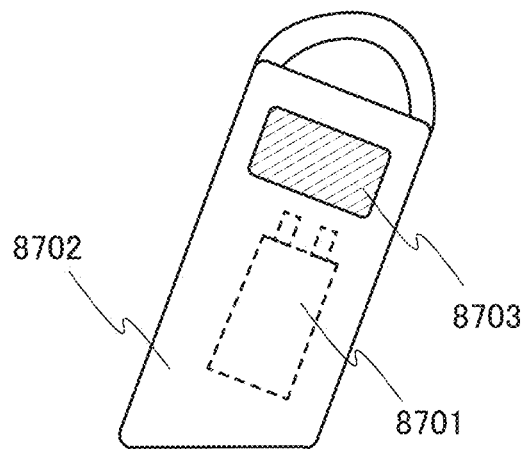

The electric bicycle 8700 is provided with a battery pack 8702. The battery pack 8702 can supply electric power to a motor that assists a rider. The battery pack 8702 is portable, and FIG. 20B shows the state where the battery pack 8702 is removed from the electric bicycle. The battery pack 8702 incorporates a plurality of storage batteries 8701 in the power storage system of one embodiment of the present invention, and can display the remaining battery level and the like on a display portion 8703. The battery pack 8702 preferably includes a protection circuit, a neural network, and the like.

Figure 20C:
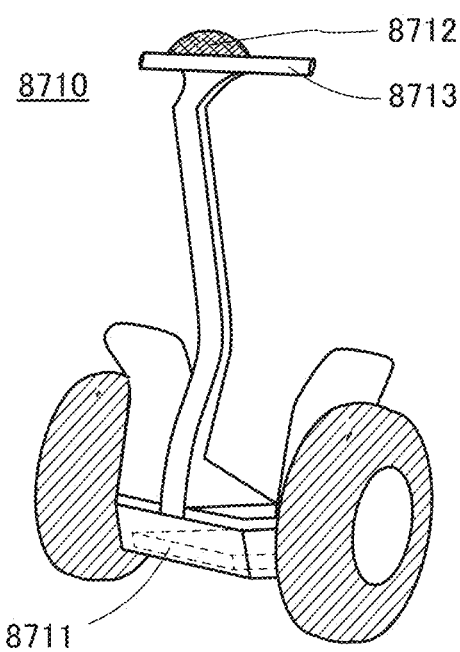

FIG. 20C illustrates an electric motorcycle 8710 using the power storage system of one embodiment of the present invention. The power storage system of one embodiment of the present invention can be used for the electric motorcycle 8710 in FIG. 20C. The power storage system of one embodiment of the present invention includes a plurality of storage batteries, a plurality of protection circuits, and a neural network, for example.

The electric motorcycle 8710 includes a storage battery 8711, a display portion 8712, and a steering wheel 8713. The storage battery 8711 can supply electric power to a motor serving as a power source. The display portion 8712 can display the remaining battery level of the storage battery 8711, the velocity and the horizontal state of the electric motorcycle 8710, and the like. The storage battery 8711 preferably includes a protection circuit, a neural network, and the like.

This embodiment can be combined with any of the other embodiments as appropriate.

Embodiment 7

Described in this embodiment are examples of an electronic device including the power storage system described in the above embodiments.

Figure 21A:
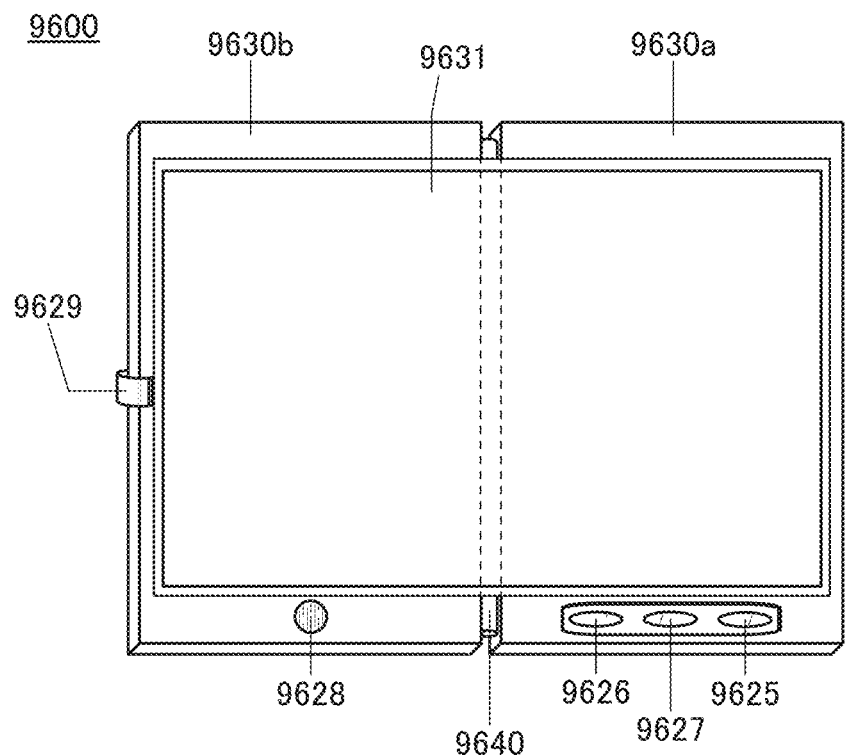
FIGS. 21A to 21C each illustrate an example of an electrical device.
Figure 21B:
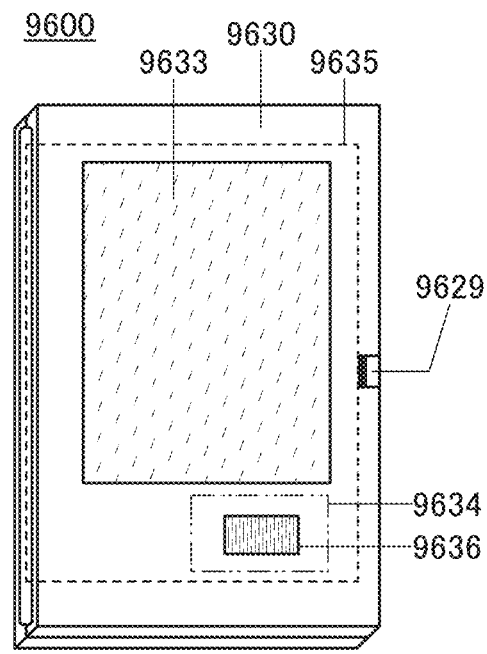

FIGS. 21A and 21B illustrate an example of a tablet terminal that can be folded in half. A tablet terminal 9600 illustrated in FIGS. 21A and 21B includes a housing 9630a, a housing 9630b, a movable portion 9640 connecting the housings 9630a and 9630b, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 21A illustrates the tablet terminal 9600 that is opened, and FIG. 21B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631 can be a touch panel region and data can be input when a displayed operation key is touched. A switching button for showing/hiding a keyboard of the touch panel is touched with a finger, a stylus, or the like, so that keyboard buttons can be displayed on the display portion 9631.

The display mode changing switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope or an acceleration sensor, may be incorporated in the tablet terminal, in addition to the optical sensor.

The tablet terminal is closed in FIG. 21B. The tablet terminal includes the housing 9630, a solar battery 9633, and a charge and discharge control circuit 9634 including a DCDC converter 9636. The power storage system of one embodiment of the present invention can be used as the power storage unit 9635.

As described in the above embodiments, the power storage system of one embodiment of the present invention preferably includes a storage battery, a protection circuit, a control circuit, and a neural network. The integrated circuits such as the control circuit, the neural network, and the protection circuit in the power storage system of one embodiment of the present invention may be mounted on an IC chip with a circuit that controls the display portion 9631, such as a driver circuit, for example. Alternatively, the integrated circuits may be mounted on an IC chip with the charge and discharge control circuit 9634.

The tablet terminal 9600 can be folded such that the housings 9630a and 9630b overlap with each other when not in use. Thus, the display portion 9631 can be protected, which increases the durability of the tablet terminal 9600.

The tablet terminal illustrated in FIGS. 21A and 21B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar battery 9633, which is attached on the surface of the tablet terminal, supplies electric power to a touch panel, a display portion, an image signal processor, and the like. Note that the solar battery 9633 can be provided on one or both surfaces of the housing 9630 and the power storage unit 9635 can be charged efficiently.

Figure 21C:
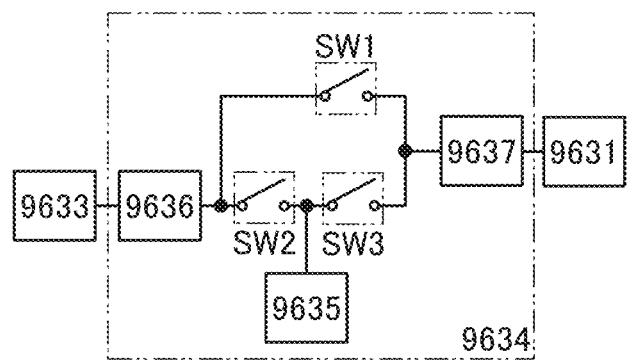

The structure and the operation of the charge and discharge control circuit 9634 illustrated in FIG. 21B will be described with reference to a block diagram in FIG. 21C. The solar battery 9633, the power storage unit 9635, the DCDC converter 9636, a converter 9637, switches SW1 to SW3, and the display portion 9631 are illustrated in FIG. 21C, and the power storage unit 9635, the DCDC converter 9636, the converter 9637, and the switches SW1 to SW3 correspond to the charge and discharge control circuit 9634 in FIG. 21B.

First, an example of the operation in the case where power is generated by the solar battery 9633 using external light is described. The voltage of electric power generated by the solar battery is raised or lowered by the DCDC converter 9636 to a voltage for charging the power storage unit 9635. When the power from the solar battery 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar battery 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module that transmits and receives power wirelessly (without contact) to charge the battery or with a combination of other charging means.

Figure 22A:
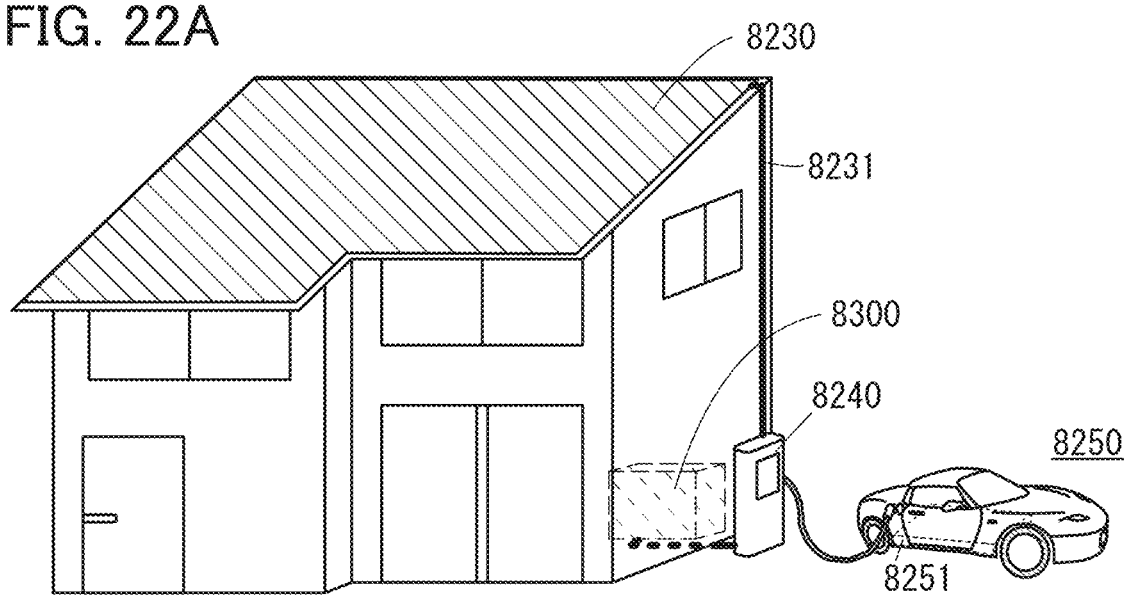
FIGS. 22A and 22B each illustrate an application example of a power storage system.
Figure 22B:
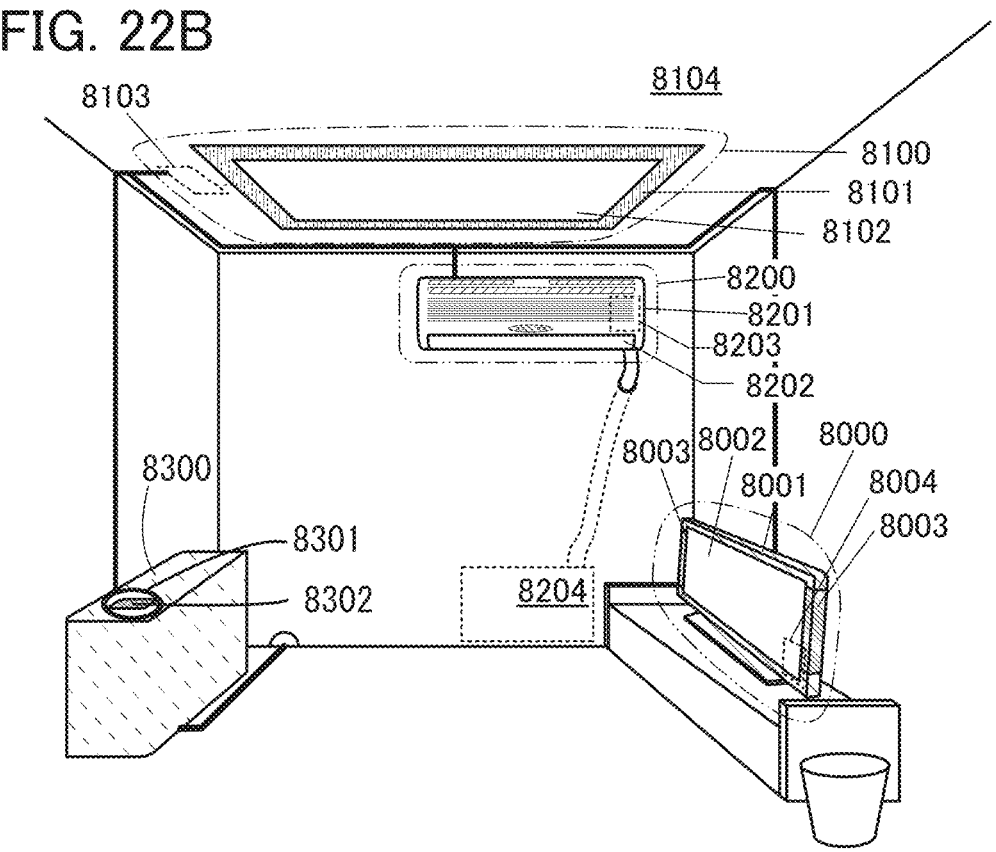

FIGS. 22A and 22B illustrate another example of a power storage system and electronic devices. In FIG. 22A, an example of a house including a power storage system 8300 corresponding to the power storage system of one embodiment of the present invention and a solar panel 8230. The house is preferably equipped with a ground-based charging apparatus 8240. The power storage system 8300 preferably includes a protection circuit, a control circuit, and a neural network.

The power storage system 8300, the solar panel 8230, and the charging apparatus 8240 are electrically connected to each other through a wiring 8231 and the like. The electric power generated by the solar panel 8230 can be supplied to the power storage system 8300. The electric power stored in the power storage system 8300 can be supplied to a storage battery 8251 included in an automobile 8250. Note that the automobile 8250 is an electric car or a plug-in hybrid car.

The electric power stored in the power storage system 8300 can be supplied to other electronic devices. For example, the electric power can be supplied to an installation lighting device 8100 that is connected to the power storage system 8300, as illustrated in FIG. 22B. The lighting device 8100 includes a housing 8101, a light source 8102, a control circuit 8103, and the like. The lighting device 8100 can receive electric power from a commercial power supply. Alternatively, the lighting device 8100 can use electric power stored in the power storage system 8300. Thus, the lighting device 8100 can be operated with the use of the power storage system 8300 corresponding to the power storage system of one embodiment of the present invention as an uninterruptible power supply even when electric power cannot be supplied from a commercial power supply due to power failure or the like.

The installation lighting device 8100 provided in a ceiling 8104 is illustrated in FIG. 22B as an example; however, the power storage system 8300 corresponding to the power storage system of one embodiment of the present invention can supply electric power, for example, to an installation lighting device provided in a wall, a floor, a window, or the like other than the ceiling. Alternatively, the power storage system 8300 can supply electric power to a tabletop lighting device or the like.

As the light source 8102, an artificial light source which emits light artificially by using electric power can be used. Specifically, an incandescent lamp or a discharge lamp such as a fluorescent lamp, and a light-emitting element such as an LED or an organic EL element are given as examples of the artificial light source.

Similarly, the power storage system 8300 can supply electric power to a display device 8000. The display device 8000 includes a housing 8001, a display portion 8002, a speaker portion 8003, a control circuit 8004, and the like. The display device 8000 can receive electric power from a commercial power supply. Alternatively, the display device 8000 can use electric power stored in the power storage system 8300. A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like other than TV broadcast reception.

Similarly, the power storage system 8300 can supply electric power to an air conditioner including an indoor unit 8200 and an outdoor unit 8204. The indoor unit 8200 includes a housing 8201, an air outlet 8202, a control circuit 8203, and the like. The air conditioner can receive electric power from a commercial power supply. Alternatively, the air conditioner can use electric power stored in the power storage system 8300.

Note that although the split-type air conditioner including the indoor unit and the outdoor unit is illustrated in FIG. 22B as an example, the power storage system of one embodiment of the present invention may supply electric power to an air conditioner in which the functions of an indoor unit and an outdoor unit are integrated in one housing.

In addition, the power storage system 8300 preferably includes a charging apparatus 8301. When the charging apparatus 8301 is included, a variety of electronic devices can be charged from the power storage system 8300. The charging apparatus 8301 may perform charging by wire or wirelessly (wireless charging is also referred to as non-contact charging or wireless power transmission). When the power storage system 8300 includes a wireless charging apparatus, a smartphone 8302 or the like provided with a wireless charging system can be charged.

FIGS. 23A to 23F illustrate examples of electronic devices including the power storage system of one embodiment of the present invention. Examples of the electronic devices to which a power storage battery of one embodiment of the present invention is applied include: television sets (also called TV or television receivers); monitors for computers or the like; cameras such as digital cameras or digital video cameras; digital photo frames; mobile phones (also called cellular phones or portable telephones); portable game machines; portable information terminals; audio playback devices; and large game machines such as pachinko machines.

Figure 23A:
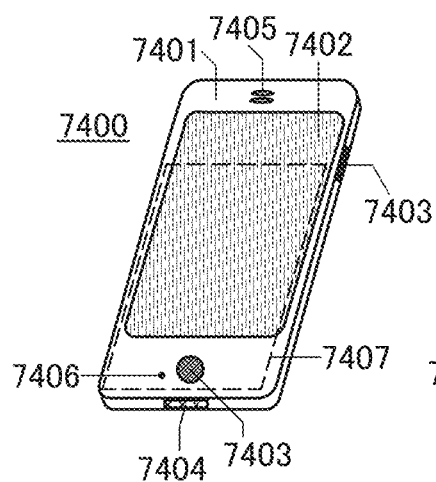
FIGS. 23A to 23F each illustrate an example of an electrical device.

FIG. 23A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage system of one embodiment of the present invention. The power storage system of one embodiment of the present invention includes a storage battery 7407, a protection circuit, a control circuit, and a neural network, for example.

Figure 23B:
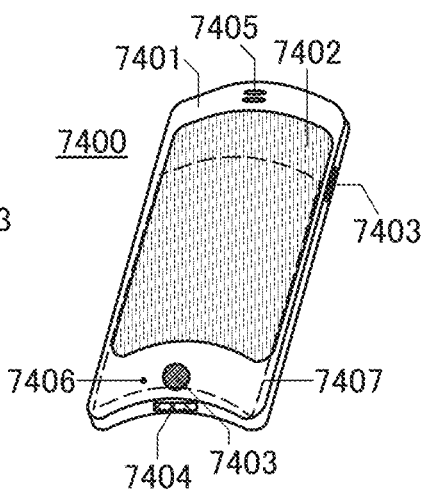
Figure 23C:
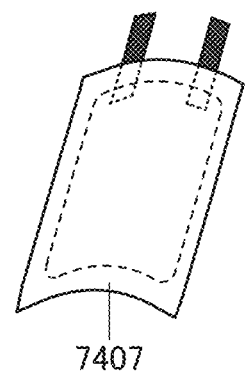

FIG. 23B illustrates the mobile phone 7400 that is bent. When the whole mobile phone 7400 is bent by the external force, the storage battery 7407 included in the mobile phone 7400 is also bent, in some cases. In that case, a flexible storage battery is preferably used as the storage battery 7407. FIG. 23C illustrates the flexible battery that is bent.

In addition, a flexible storage battery can be incorporated along a curved inside/outside wall surface of a house or a building or a curved interior/exterior surface of an automobile.

Figure 23D:
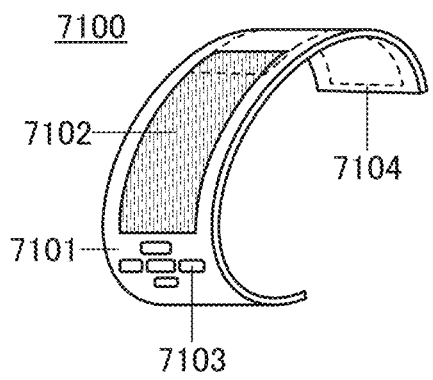

FIG. 23D illustrates an example of a bangle display device. A portable display device 7100 includes a housing 7101, a display portion 7102, an operation button 7103, and a power storage system of one embodiment of the present invention. The power storage system of one embodiment of the present invention includes a storage battery 7104, a protection circuit, a control circuit, and a neural network, for example.

Figure 23E:
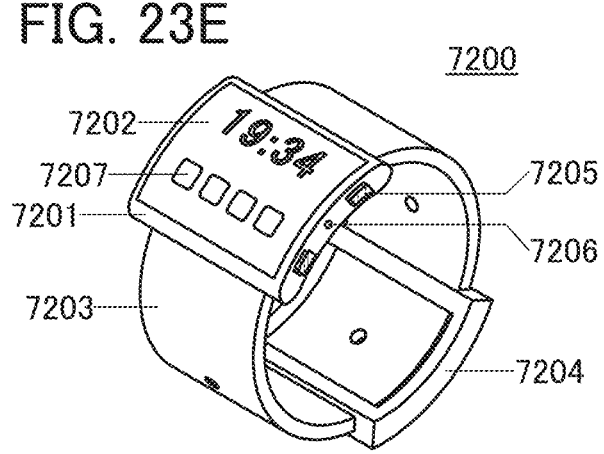

FIG. 23E illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is bent, and images can be displayed on the bent display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The portable information terminal 7200 includes the power storage system of one embodiment of the present invention.

A portable information terminal 7200 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

Figure 23F:
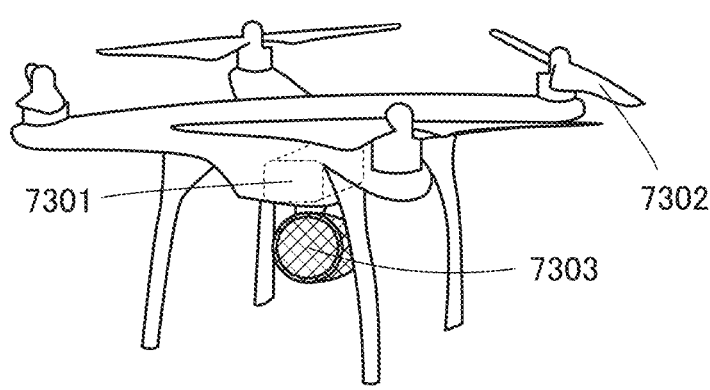

FIG. 23F illustrates an unmanned aircraft 7300 including a plurality of rotors 7302. The unmanned aircraft 7300 includes a power storage system 7301 corresponding to the power storage system of one embodiment of the present invention, a camera 7303, and an antenna (not illustrated). The unmanned aircraft 7300 can be remotely controlled through the antenna.

This embodiment can be combined with any of the other embodiments as appropriate.

Embodiment 8

In this embodiment, embodiments of a semiconductor device described in the above embodiments will be described with reference to FIGS. 24 and 25.

<Cross-Sectional Structure of Semiconductor Device 100>

Figure 24:
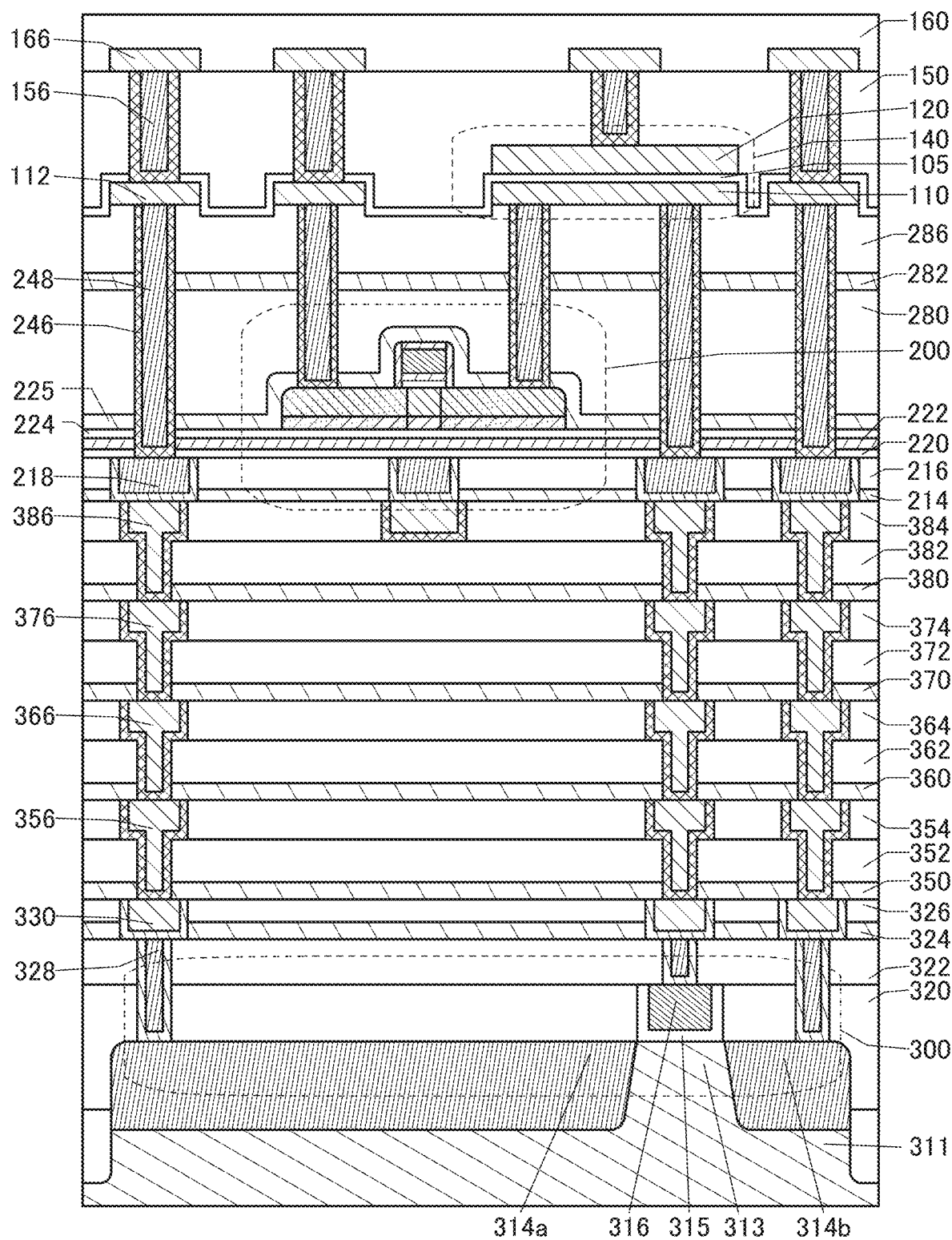
FIG. 24 is a cross-sectional view illustrating a structural example of a semiconductor device.

FIG. 24 is a cross-sectional view illustrating an example of a semiconductor device 100. The semiconductor device 100 includes a transistor 300, a transistor 200, and a capacitor 140. The transistor 200 is provided over the transistor 300 and the capacitor 140 is provided over the transistor 300 and the transistor 200.

The transistor 200 is an OS transistor including an oxide semiconductor in its channel formation region.

The transistor 300 is provided over a substrate 311 and includes a conductor 316, an insulator 315, a semiconductor region 313 that is a part of the substrate 311, and low-resistance regions 314a and 314b functioning as a source region and a drain region.

The transistor 300 may be a p-channel transistor or an n-channel transistor.

It is preferable that a region of the semiconductor region 313 where a channel is formed, a region in the vicinity thereof, the low-resistance regions 314a and 314b functioning as a source region and a drain region, and the like contain a semiconductor such as a silicon-based semiconductor, further preferably single crystal silicon. Alternatively, a material including germanium (Ge), silicon germanium (SiGe), gallium arsenide (GaAs), gallium aluminum arsenide (GaAlAs), or the like may be contained. Silicon whose effective mass is controlled by applying stress to the crystal lattice and thereby changing the lattice spacing may be contained.

The low-resistance regions 314a and 314b contain an element which imparts n-type conductivity, such as arsenic or phosphorus, or an element which imparts p-type conductivity, such as boron, in addition to a semiconductor material used for the semiconductor region 313.

The conductor 316 functioning as a gate electrode can be formed using a semiconductor material such as silicon containing the element which imparts n-type conductivity, such as arsenic or phosphorus, or the element which imparts p-type conductivity, such as boron, or a conductive material such as a metal material, an alloy material, or a metal oxide material.

In the transistor 300 illustrated in FIG. 24, the semiconductor region 313 (part of the substrate 311) in which a channel is formed has a protruding portion. Furthermore, the conductor 316 is provided to cover the top and side surfaces of the semiconductor region 313 with the insulator 315 positioned therebetween. Note that the conductor 316 may be formed using a material for adjusting the work function. The transistor 300 having such a structure is also referred to as a FIN transistor because the protruding portion of the semiconductor substrate is utilized. An insulator serving as a mask for forming the protruding portion may be provided in contact with a top surface of the protruding portion. Although the case where the protruding portion is formed by processing part of the semiconductor substrate is described here, a semiconductor film having a protruding shape may be formed by processing an SOI substrate.

Note that the transistor 300 illustrated in FIG. 24 is just an example and is not limited to the structure illustrated therein; an appropriate transistor may be used in accordance with a circuit configuration or a driving method.

An insulator 320, an insulator 322, an insulator 324, and an insulator 326 are stacked sequentially to cover the transistor 300.

The insulator 320, the insulator 322, the insulator 324, and the insulator 326 can be formed using, for example, silicon oxide, silicon oxynitride, silicon nitride oxide, silicon nitride, aluminum oxide, aluminum oxynitride, aluminum nitride oxide, aluminum nitride, or the like.

Note that in this specification, "silicon oxynitride" refers to a material that contains oxygen at a higher proportion than nitrogen, and "silicon nitride oxide" refers to a material that contains nitrogen at a higher proportion than oxygen. In addition, in this specification, "aluminum oxynitride" refers to a material that contains oxygen at a higher proportion than nitrogen, and "aluminum nitride oxide" refers to a material that contains nitrogen at a higher proportion than oxygen.

The insulator 322 may function as a planarization film for eliminating a level difference caused by the transistor 300 or the like underlying the insulator 322. For example, the top surface of the insulator 322 may be planarized by planarization treatment using a chemical mechanical polishing (CMP) method or the like to increase the level of planarity.

The insulator 324 is preferably formed using a film having a barrier property that prevents hydrogen or impurities from diffusing from the substrate 311, the transistor 300, or the like into a region where the transistor 200 is formed.

Note that the dielectric constant of the insulator 326 is preferably lower than that of the insulator 324. For example, the dielectric constant of the insulator 326 is preferably lower than 4, more preferably lower than 3. For example, the dielectric constant of the insulator 326 is preferably 0.7 times or less that of the insulator 324, further preferably 0.6 times or less that of the insulator 324. In the case where a material with a low dielectric constant is used as an interlayer film, the parasitic capacitance between wirings can be reduced.

A conductor 328, a conductor 330, and the like are provided in the insulator 320, the insulator 322, the insulator 324, and the insulator 326. Note that the conductor 328 and the conductor 330 each function as a plug or a wiring. Note that a plurality of structures of conductors functioning as plugs or wirings are collectively denoted by the same reference numeral in some cases. Furthermore, in this specification and the like, a wiring and a plug electrically connected to the wiring may be a single component. That is, there are cases where a part of a conductor functions as a wiring and a part of a conductor functions as a plug.

As a material of each of plugs and wirings (e.g., the conductor 328 and the conductor 330), a conductive material such as a metal material, an alloy material, a metal nitride material, or a metal oxide material can be used in a single-layer structure or a stacked-layer structure. It is preferable to use a high-melting-point material that has both heat resistance and conductivity, such as tungsten or molybdenum, and it is particularly preferable to use tungsten. Alternatively, a low-resistance conductive material such as aluminum or copper is preferably used. The use of a low-resistance conductive material can reduce wiring resistance.

A wiring layer may be provided over the insulator 326 and the conductor 330. For example, in FIG. 24, an insulator 350, an insulator 352, and an insulator 354, an insulator 360, an insulator 362, an insulator 364, an insulator 370, an insulator 372, an insulator 374, an insulator 380, an insulator 382, and an insulator 384 are stacked sequentially. Furthermore, a conductor 356, a conductor 366, a conductor 376, and a conductor 386 are formed in these insulators. These conductors function as plugs or wirings. Note that these conductors can be formed using a material similar to that used for forming the conductor 328 or the conductor 330.

Note that the insulator 350, the insulator 360, the insulator 370, and the insulator 380 are preferably formed using an insulator having a barrier property against hydrogen, like the insulator 324. Furthermore, the conductor 356, the conductor 366, the conductor 376, and the conductor 386 preferably include a conductor having a barrier property against hydrogen. For example, when focusing on the insulator 350 and the conductor 356, formation of the conductor 356 in an opening of the insulator 350 can prevent the diffusion of hydrogen from the transistor 300 to the transistor 200. The same can be applied to the other insulators and conductors.

Note that as the conductor having a barrier property against hydrogen, tantalum nitride may be used, for example. By stacking tantalum nitride and tungsten, which has high conductivity, diffusion of hydrogen from the transistor 300 can be prevented while the conductivity of a wiring is ensured.

An insulator 214 and an insulator 216 are stacked sequentially over the insulator 384. A material having a barrier property against oxygen or hydrogen is preferably used for any of the insulator 214 and the insulator 216.

The insulator 214 is preferably formed using, for example, a film having a barrier property that prevents hydrogen and impurities from diffusing from the substrate 311, a region where the transistor 300 is formed, or the like to a region where the transistor 200 is formed. Therefore, the insulator 214 can be formed using a material similar to that used for forming the insulator 324.

As the film having a barrier property against hydrogen, for example, as the insulator 214, a metal oxide such as aluminum oxide, hafnium oxide, or tantalum oxide is preferably used.

For example, the insulator 216 can be formed using a material similar to that used for forming the insulator 320. In the case where a material with a low dielectric constant is used as an interlayer film, the parasitic capacitance between wirings can be reduced. For example, a silicon oxide film, a silicon oxynitride film, or the like can be used as the insulator 216.

A conductor 218, a conductor (e.g., an electrode serving as a back gate) included in the transistor 200, and the like are provided in the insulators 214 and 216. The conductor 218 can be formed using a material similar to that used for forming the conductor 328 and the conductor 330.

The conductor 218 is preferably a conductor having a barrier property against oxygen, hydrogen, and water. In such a structure, the transistors 300 and 200 can be completely separated by the layer with a barrier property against oxygen, hydrogen, and water. As a result, the diffusion of hydrogen from the transistor 300 to the transistor 200 can be prevented.

The transistor 200 is provided over the insulator 216. Note that an OS transistor may be used as the transistor 200. The details of the transistor 200 will be described in Embodiment 9.

An insulator 280 is provided over the transistor 200. In the insulator 280, an excess-oxygen region is preferably formed. In particular, in the case of using an oxide semiconductor in the transistor 200, when an insulator including an excess-oxygen region is provided in an interlayer film or the like in the vicinity of the transistor 200, oxygen vacancies in an oxide 230 included in the transistor 200 are reduced, whereby the reliability can be improved. The insulator 280 covering the transistor 200 may function as a planarization film that covers a roughness thereunder. Note that the insulator 280 is provided in contact with an insulator 225 formed over the transistor 200.

As the insulator including the excess-oxygen region, specifically, an oxide material that releases part of oxygen by heating is preferably used. Oxide that releases part of oxygen by heating is an oxide film of which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in TDS analysis. Note that the temperature of the film surface in the TDS analysis is preferably higher than or equal to 100° C. and lower than or equal to 700° C., or higher than or equal to 100° C. and lower than or equal to 500° C.

For example, as such a material, a material containing silicon oxide or silicon oxynitride is preferably used. Alternatively, a metal oxide can be used.

An insulator 282 may be provided over the insulator 280. A material having a barrier property against oxygen or hydrogen is preferably used for the insulator 282. Thus, the insulator 282 can be formed using a material similar to that used for forming the insulator 214. As the insulator 282, metal oxide such as aluminum oxide, hafnium oxide, or tantalum oxide is preferably used, for example. For example, when the insulator 282 is formed by a sputtering method with the use of plasma including oxygen, oxygen can be added to the insulator 280 serving as a base layer of the insulator.

The insulator 286 is provided over the insulator 282. The insulator 286 can be formed using a material similar to that of the insulator 320. In the case where a material with a low dielectric constant is used as an interlayer film, the parasitic capacitance between wirings can be reduced. For example, a silicon oxide film, a silicon oxynitride film, or the like can be used for the insulator 286.

Conductors 246 and 248 and the like are provided in insulators 220, 222, 224, 225, 280, 282, and 286.

The conductors 246 and 248 can be formed using a material similar to those used for forming the conductors 328 and 330.

The capacitor 140 is provided above the transistor 200. The capacitor 140 includes a conductor 110, a conductor 120, and an insulator 105.

A conductor 112 may be provided over the conductors 246 and 248. The conductor 112 and the conductor 110 can be formed at the same time.

The conductor 112 and the conductor 110 can be formed using a metal film containing an element selected from molybdenum, titanium, tantalum, tungsten, aluminum, copper, chromium, neodymium, and scandium; a metal nitride film containing any of the above elements as its component (e.g., a tantalum nitride film, a titanium nitride film, a molybdenum nitride film, or a tungsten nitride film); or the like. Alternatively, a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can also be used.

The conductor 112 and the conductor 110 each have a single-layer structure in FIG. 24; however, one embodiment of the present invention is not limited thereto, and a stacked-layer structure of two or more layers may be used. For example, between a conductor having a barrier property and a conductor having high conductivity, a conductor which is highly adhesive to the conductor having a barrier property and the conductor having high conductivity may be formed.

As a dielectric of the capacitor 140, the insulator 105 is provided over the conductors 112 and 110. The insulator 105 can be formed to have a single-layer structure or a stacked-layer structure using, for example, silicon oxide, silicon oxynitride, silicon nitride oxide, silicon nitride, aluminum oxide, aluminum oxynitride, aluminum nitride oxide, aluminum nitride, hafnium oxide, hafnium oxynitride, hafnium nitride oxide, hafnium nitride, or the like.

For example, a material with high dielectric strength, such as silicon oxynitride, is preferably used for the insulator 105. In the capacitor 140 having the structure, the dielectric strength can be increased and the electrostatic breakdown of the capacitor 140 can be prevented owing to the insulator 105.

Over the insulator 105, the conductor 120 is provided so as to overlap with the conductor 110. Note that the conductor 120 can be formed using a conductive material such as a metal material, an alloy material, or a metal oxide material. It is preferable to use a high-melting-point material which has both heat resistance and conductivity, such as tungsten or molybdenum, and it is particularly preferable to use tungsten. In the case where the conductor 120 is formed concurrently with another component such as a conductor, Cu (copper), Al (aluminum), or the like which is a low-resistance metal material may be used.

An insulator 150 is provided over the conductor 120 and the insulator 105. The insulator 150 can be formed using a material similar to that used for forming the insulator 320. The insulator 150 may function as a planarization film that covers roughness thereunder.

A conductor 156 is provided in the insulator 150. Note that the conductor 156 can be formed using a material similar to that used for forming the conductor 328 and the conductor 330.

A conductor 166 is also provided over the conductor 156. In addition, an insulator 160 is provided over the conductor 166 and the insulator 150. The insulator 160 may function as a planarization film that covers a roughness thereunder.

The above is the description of the structure example. With the use of the structure, a change in electrical characteristics can be reduced and reliability can be improved in a semiconductor device including an OS transistor. The power consumption of a semiconductor device including an OS transistor can be reduced. Miniaturization or high integration of a semiconductor device including an OS transistor can be achieved. Alternatively, a miniaturized or highly integrated semiconductor device can be provided with high productivity.

<Modification Example of Semiconductor Device 100>

Figure 25:
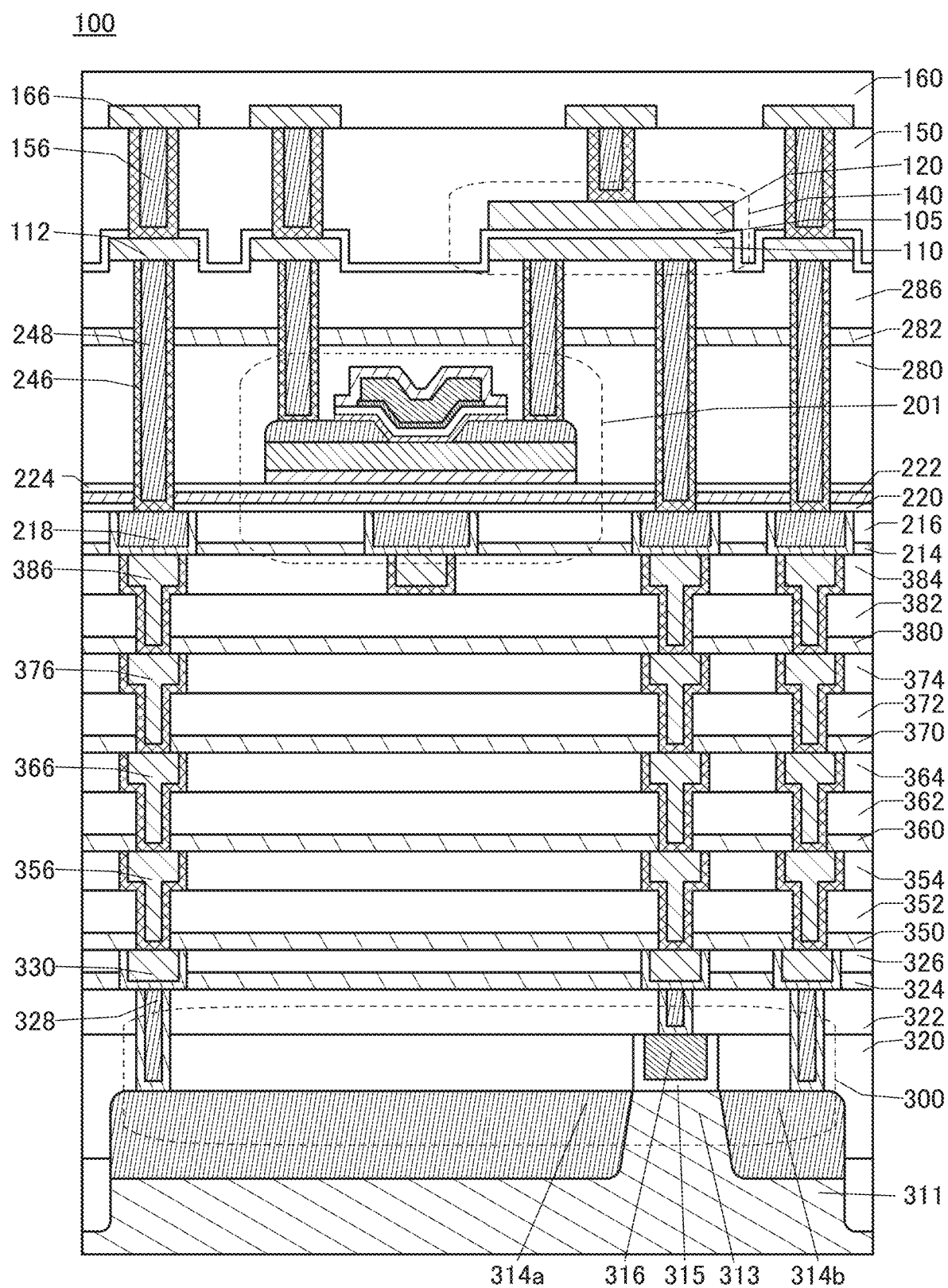
FIG. 25 is a cross-sectional view illustrating a structural example of semiconductor devices.

FIG. 25 illustrates a modification example of this embodiment.

FIG. 25 is a schematic cross-sectional view in which the transistor 200 illustrated in FIG. 24 is replaced with a transistor 201. Like the transistor 200, the transistor 201 is an OS transistor. Note that the details of the transistor 201 will be described in Embodiment 9.

For the details of the other components in FIG. 25, the description of FIG. 24 can be referred to.

Note that this embodiment can be combined with any of the other embodiments in this specification as appropriate.

Embodiment 9

In this embodiment, the details of the transistor 200 and the transistor 201 in Embodiment 8 are described with reference to FIGS. 26A to 26C and FIGS. 27A to 27C.

<Transistor 200>

First, the details of the transistor 200 illustrated in FIGS. 24A to 24C will be described.

Figure 26A:
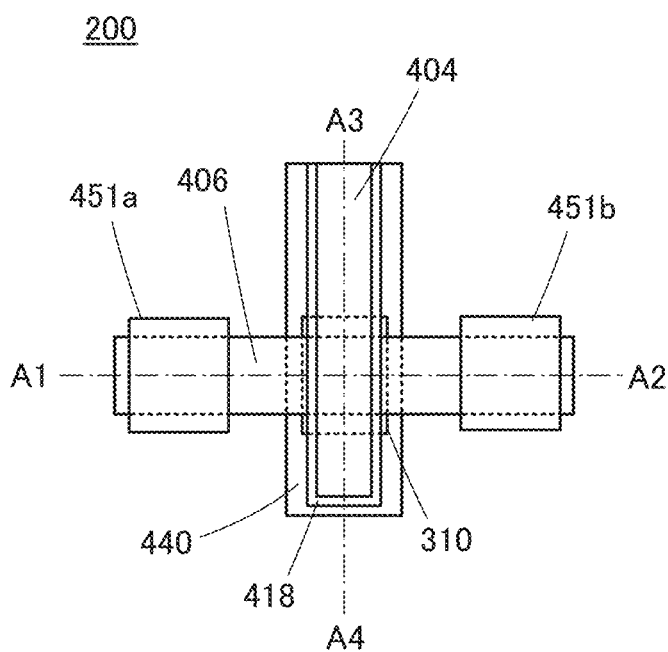
FIGS. 26A to 26C are a top view and cross-sectional views illustrating a structure example of a transistor.
Figure 26C:
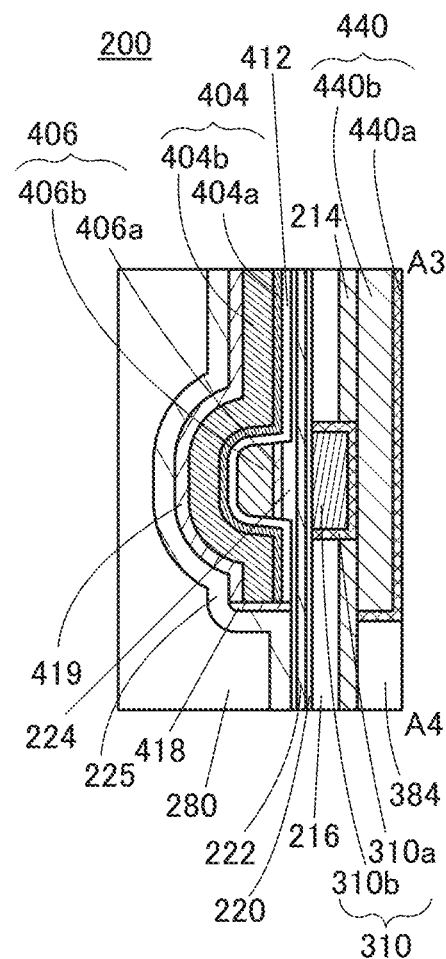
Figure 26B:
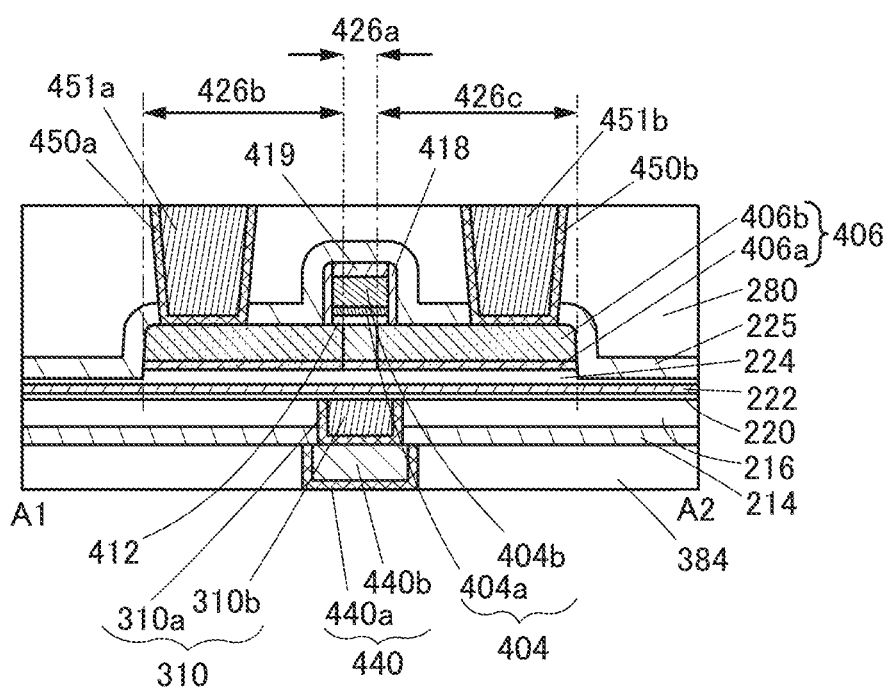

FIG. 26A is a top view of a semiconductor device including the transistor 200. FIG. 26B is a cross-sectional view taken along dashed-dotted line A1-A2 in FIG. 26A, which corresponds to a cross-sectional view in the channel length direction of the transistor 200. FIG. 26C is a cross-sectional view taken along dashed-dotted line A3-A4 in FIG. 26A, which corresponds to a cross-sectional view in the channel width direction of the transistor 200. For simplification of the drawing, some components are not illustrated in the top view in FIG. 26A.

As illustrated in FIGS. 26A to 26C, the transistor 200 includes an insulator 224 over a substrate (not illustrated), a metal oxide 406a over the insulator 224, a metal oxide 406b in contact with at least part of a top surface of the metal oxide 406a, an insulator 412 over the metal oxide 406b, a conductor 404a over the insulator 412, a conductor 404b over the conductor 404a, an insulator 419 over the conductor 404b, an insulator 418 in contact with side surfaces of the insulator 412, the conductor 404a, the conductor 404b, and the insulator 419, and the insulator 225 in contact with a top surface of the metal oxide 406b and a side surface of the insulator 418. Here, as illustrated in FIG. 26B, a top surface of the insulator 418 is preferably substantially aligned with a top surface of the insulator 419. Furthermore, the insulator 225 is preferably provided to cover the insulator 419, the conductor 404, the insulator 418, and the metal oxide 406.

In the following description, the metal oxide 406a and the metal oxide 406b are collectively referred to as the metal oxide 406 in some cases. Although the metal oxide 406a and the metal oxide 406b are stacked in the transistor 200, one embodiment of the present invention is not limited to this structure. For example, only the metal oxide 406b may be provided. Furthermore, the conductor 404a and the conductor 404b may be collectively referred to as a conductor 404. Although the conductor 404a and the conductor 404b are stacked in the transistor 200, one embodiment of the present invention is not limited to this structure. For example, only the conductor 404b may be provided.

A conductor 440 includes a conductor 440a and a conductor 440b. The conductor 440a is in contact with an inner wall of an opening of the insulator 384 and the conductor 440b is positioned inside the conductor 440a. Here, the top surfaces of the conductors 440a and 440b can be at substantially the same level as the top surface of the insulator 384. Although the conductor 440a and the conductor 440b are stacked in the transistor 200, one embodiment of the present invention is not limited to this structure. For example, only the conductor 440b may be provided.

A conductor 310 includes a conductor 310a and a conductor 310b. The conductor 310a is in contact with an inner wall of an opening of the insulators 214 and 216, and the conductor 310b is positioned inside the conductor 310a. Thus, a structure in which the conductor 310a is in contact with the conductor 440b is preferable. Here, the top surfaces of the conductors 310a and 310b can be at substantially the same level as the top surface of the insulator 216. Although the conductor 310a and the conductor 310b are stacked in the transistor 200, one embodiment of the present invention is not limited to this structure. For example, only the conductor 310b may be provided.

The conductor 404 can function as a top gate, and the conductor 310 can function as a back gate. The potential of the back gate can be the same as the potential of the top gate, the ground potential, or an arbitrary potential. By changing the potential of the back gate independently of the potential of the top gate, the threshold voltage of the transistor can be changed.

The conductor 440 extends in the channel width direction in a manner similar to that of the conductor 404, and functions as a wiring through which a potential is applied to the conductor 310, i.e., the back gate. When the conductor 310 is stacked over the conductor 440 functioning as the wiring for the back gate so as to be embedded in the insulators 214 and 216, the insulators 214 and 216 and the like are positioned between the conductor 440 and the conductor 404, reducing the parasitic capacitance between the conductor 440 and the conductor 404 and thereby increasing the withstand voltage. The reduction in the parasitic capacitance between the conductor 440 and the conductor 404 can improve the switching speed of the transistor, so that the transistor can have high frequency characteristics. The increase in the withstand voltage between the conductor 440 and the conductor 404 can improve the reliability of the transistor 200. Therefore, the thicknesses of the insulator 214 and the insulator 216 are preferably large. Note that the extending direction of the conductor 440 is not limited to this example; for example, the conductor 440 may extend in the channel length direction of the transistor 200.

Here, it is preferable to use conductive materials that have a function of inhibiting the passage of impurities such as water or hydrogen or hardly transmit such impurities for the conductor 310a and the conductor 440a. For example, tantalum, tantalum nitride, ruthenium, ruthenium oxide, or the like is preferably used, and a single layer or stacked layers may be used. Owing to this, diffusion of impurities such as water or hydrogen from a lower layer into an upper layer through the conductors 440 and 310 can be inhibited. Note that it is preferable that the conductors 310a and 440a have a function of inhibiting the passage of at least one of impurities such as a hydrogen atom, a hydrogen molecule, a water molecule, an oxygen atom, an oxygen molecule, a nitrogen atom, a nitrogen molecule, a nitrogen oxide molecule (e.g., $N_2O$, NO, and $NO_2$), and a copper atom and oxygen (e.g., an oxygen atom or an oxygen molecule). Furthermore, in the following description, the same applies to a conductive material having a function of inhibiting the passage of impurities. When the conductors 310a and 440a have a function of inhibiting the passage of oxygen, the conductivity of the conductors 310b and 440b can be prevented from being lowered because of oxidation.

The conductor 310b is preferably formed using a conductive material containing tungsten, copper, or aluminum as its main component. The conductor 440b, which serves as a wiring, is preferably formed using a conductor having a higher conductivity than the conductor 310b; a conductive material containing copper or aluminum as its main component can be used, for example. Although not illustrated, the conductor 310b and the conductor 440b may have a stacked-layer structure, and for example, stacked layers of titanium, titanium nitride, and the above-described conductive material may be formed.

The insulator 214 can function as a barrier insulating film for preventing impurities such as water or hydrogen from entering the transistor from a lower layer. Note that it is preferable that the insulator 214 have a function of inhibiting the passage of at least one of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Furthermore, for the insulator 214, an insulating material having a function of inhibiting the passage of oxygen (e.g., an oxygen atom or an oxygen molecule) is preferably used. With this material, oxygen contained in the insulator 224 or the like can be inhibited from diffusing into lower layers.

Furthermore, with the structure in which the conductor 310 is stacked over the conductor 440, the insulator 214 can be provided between the conductor 440 and the conductor 310. Here, even when a metal that is easily diffused, such as copper, is used as the conductor 440b, silicon nitride or the like provided as the insulator 214 can prevent diffusion of the metal to a layer positioned above the insulator 214.

The insulator 222 is preferably formed using an insulating material that has a function of inhibiting the passage of oxygen and impurities such as water or hydrogen. Accordingly, diffusion of impurities such as water or hydrogen from a layer below the insulator 222 to a layer above the insulator 222 can be inhibited. Furthermore, oxygen contained in the insulator 224 or the like can be inhibited from diffusing into lower layers.

Furthermore, the concentration of impurities such as water, hydrogen, or nitrogen oxide in the insulator 224 is preferably lowered. The amount of hydrogen released from the insulator 224 that is converted into hydrogen molecules per unit area of the insulator 224 is less than or equal to $2\times10^{15}$ molecules/cm$^2$, preferably less than or equal to $1\times10^{15}$ molecules/cm$^2$, further preferably less than or equal to $5\times10^{14}$ molecules/cm$^2$ in thermal desorption spectroscopy (TDS) analysis in a film-surface-temperature range from 50° C. to 500° C., for example. Moreover, the insulator 224 is preferably formed using an insulator from which oxygen is released by heating.

The insulator 412 can function as a first gate insulating film, and the insulator 220, the insulator 222, and the insulator 224 can function as a second gate insulating film. Although the insulator 220, the insulator 222, and the insulator 224 are stacked in the transistor 200, the present invention is not limited to this structure. For example, any two of the insulators 220, 222, and 224 may be stacked, or any one of the insulators may be used.

The metal oxide 406 is preferably formed using a metal oxide functioning as an oxide semiconductor. The metal oxide preferably has an energy gap of 2 eV or more, preferably 2.5 eV or more. With the use of a metal oxide having such a wide energy gap, the off-state current of the transistor can be reduced.

A transistor formed using a metal oxide has an extremely low leakage current in an off state; thus, a semiconductor device with low power consumption can be provided. A metal oxide can be formed by a sputtering method or the like and thus can be used in a transistor included in a highly integrated semiconductor device.

The metal oxide 406 preferably contains at least indium or zinc. In particular, indium and zinc are preferably contained. In addition, aluminum, gallium, yttrium, tin, or the like is preferably contained. Furthermore, one or more elements selected from boron, silicon, titanium, iron, nickel, germanium, zirconium, molybdenum, lanthanum, cerium, neodymium, hafnium, tantalum, tungsten, magnesium, or the like may be contained.

Here, the case where the metal oxide 406 is an In-M-Zn oxide containing indium, an element M, and zinc is considered. The element M is aluminum, gallium, yttrium, tin, or the like. Other elements that can be used as the element M include boron, silicon, titanium, iron, nickel, germanium, zirconium, molybdenum, lanthanum, cerium, neodymium, hafnium, tantalum, tungsten, and magnesium. Note that two or more of the above elements may be used in combination as the element M.

Note that in this specification and the like, a metal oxide including nitrogen is also called a metal oxide in some cases. Moreover, a metal oxide including nitrogen may be called a metal oxynitride.

Here, the atomic ratio of the element M to the constituent elements of the metal oxide used as the metal oxide 406a is preferably greater than that of the metal oxide used as the metal oxide 406b. Moreover, the atomic ratio of the element M to In in the metal oxide used as the metal oxide 406a is preferably greater than that in the metal oxide used as the metal oxide 406b. Furthermore, the atomic ratio of In to the element M in the metal oxide used as the metal oxide 406b is preferably greater than that in the metal oxide used as the metal oxide 406a.

It is preferable that by using the above metal oxide as the metal oxide 406a, the energy of the conduction band minimum of the metal oxide 406a be higher than the energy of the conduction band minimum of a region of the metal oxide 406b where the energy of the conduction band minimum is low. In other words, the electron affinity of the metal oxide 406a is preferably smaller than the electron affinity of the region of the metal oxide 406b where the energy of the conduction band minimum is low.

Here, the energy level of the conduction band minimum gradually changes in the metal oxides 406a and 406b. In other words, the energy level of the conduction band minimum is continuously varied or continuously connected. To obtain such an energy level, the density of defect states in a mixed layer formed at an interface between the metal oxides 406a and 406b is preferably made low.

Specifically, when the metal oxides 406a and 406b contain the same element (as a main component) in addition to oxygen, a mixed layer with a low density of defect states can be formed. For example, in the case where the metal oxide 406b is an In—Ga—Zn oxide, it is preferable to use an In—Ga—Zn oxide, a Ga—Zn oxide, gallium oxide, or the like as the metal oxide 406a.

At this time, a narrow-gap portion formed in the metal oxide 406b serves as a main carrier path. Since the density of defect states at the interface between the metal oxides 406a and 406b can be made low, the influence of interface scattering on carrier conduction is small, and a high on-state current can be obtained.

Furthermore, the metal oxide 406 includes a region 426a, a region 426b, and a region 426c. As illustrated in FIG. 26B, the region 426a is sandwiched between the region 426b and the region 426c. The region 426b and the region 426c are regions having reduced resistance owing to the formation of the insulator 225 and thereby have higher conductivity than the region 426a. An impurity element such as hydrogen or nitrogen included in the atmosphere for forming the insulator 225 is added to the region 426b and the region 426c. Thus, owing to the added impurity element, oxygen vacancies are generated mainly in the regions of the metal oxide 406b that overlap with the insulator 225, and furthermore the impurity element enters the oxygen vacancies, which increases the carrier density and decreases the resistance.

Thus, it is preferable that the concentration of at least one of hydrogen and nitrogen be higher in the regions 426b and 426c than in the region 426a. The concentration of hydrogen or nitrogen can be measured by secondary ion mass spectrometry (SIMS) or the like. Here, the concentration of hydrogen or nitrogen in the middle of the region of the metal oxide 406b that overlaps with the insulator 412 (e.g., a portion in the metal oxide 406b which is located equidistant from both side surfaces in the channel length direction of the insulator 412) is measured as the concentration of hydrogen or nitrogen in the region 426a.

The regions 426b and 426c are reduced in resistance when an element forming an oxygen vacancy or an element bonded to an oxygen vacancy is added thereto. Typical examples of the element are hydrogen, boron, carbon, nitrogen, fluorine, phosphorus, sulfur, chlorine, titanium, and a rare gas element. Typical examples of the rare gas element are helium, neon, argon, krypton, and xenon. Accordingly, the regions 426b and 426c are made to include one or more of the above elements.

Furthermore, it is preferable in the metal oxide 406a that the atomic ratio of In to the element M in the regions 426b and 426c be substantially the same as that in the metal oxide 406b. In other words, in the metal oxide 406a, the atomic ratio of In to the element M in the region 426b and the region 426c is preferably larger than that in the region 426a. Here, when the indium content in the metal oxide 406 is increased, the carrier density is increased and the resistance can be decreased. With this structure, even when the thickness of the metal oxide 406b is small and electric resistance of the metal oxide 406b is high in the manufacturing process of the transistor 200, the region 426b and the region 426c in the metal oxide 406 can function as a source region and a drain region owing to the sufficiently reduced resistance of the metal oxide 406a in the region 426b and the region 426c.

Figure 27A:
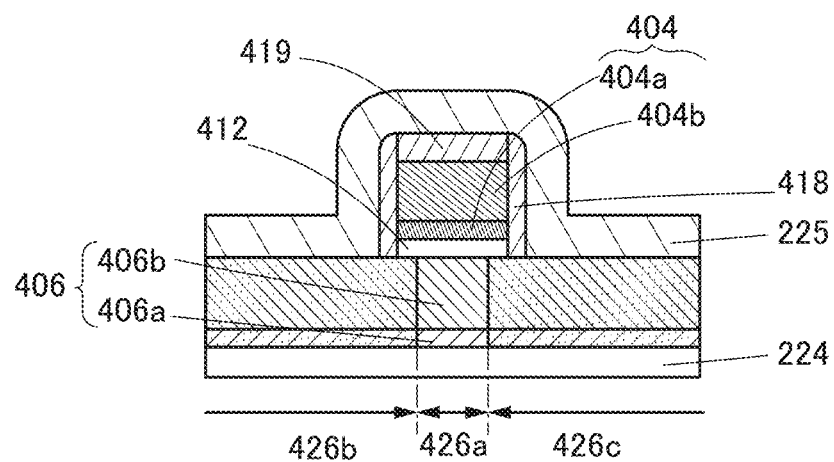
FIGS. 27A and 27B are cross-sectional views each illustrating a structure example of a transistor.

FIG. 27A is an enlarged view of the region 426a and its vicinity illustrated in FIG. 26B. As illustrated in FIG. 27A, the region 426b and the region 426c are formed in at least the regions of the metal oxide 406 that overlap with the insulator 225. Here, one of the region 426b and the region 426c in the metal oxide 406b can function as a source region, and the other can function as a drain region. Moreover, the region 426a in the metal oxide 406b can function as a channel formation region.

Although the regions 426a, 426b, and 426c are formed in the metal oxides 406b and 406a in FIG. 26B and FIG. 27A, it is acceptable as long as these regions are formed in the metal oxide 406b. Furthermore, although a boundary between the region 426a and the region 426b and a boundary between the region 426a and the region 426c are illustrated as being substantially perpendicular to the top surface of the metal oxide 406 in FIG. 26B and the like, this embodiment is not limited to this structure. For example, in some cases, the region 426b and the region 426c project to the conductor 404 side in the vicinity of the surface of the metal oxide 406b and are recessed to the insulator 225 side in the vicinity of a bottom surface of the metal oxide 406a.

In the transistor 200, as illustrated in FIG. 27A, the region 426b and the region 426c are formed in the regions where the metal oxide 406 is in contact with the insulator 225 and the regions overlapping with the vicinity of end portions of the insulators 418 and 412. In that case, portions of the regions 426b and 426c that overlap with the conductor 404 serve as what we call overlap regions (also referred to as Lov regions). With the Lov regions, no high-resistance region is formed between the channel formation region and the source or drain region of the metal oxide 406; accordingly, the on-state current and the mobility of the transistor can be increased.

Figure 27B:
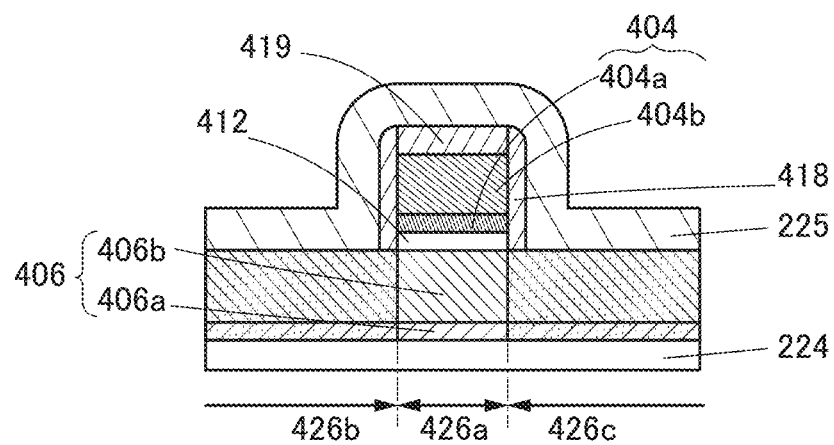

Note that the semiconductor device described in this embodiment is not limited thereto. For example, as illustrated in FIG. 27B, the region 426b and the region 426c may be formed in regions where the metal oxide 406 overlaps with the insulator 225 and the insulator 418. The structure illustrated in FIG. 27B can be rephrased as the structure in which the width of the conductor 404 in the channel length direction is substantially the same as the width of the region 426a. Because a high-resistance region is not formed between the source region and the drain region in the structure illustrated in FIG. 27B, the on-state current of the transistor can be increased. Since the gate does not overlap with the source and drain regions in the channel length direction in the structure illustrated in FIG. 27B, formation of unnecessary capacitance can be suppressed.

By appropriately selecting the areas of the regions 426b and 426c in the above manners, a transistor having desired electrical characteristics can be easily provided in accordance with the circuit design.

The insulator 412 is preferably provided in contact with a top surface of the metal oxide 406b. The insulator 412 is preferably formed using an insulator from which oxygen is released by heating. When the insulator 412 formed using the insulator is formed in contact with the top surface of the metal oxide 406b, oxygen can be supplied to the metal oxide 406b effectively. Furthermore, like the insulator 224, the concentration of impurities such as water or hydrogen in the insulator 412 is preferably lowered. The thickness of the insulator 412 is preferably more than or equal to 1 nm and less than or equal to 20 nm (e.g., approximately 1 nm).

The insulator 412 preferably contains oxygen. The amount of oxygen released from the insulator 412, which is converted into oxygen molecules per unit area of the insulator 412, is more than or equal to $1\times10^{14}$ molecules/cm$^2$, preferably more than or equal to $2\times10^{14}$ molecules/cm$^2$, further preferably more than or equal to $4\times10^{14}$ molecules/cm$^2$ in thermal desorption spectroscopy (TDS) in the range of the surface temperatures higher than or equal to 100° C. and lower than equal to 700° C. or higher than or equal to 100° C. and lower than or equal to 500° C., for example.

The insulator 412, the conductor 404, and the insulator 419 each include a region overlapping with the metal oxide 406b. In addition, side surfaces of the insulator 412, the conductor 404a, the conductor 404b, and the insulator 419 are preferably aligned with each other.

The conductor 404a is preferably formed using a conductive oxide. For example, the metal oxide that can be used as the metal oxide 406a or the metal oxide 406b can be used. In particular, an In—Ga—Zn-based oxide with an atomic ratio of In:Ga:Zn=4:2:3 to 4.1 or the vicinity thereof, which has high conductivity, is preferably used. When the conductor 404a is formed using such a material, oxygen can be prevented from entering the conductor 404b, and an increase in electric resistance value of the conductor 404b due to oxidation can be prevented.

When such a conductive oxide is formed by a sputtering method, oxygen can be added to the insulator 412, so that oxygen can be supplied to the metal oxide 406b. Thus, oxygen vacancies in the region 426a of the metal oxide 406 can be reduced.

The conductor 404b can be formed using a metal such as tungsten, for example. It is also possible to use, as the conductor 404b, a conductor that can add impurities such as nitrogen to the conductor 404a to improve the conductivity of the conductor 404a. For example, titanium nitride or the like is preferably used for the conductor 404b. Alternatively, the conductor 404b may be a stack including a metal nitride such as titanium nitride and a metal such as tungsten thereover.

Here, the conductor 404 functioning as a gate electrode is provided to cover the top surface of the region 426a and its periphery and the side surface, which is in the channel width direction, of the metal oxide 406b with the insulator 412 interposed therebetween. Thus, the electric field of the conductor 404 functioning as a gate electrode can electrically surround the top surface of the region 426a and its periphery and the side surface, which is in the channel width direction, of the metal oxide 406b. The structure of the transistor in which the channel formation region is electrically surrounded by the electric field of the conductor 404 is referred to as a surrounded channel (s-channel) structure. Thus, a channel can be formed in the top surface of the region 426a and its periphery and the side surface, which is in the channel width direction, of the metal oxide 406b; therefore, a large amount of current can flow between the source and the drain, and current in an on state (on-state current) can be high. Moreover, since the top surface of the region 426a and its periphery and the side surface, which is in the channel width direction, of the metal oxide 406b are surrounded by the electric field of the conductor 404, a leakage current in an off state (off-state current) can be low.

The insulator 419 is preferably provided over the conductor 404b. In addition, it is preferable that side surfaces of the insulator 419, the conductor 404a, the conductor 404b, and the insulator 412 be substantially aligned with each other. The insulator 419 is preferably formed by an atomic layer deposition (ALD) method. In that case, the insulator 419 can be formed with a thickness of approximately more than or equal to 1 nm and less than or equal to 20 nm, preferably approximately more than or equal to 5 nm and less than or equal to 10 nm. The insulator 419 is preferably formed using an insulating material that has a function of inhibiting the passage of oxygen and impurities such as water or hydrogen, similarly to the insulator 418, and is preferably formed using aluminum oxide or hafnium oxide, for example.

When the insulator 419 is provided, the insulator 419 and the insulator 418 which have a function of inhibiting the passage of impurities such as water or hydrogen and oxygen can cover top and side surfaces of the conductor 404. This can prevent entry of impurities such as water or hydrogen into the metal oxide 406 through the conductor 404. In this manner, the insulators 418 and 419 function as a gate cap for protecting the gate.

The insulator 418 is provided in contact with the side surfaces of the insulator 412, the conductor 404, and the insulator 419. Furthermore, the top surface of the insulator 418 is preferably aligned with the top surface of the insulator 419. The insulator 418 is preferably deposited by an ALD method, in which case the thickness of the insulator 418 can be approximately more than or equal to 1 nm and less than or equal to 20 nm, preferably approximately more than or equal to 1 nm and less than or equal to 3 nm (e.g., 1 nm).

As described above, the region 426b and the region 426c of the metal oxide 406 are formed by the impurity element added in the formation of the insulator 225. In the case where the transistor is miniaturized to have a channel length of approximately 10 nm to 30 nm, the impurity element contained in the source region or the drain region might be diffused to bring electrical connection between the source region and the drain region. In this embodiment, however, the insulator 418 can increase the distance between regions of the metal oxide 406 that are in contact with the insulator 225; accordingly, electrical connection between the source region and the drain region can be prevented. Furthermore, by using an ALD method, the insulator 418 can be formed to have a thickness that is as small as or smaller than the length of the miniaturized channel. Accordingly, an excessive increase of the distance between the source region and the drain region is not caused and thereby an increase in the resistance can be prevented.

Here, the insulators 418 and 419 are preferably formed using an insulating material having a function of inhibiting the passage of impurities such as water or hydrogen and oxygen. In that case, oxygen in the insulator 412 can be prevented from diffusing outward. Furthermore, entry of impurities such as hydrogen or water to the metal oxide 406 from an end portion or the like of the insulator 412 can be prevented.

The insulator 418 is preferably formed in the following manner: an insulating film is deposited by an ALD method and then subjected to anisotropic etching so as to remain in a portion in contact with the side surfaces of the insulator 412, the conductor 404, and the insulator 419. Thus, an insulator having a small thickness as described above can be easily formed. At this time, even when the insulator 419 provided over the conductor 404 is partly removed by the anisotropic etching, portions of the insulator 418 in contact with the insulator 412 and the conductor 404 can be left sufficiently.

The insulator 225 is provided to cover the insulator 419, the insulator 418, the metal oxide 406, and the insulator 224. Here, the insulator 225 is provided in contact with top surfaces of the insulator 419 and the insulator 418 and the side surface of the insulator 418. As described above, impurities such as hydrogen or nitrogen are added from the insulator 225 to the metal oxide 406, so that the region 426b and the region 426c are formed. Thus, the insulator 225 preferably contains at least one of hydrogen and nitrogen.

Furthermore, the insulator 225 is preferably provided in contact with side surfaces of the metal oxides 406b and 406a as well as the top surface of the metal oxide 406b. This enables a resistance reduction to the side surfaces of the metal oxides 406b and 406a in the region 426b and the region 426c.

Moreover, the insulator 225 is preferably formed using an insulating material having a function of inhibiting the passage of impurities such as water or hydrogen and oxygen. For example, as the insulator 225, silicon nitride, silicon nitride oxide, silicon oxynitride, aluminum nitride, aluminum nitride oxide, or the like is preferably used.

The insulator 280 is preferably provided over the insulator 225. Like the insulator 224 or the like, the concentration of impurities such as water or hydrogen in the insulator 280 is preferably lowered.

In openings formed in the insulator 280 and the insulator 225, a combination of a conductor 450a and a conductor 451a and a combination of a conductor 450b and a conductor 451b are provided. The combination of the conductor 450a and the conductor 451a and the combination of the conductor 450b and the conductor 451b are preferably provided to face each other with the conductor 404 therebetween.

Here, the conductor 450a is formed in contact with an inner wall of the opening provided in the insulator 280 and the insulator 225, and the conductor 451a is further provided inside the conductor 450a. The region 426b of the metal oxide 406 is positioned in at least part of a bottom portion of the opening, and the conductor 450a is in contact with the region 426b. Similarly, the conductor 450b is formed in contact with an inner wall of the opening provided in the insulator 280 and the insulator 225, and the conductor 451b is further provided inside the conductor 450b. The region 426c of the metal oxide 406 is positioned in at least part of a bottom portion of the opening, and the conductor 450b is in contact with the region 426c.

Thus, the conductors 450a and 451a can serve as one of a source electrode and a drain electrode, and the conductors 450b and 451b can serve as the other of the source electrode and the drain electrode.

The conductor 450a and the conductor 450b are preferably formed using a conductive material having a function of inhibiting the passage of impurities such as water or hydrogen, like the conductor 310a or the like.

Furthermore, the conductor 451a and the conductor 451b are preferably formed using a conductive material including tungsten, copper, or aluminum as its main component. Although not illustrated, the conductor 451a and the conductor 451b may have a stacked layer structure, and for example, stacked layers of titanium, titanium nitride, and the above-described conductive material may be formed.

Next, components of the transistor 200 will be described.
<Substrate>

As a substrate over which the transistor 200 is formed, for example, an insulator substrate, a semiconductor substrate, or a conductor substrate may be used. As the insulator substrate, a glass substrate, a quartz substrate, a sapphire substrate, a stabilized zirconia substrate (e.g., an yttria-stabilized zirconia substrate), or a resin substrate is used, for example. As the semiconductor substrate, a semiconductor substrate of silicon, germanium, or the like, or a compound semiconductor substrate of silicon carbide, silicon germanium, gallium arsenide, indium phosphide, zinc oxide, or gallium oxide can be used, for example. A semiconductor substrate in which an insulator region is provided in the above semiconductor substrate, e.g., a silicon on insulator (SOI) substrate or the like is used. As the conductor substrate, a graphite substrate, a metal substrate, an alloy substrate, a conductive resin substrate, or the like is used. A substrate including a metal nitride, a substrate including a metal oxide, or the like is used. An insulator substrate provided with a conductor or a semiconductor, a semiconductor substrate provided with a conductor or an insulator, a conductor substrate provided with a semiconductor or an insulator, or the like is used. Alternatively, any of these substrates over which an element is provided may be used. As the element provided over the substrate, a capacitor, a resistor, a switching element, a light-emitting element, a memory element, or the like is used.

Alternatively, a flexible substrate may be used as the substrate. As a method for providing a transistor over a flexible substrate, there is a method in which the transistor is formed over a non-flexible substrate and then the transistor is separated and transferred to the substrate which is a flexible substrate. In that case, a separation layer is preferably provided between the non-flexible substrate and the transistor. As the substrate, a sheet, a film, or a foil containing a fiber may be used. The substrate may have elasticity. The substrate may have a property of returning to its original shape when bending or pulling is stopped. Alternatively, the substrate may have a property of not returning to its original shape. The substrate has a region with a thickness of, for example, greater than or equal to 5 μm and less than or equal to 700 μm, preferably greater than or equal to 10 μm and less than or equal to 500 μm, more preferably greater than or equal to 15 μm and less than or equal to 300 μm. When the substrate has a small thickness, the weight of the semiconductor device including the transistor can be reduced. When the substrate has a small thickness, even in the case of using glass or the like, the substrate may have elasticity or a property of returning to its original shape when bending or pulling is stopped. Therefore, an impact applied to the semiconductor device over the substrate due to dropping or the like can be reduced. That is, a durable semiconductor device can be provided.

For the substrate which is a flexible substrate, metal, an alloy, resin, glass, or fiber thereof can be used, for example. The flexible substrate preferably has a lower coefficient of linear expansion because deformation due to an environment is suppressed. The flexible substrate is formed using, for example, a material whose coefficient of linear expansion is lower than or equal to $1\times10^{-3}$/K, lower than or equal to $5\times10^{-5}$/K, or lower than or equal to $1\times10^{-5}$/K. Examples of the resin include polyester, polyolefin, polyamide (e.g., nylon or aramid), polyimide, polycarbonate, and acrylic. In particular, aramid is preferably used for the flexible substrate because of its low coefficient of linear expansion.

<Insulator>

Examples of an insulator include an insulating oxide, an insulating nitride, an insulating oxynitride, an insulating nitride oxide, an insulating metal oxide, an insulating metal oxynitride, and an insulating metal nitride oxide.

The transistor is surrounded by an insulator that has a function of inhibiting the passage of oxygen and impurities such as hydrogen, whereby the transistor can have stable electrical characteristics. For example, an insulator that has a function of inhibiting the passage of oxygen and impurities such as hydrogen is used as the insulator 222 and the insulator 214.

The insulator that has a function of inhibiting the passage of oxygen and impurities such as hydrogen can have, for example, a single-layer structure or a stacked-layer structure including an insulator including boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum.

Furthermore, for example, the insulator 222 and the insulator 214 may be formed using a metal oxide such as aluminum oxide, magnesium oxide, gallium oxide, germanium oxide, yttrium oxide, zirconium oxide, lanthanum oxide, neodymium oxide, hafnium oxide, or tantalum oxide; silicon nitride oxide; or silicon nitride. Note that the insulator 222 and the insulator 214 preferably contain aluminum oxide, hafnium oxide, or the like.

The insulator 384, the insulator 216, the insulator 220, the insulator 224, and the insulator 412 may each be formed to have, for example, a single-layer structure or a stacked-layer structure including an insulator containing boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. For example, the insulator 384, the insulator 216, the insulator 220, the insulator 224, and the insulator 412 each preferably contain silicon oxide, silicon oxynitride, or silicon nitride.

The insulator 220, the insulator 222, the insulator 224, and/or the insulator 412 preferably include an insulator with a high dielectric constant. For example, the insulator 220, the insulator 222, the insulator 224, and/or the insulator 412 each preferably contain gallium oxide, hafnium oxide, zirconium oxide, oxide containing aluminum and hafnium, oxynitride containing aluminum and hafnium, oxide containing silicon and hafnium, oxynitride containing silicon and hafnium, nitride containing silicon and hafnium, or the like. Alternatively, the insulator 220, the insulator 222, the insulator 224, and/or the insulator 412 each preferably have a stacked-layer structure of silicon oxide or silicon oxynitride and an insulator with a high dielectric constant.

The insulator 384, the insulator 216, and the insulator 280 preferably include an insulator with a low dielectric constant. For example, the insulator 384, the insulator 216, and the insulator 280 preferably contain silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. Alternatively, the insulator 384, the insulator 216, and the insulator 280 preferably have a stacked-layer structure of a resin and one of the following materials: silicon oxide, silicon oxynitride, silicon nitride oxide, silicon nitride, silicon oxide to which fluorine is added, silicon oxide to which carbon is added, silicon oxide to which carbon and nitrogen are added, and porous silicon oxide. When silicon oxide or silicon oxynitride, which is thermally stable, is combined with resin, the stacked-layer structure can have thermal stability and low dielectric constant. Examples of the resin include polyester, polyolefin, polyamide (e.g., nylon or aramid), polyimide, polycarbonate, and acrylic.

As the insulator 418 and the insulator 419, a metal oxide such as aluminum oxide, hafnium oxide, magnesium oxide, gallium oxide, germanium oxide, yttrium oxide, zirconium oxide, lanthanum oxide, neodymium oxide, or tantalum oxide; silicon nitride oxide; or silicon nitride may be used, for example.

<Conductor>

The conductor 404a, the conductor 404b, the conductor 310a, the conductor 310b, the conductor 450a, the conductor 450b, the conductor 451a, and the conductor 451b can be formed using a material including one or more metal elements selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, and the like. Alternatively, a semiconductor having a high electric conductivity typified by polycrystalline silicon including an impurity element such as phosphorus, or silicide such as nickel silicide may be used.

As the above-described conductors, especially as the conductor 404a, the conductor 310a, the conductor 450a, and the conductor 450b, a conductive material including oxygen and a metal element contained in a metal oxide that can be used for the metal oxide 406 may be used. A conductive material containing the above metal element and nitrogen may be used. For example, a conductive material containing nitrogen such as titanium nitride or tantalum nitride may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used.

A stack of a plurality of conductive layers formed with the above materials may be used. For example, a stacked-layer structure formed using a combination of a material including any of the metal elements listed above and a conductive material including oxygen may be used. Alternatively, a stacked-layer structure formed using a combination of a material including any of the metal elements listed above and a conductive material including nitrogen may be used. Alternatively, a stacked-layer structure formed using a combination of a material including any of the metal elements listed above, a conductive material including oxygen, and a conductive material including nitrogen may be used.

When oxide is used for the channel formation region of the transistor, a stacked-layer structure formed using a material containing the above-described metal element and a conductive material containing oxygen is preferably used for the gate electrode. In this case, the conductive material containing oxygen is preferably formed on the channel formation region side. In that case, the conductive material including oxygen is preferably provided on the channel formation region side so that oxygen released from the conductive material is easily supplied to the channel formation region.

<<Transistor 201>>

Next, the details of the transistor 201 illustrated in FIG. 25 will be described.

Figure 28A:
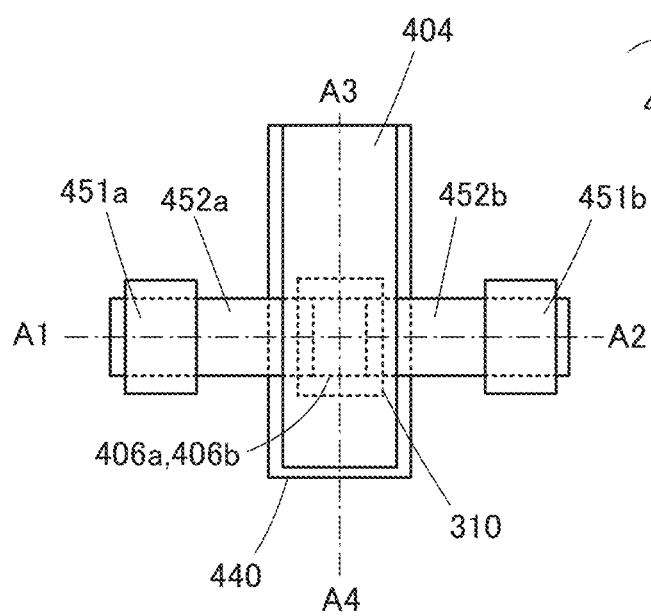
FIGS. 28A to 28C are a top view and cross-sectional views illustrating a structure example of a transistor.
Figure 28C:
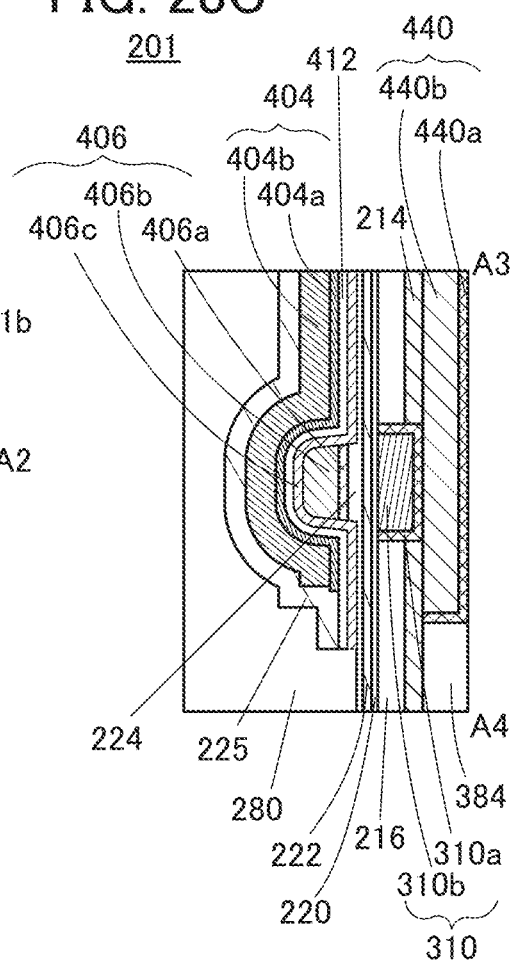
Figure 28B:
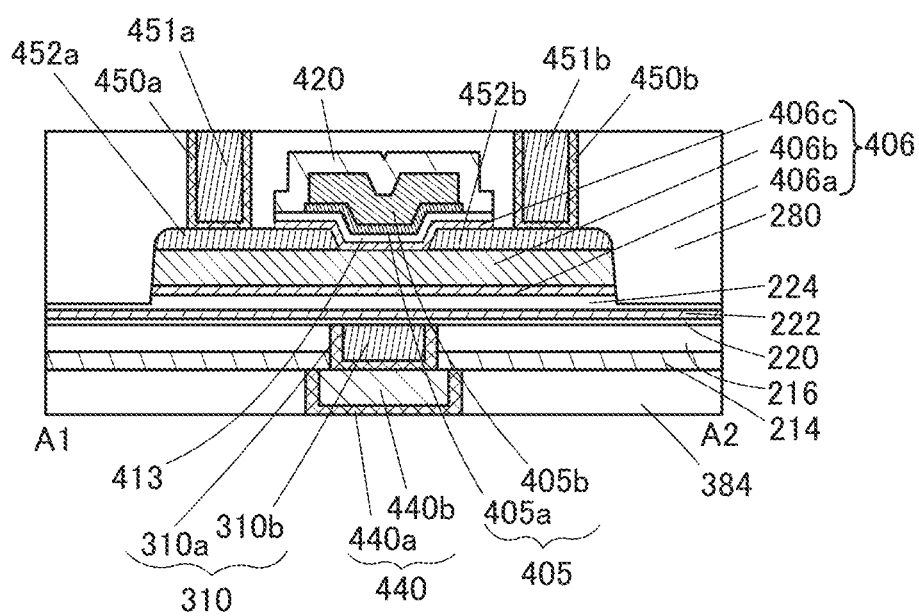

FIG. 28A is a top view of the transistor 201. FIG. 28B is a cross-sectional view taken along dashed-dotted line A1-A2 in FIG. 28A, which corresponds to a cross-sectional view in the channel length direction of the transistor 201. FIG. 28C is a cross-sectional view taken along dashed-dotted line A3-A4 in FIG. 28A, which corresponds to a cross-sectional view in the channel width direction of the transistor 201. For simplification of the drawing, some components are not illustrated in the top view in FIG. 28A. The components common to the transistors 201 and 200 are denoted by the same reference numerals.

As illustrated in FIGS. 28A to 28C, the transistor 201 includes the insulator 224 over a substrate (not illustrated), the metal oxide 406a over the insulator 224, the metal oxide 406b in contact with at least part of a top surface of the metal oxide 406a, a conductor 452a and a conductor 452b in contact with at least part of a top surface of the metal oxide 406b, a metal oxide 406c in contact with at least part of a top surface of the metal oxide 406b and over the conductor 452a and the conductor 452b, an insulator 413 over the metal oxide 406c, a conductor 405a over the insulator 413, a conductor 405b over the conductor 405a, and an insulator 420 over the conductor 405b.

A conductor 405 (the conductor 405a and the conductor 405b) can function as a top gate, and the conductor 310 can function as a back gate. The potential of the back gate can be the same as the potential of the top gate, the ground potential, or an arbitrary potential. By changing the potential of the back gate independently of the potential of the top gate, the threshold voltage of the transistor can be changed.

The conductor 405a can be formed using a material that can be used for the conductor 404a illustrated in FIGS. 26A to 26C. The conductor 405b can be formed using a material that can be used for the conductor 404b illustrated in FIGS. 26A to 26C.

The conductor 452a serves as one of a source electrode and a drain electrode, and the conductor 452b serves as the other of the source electrode and the drain electrode.

Any of metals such as aluminum, titanium, chromium, nickel, copper, yttrium, zirconium, molybdenum, silver, tantalum, and tungsten, or an alloy containing any of the metals as its main component can be used for each of the conductors 452a and 452b. Although a single-layer structure is illustrated in the drawings, a stacked-layer structure of two or more layers may be used. Further, a transparent conductive material containing indium oxide, tin oxide, or zinc oxide may be used.

In the transistor 201, a channel is preferably formed in the metal oxide 406b. Therefore, the metal oxide 406c is preferably formed using a material having a higher insulating property than the metal oxide 406b. The metal oxide 406c can be formed using a material that is similar to the material used for the metal oxide 406a.

Providing the metal oxide 406c enables the transistor 201 to be a buried-channel transistor. Moreover, oxidation of end portions of the conductors 452a and 452b can be prevented. Furthermore, a leakage current between the conductor 405 and the conductor 452a (or between the conductor 405 and the conductor 452b) can be prevented. Note that the metal oxide 406c may be omitted depending on the case.

The insulator 420 is preferably formed using an insulating material having a function of inhibiting the passage of impurities such as water or hydrogen and oxygen. For example, the insulator 420 may be formed using a metal oxide such as aluminum oxide, magnesium oxide, gallium oxide, germanium oxide, yttrium oxide, zirconium oxide, lanthanum oxide, neodymium oxide, hafnium oxide, or tantalum oxide; silicon nitride oxide; or silicon nitride.

Providing the insulator 420 in the transistor 201 can prevent oxidation of the conductor 405. Furthermore, impurities such as water or hydrogen can be prevented from entering the metal oxide 406.

The transistor 201 can have a larger contact area between the metal oxide 406b and the electrode (the source electrode or the drain electrode) than the transistor 200. Furthermore, a step for forming the region 426b and the region 426c illustrated in FIGS. 26A to 26C is not necessary. Thus, the transistor 201 can have a larger on-state current than the transistor 200. In addition, the manufacturing process can be simplified.

For the details of the other components of the transistor 201, the description of the transistor 200 can be referred to.

Note that this embodiment can be combined with any of the other embodiments in this specification as appropriate.

Example 1

In this example, an example of using the neural network of one embodiment of the present invention for prediction and detection of the occurrence of abnormality (specifically, a micro short circuit) of a secondary battery will be described.

Figure 29A:
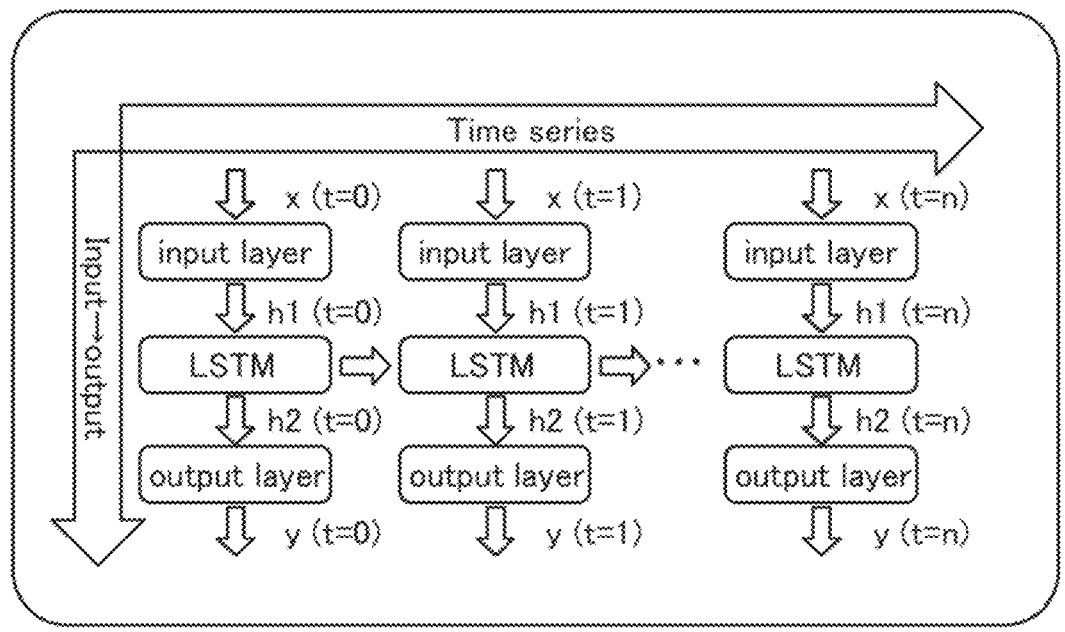
FIG. 29A shows an example of a network model of LSTM and FIGS. 29B and 29C show an example of a charge curve.
Figure 29B:
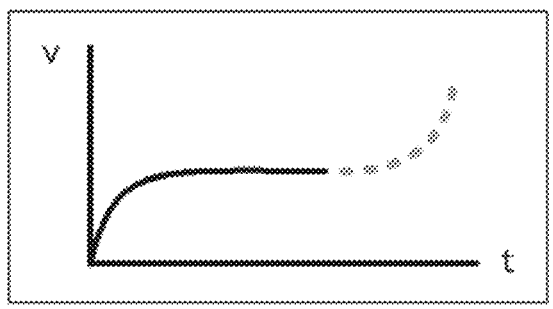
Figure 29C:
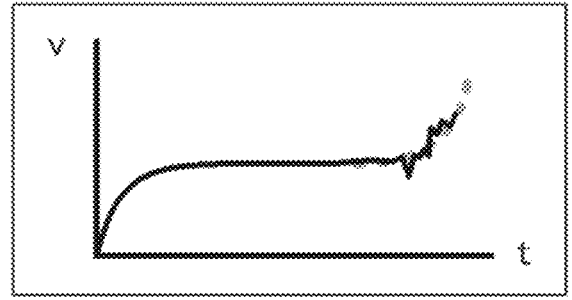

FIG. 29C is an example of a schematic graph showing charge and discharge curves when a micro short circuit occurs.

Here, a micro short circuit refers to a minute short circuit caused in a secondary battery. This phenomenon does not make charge and discharge impossible, but a slight short circuit current flows in a minute short circuit portion. It is said that a factor of the micro short circuit is as follows. When charge and discharge are performed multiple times, the distribution of a positive electrode active material becomes nonuniform, and local current concentration occurs at part of a positive electrode and part of a negative electrode. Consequently, a malfunction of part of a separator is caused. Another factor of the micro short circuit is said to be generation of a product due to a side reaction.

To fabricate an ideal secondary battery, a reduction in the thickness of a separator is demanded for miniaturization of the secondary battery. Furthermore, charge by high-speed power feeding at high voltage is desired. Both of the above, however, can easily cause a micro short circuit in the secondary battery. In addition, repeated occurrence of micro short circuits may possibly lead to critical accidents such as abnormal heat generation and catching fire of the secondary battery.

Thus, as a first step of constructing a power storage system for preventing a critical accident by finding a micro short circuit as soon as possible or a control system for a secondary battery, prediction of the occurrence of abnormality of a secondary battery is attempted using a neural network.

As the neural network, a recurrent neural network called LSTM was employed. The network of LSTM is suitable for analysis of time-series data and can predict the charge characteristics slightly anterior to the accumulated time-series data by measurement of charging voltages at certain intervals. The algorithm of LSTM is devised with Python (Chainer). On the basis of the algorithm, a system using a circuit including a transistor whose channel formation region includes an oxide semiconductor was constructed. FIG. 29A illustrates a network model of LSTM.

In FIG. 29B, the solid curve is a charge curve when charge is being performed, and the dotted curve is a predicted charge curve.

Specifically, the network is made to learn a normal charge curve and determines that there is no abnormality while the slightly anterior charge curve that is predicted overlaps with the normal charge curve or determines that there is abnormality at the point when an irregularity appears in the wave shape as shown in the right end portion of the charge curve in FIG. 29C, that is, deviation from the normal charge curve is caused because of the occurrence of a micro short circuit.

Figure 30A:
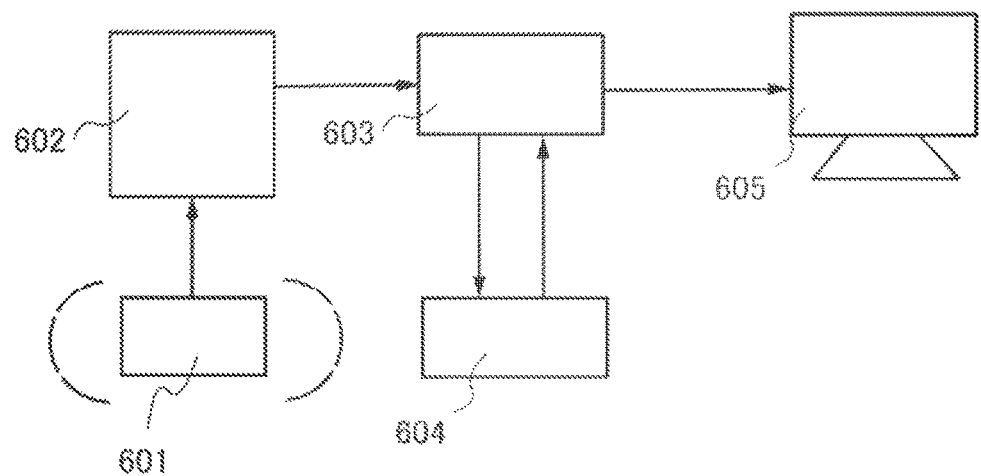
FIG. 30A is a block diagram illustrating a system and FIG. 30B is a photograph showing the appearance of a prototype.

FIG. 30A is a block diagram of a prototype that causes simulated micro short circuits of a lithium-ion secondary battery, predicts the behavior of the battery, and shows its state (charge curve) in real time on a display.

In FIG. 30A, 601 denotes a pseudo abnormality generating switch, and 602 denotes an emulator that can be regarded as a battery. The emulator 602 outputs measurement data on charge, and a controller IC 603 conducts measurement and determination. An OS-LSI inference chip 604 includes a nonvolatile memory using an OS-FET in a product-sum operation circuit and is capable of constantly loading the value of weight. The controller IC 603 inputs input data for a product-sum operation to the OS-LSI inference chip 604, and the OS-LSI inference chip 604 outputs the arithmetic operation results. A display 605 is set such that inference data and measurement data are shown with different colors to overlap with each other for comparison. Note that the display 605 of a laptop personal computer shows two charge curves (e.g., green: measurement data, yellow: predicted charge curve).

Figure 30B:
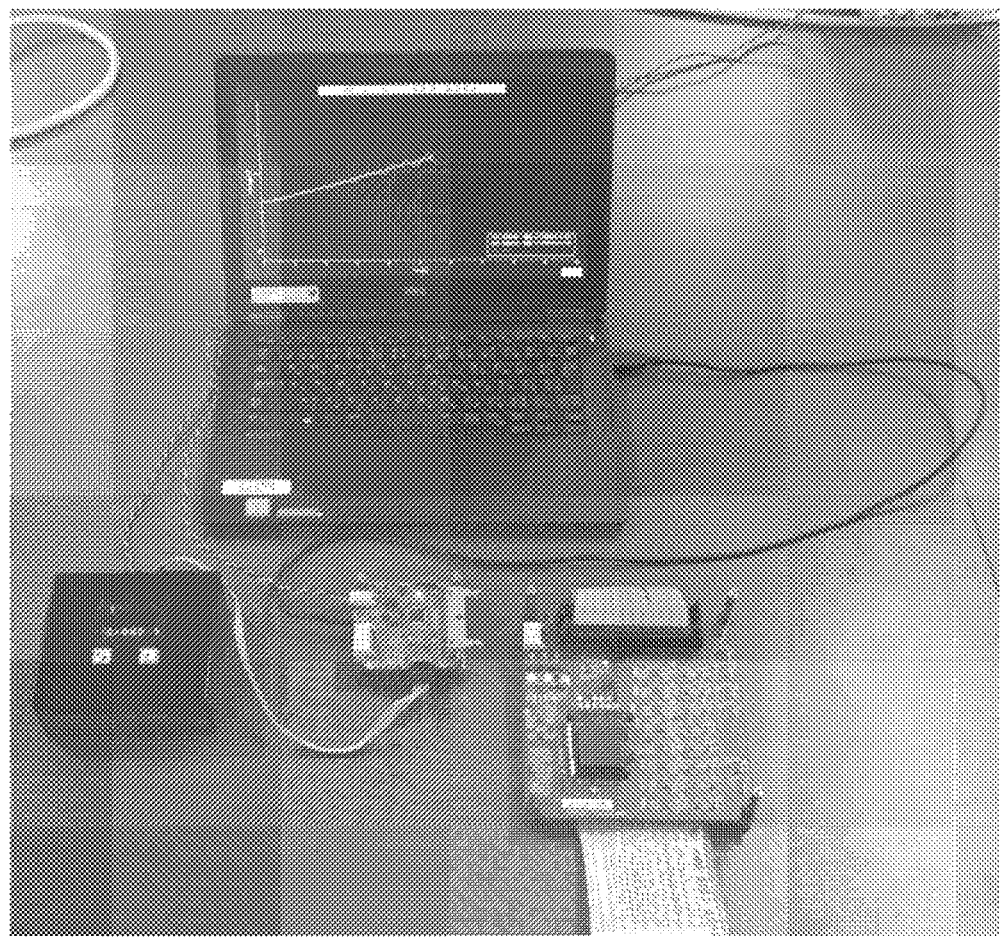

FIG. 30B is a photograph showing the appearance of the prototype corresponding to the block diagram in FIG. 30A. The OS-LSI inference chip 604 is mounted on a board at the lower right portion of FIG. 30B. In FIG. 30B, a board at the center portion is the controller IC 603, and the emulator 602 including the pseudo abnormality generating switch 601 is positioned at the lower left portion.

Figure 31:
FIG. 31 is a photograph showing the appearance of a prototype.

FIG. 31 is a photograph showing the appearance of a prototype additionally provided with a panel that monitors an actual coin-type lithium-ion secondary battery, on the right of the prototype shown in FIG. 30B, and displays predicted abnormality in real time.

The algorithm of LSTM described above will be explained below in detail.

$$LSTM: h_t^{l-i}, h_{t-1}^l, c_{t-1}^l \to h_t^l, c_t^l \quad \text{[Formula 19]}$$

$$\begin{pmatrix} i \\ f \\ o \\ g \end{pmatrix} = \begin{pmatrix} sigm \\ sigm \\ sigm \\ \tanh \end{pmatrix} T_{2n,4n} \begin{pmatrix} h_t^{l-1} \\ h_{t-1}^l \end{pmatrix}$$

$$c_t^l = f \odot c_{t-1}^l + i \odot g$$

$$h_t^l = o \odot \tanh(c_t^l)$$

In the above algorithm, t and l are indices of time and layer, respectively. That is, t−1 means the previous period of time, and l−1 means the previous layer. The symbol $\odot$ in the above formula, which denotes Hadamard product (element-wise multiplication), means that the arithmetic operation shown by the following formula is performed.

[Formula 20]

$$\vec{a} \odot \vec{b} = (a_1 \times b_1, a_2 \times b_2, \ldots, a_n \times b_n)$$

Furthermore, T means a matrix operation for conversion of 2n dimension into 4n dimension, in which calculations of "sigm" and "tanh" are performed for every n elements, for conversion into vectors with n elements, i (input gate), f (forget gate), o (output gate), and g (input modulation gate). Note that "sigm" means calculation using a sigmoid function, and "tanh" means calculation using a hyperbolic tangent function.

The types of the above operations are as follows: product-sum operation, element wise multiplication, and activation functions (sigmoid and tanh). Note that LSTM includes the network of a fully-connected layer in some cases, and "product-sum operation" is also performed in the network.

Calculations in L layers are performed for a period of time Time (=zero to t steps) such that weights do not vary in inference calculation. Note that, in this example, Time=0 substantially corresponds to 1; thus, 1 to t+1 steps are performed. The values of cell states and outputs in a time step are stored and used in the next time step. New inputs are supplied in each step. (The stored values of cell states and outputs are unnecessary after used as input values and thus can be rewritten.)

Figure 32:
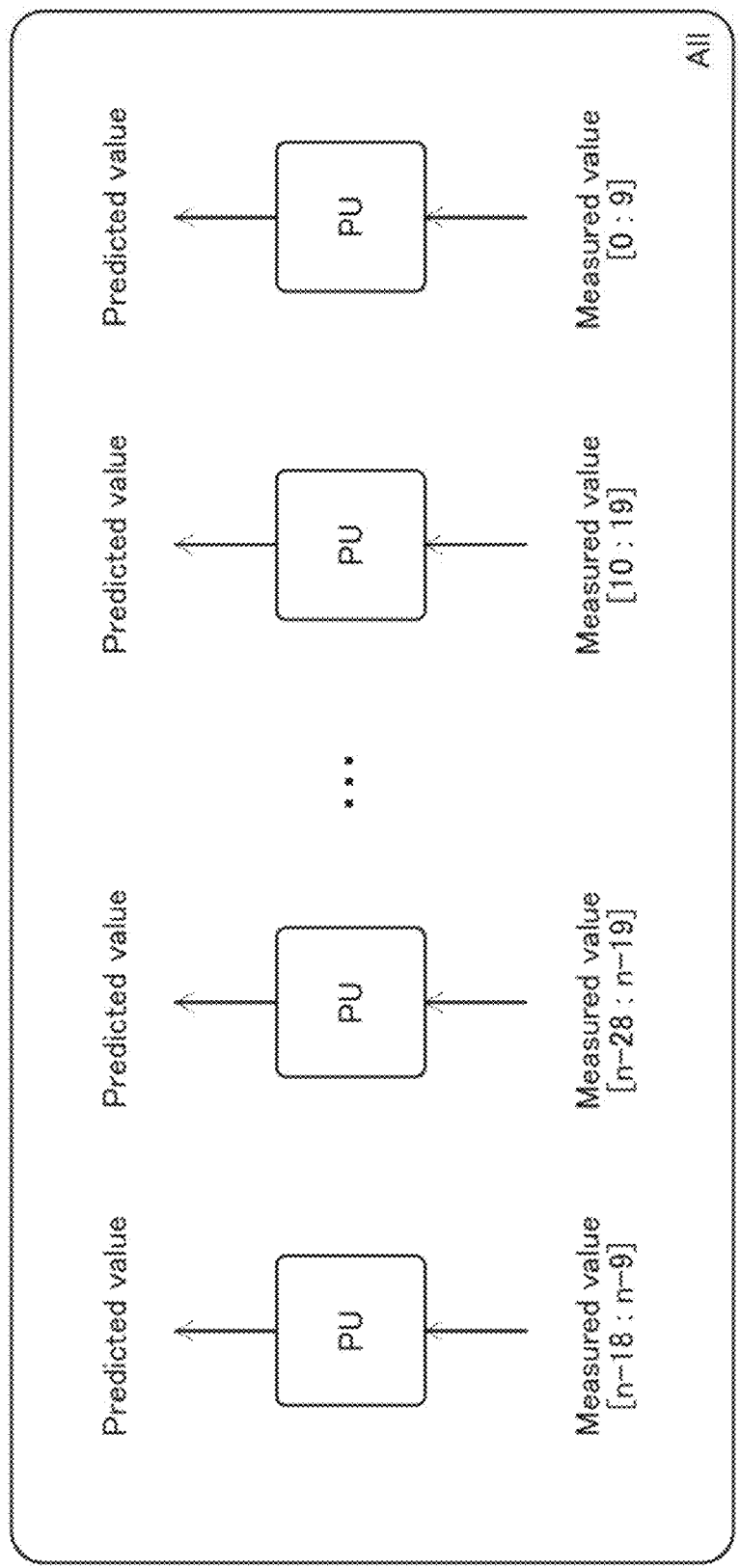
FIG. 32 shows an overall algorithm.
Figure 33:
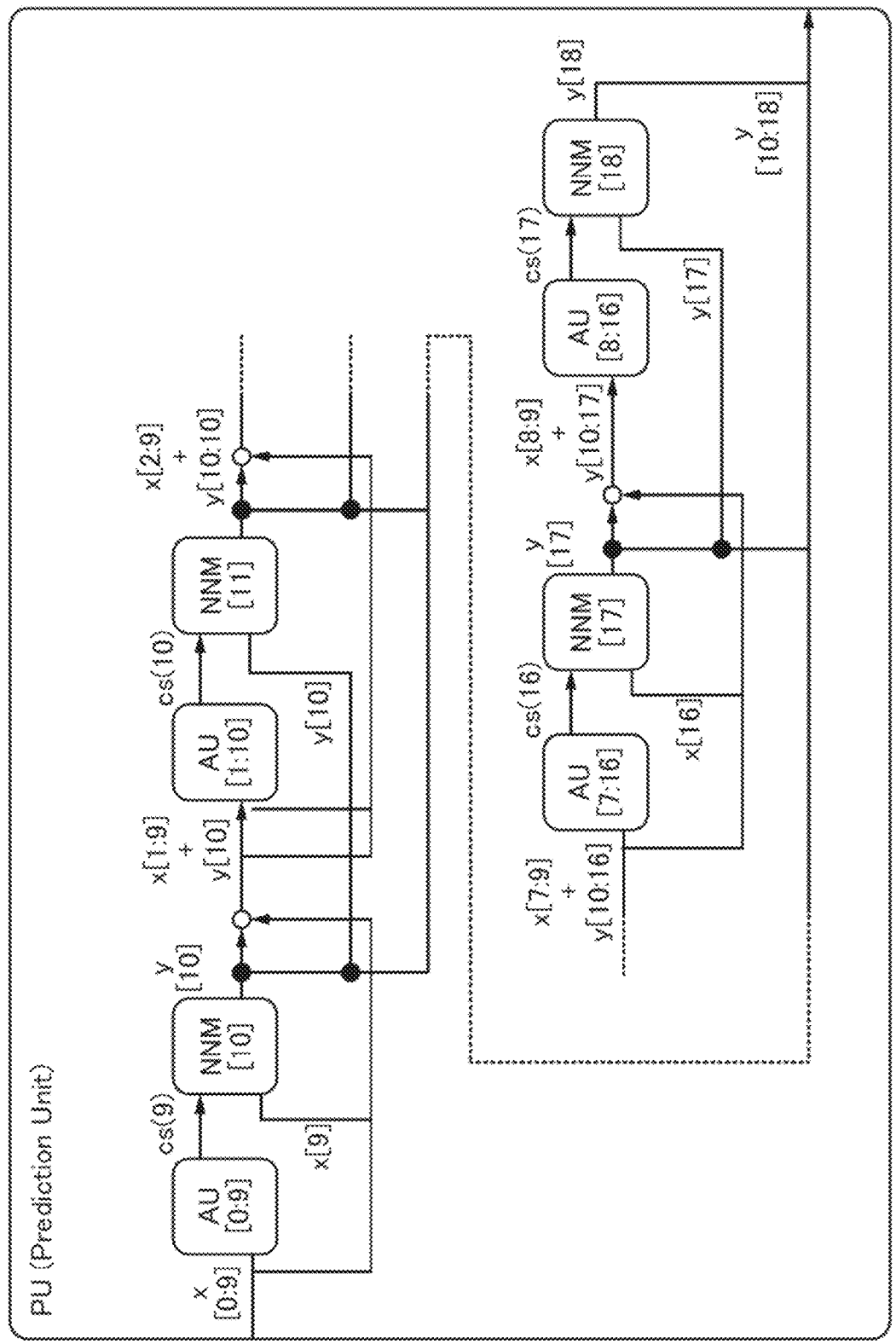
FIG. 33 shows an algorithm.
Figure 34:
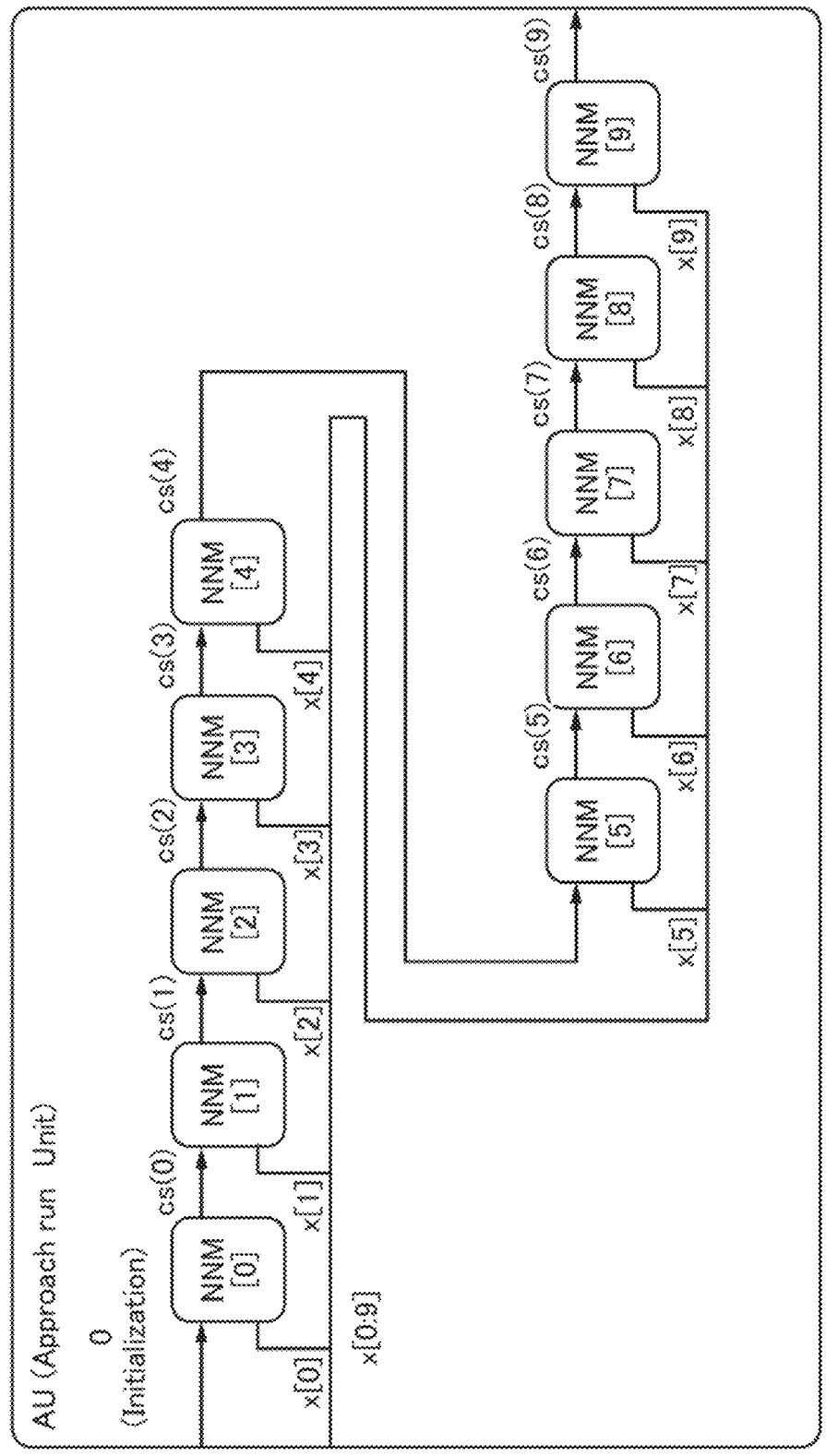
FIG. 34 shows an algorithm.
Figure 35:
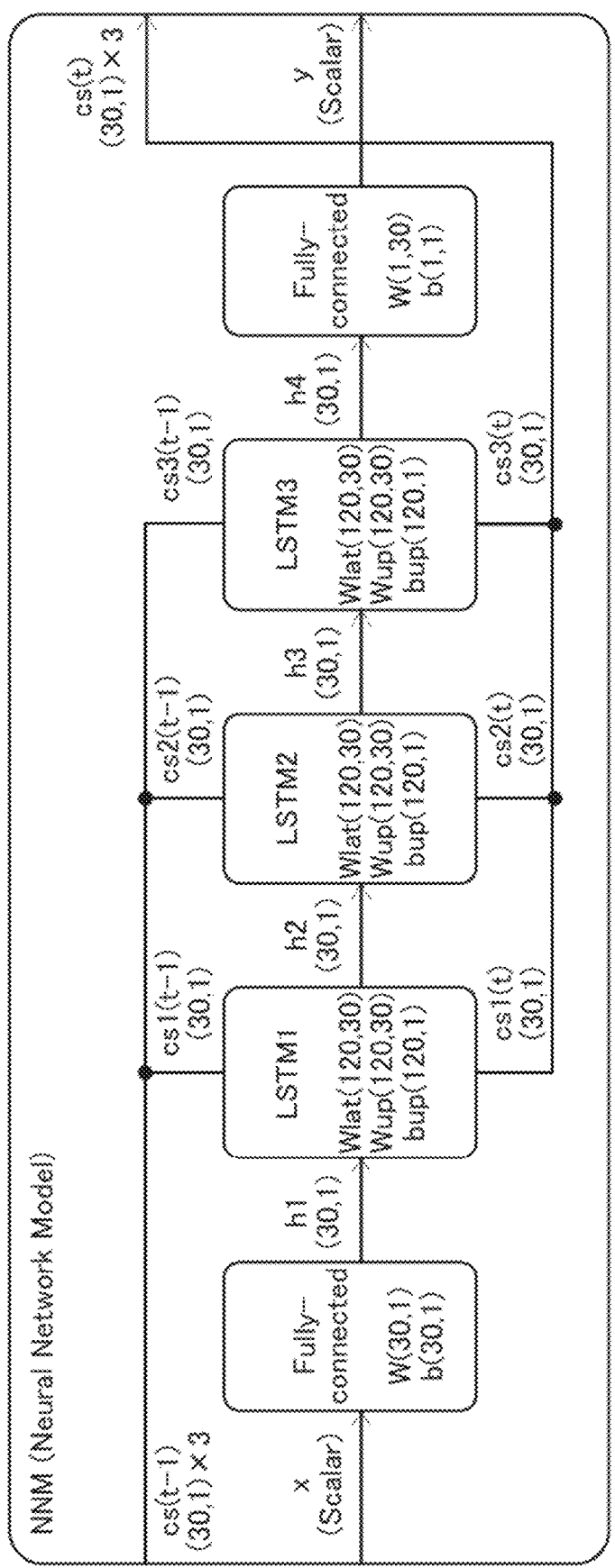
FIG. 35 shows an algorithm.
Figure 36:
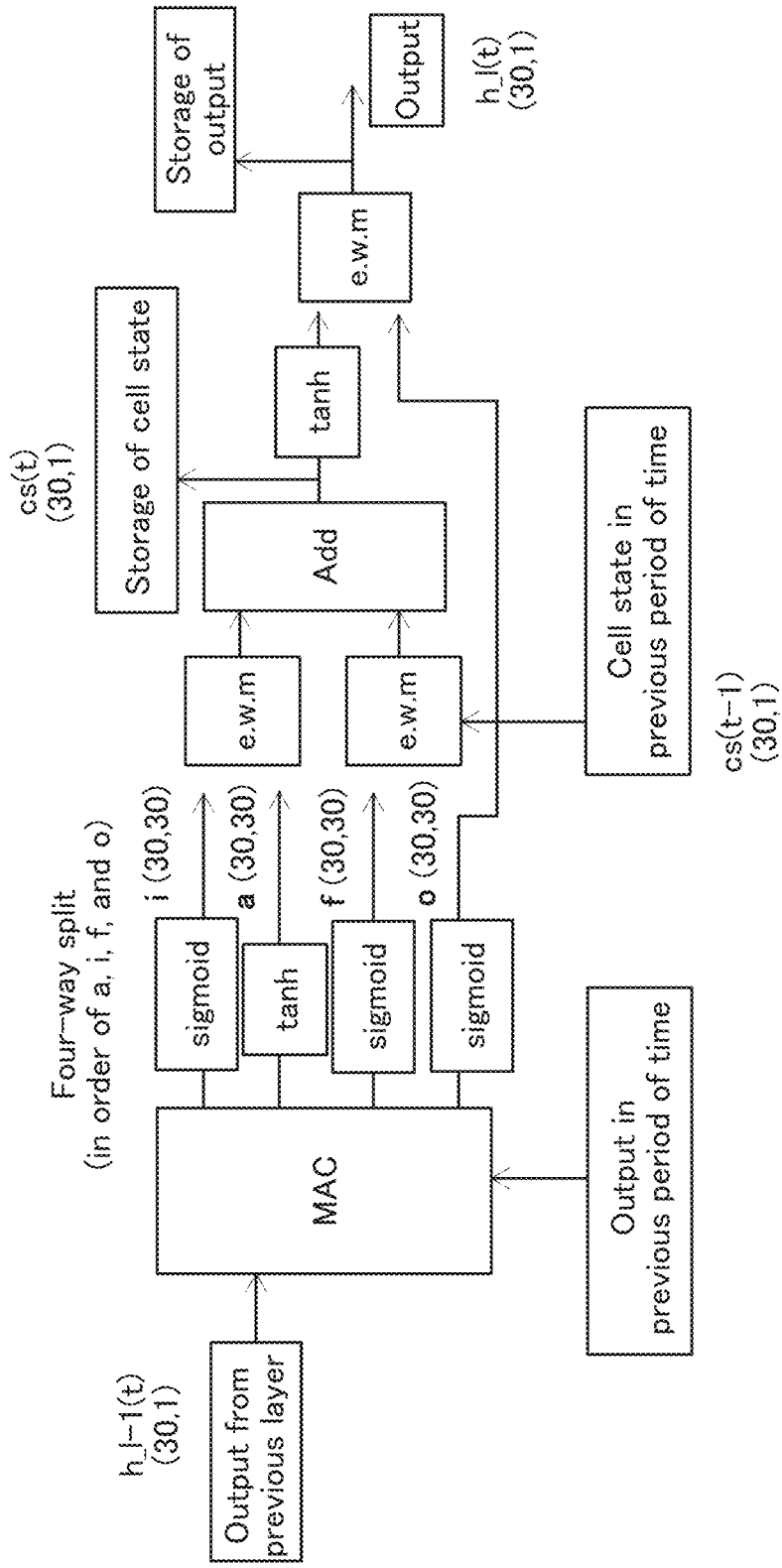
FIG. 36 shows an algorithm of LSTM.

FIG. 32 shows overall arithmetic operation that is actually performed. FIG. 33 shows a unit of PU in FIG. 32. FIG. 34 shows a unit of AU in FIG. 33. FIG. 35 shows a unit of NNM in FIG. 34. FIG. 36 shows a unit of LSTM in FIG. 35. The algorithm of LSTM is shown in FIG. 36.

A network in FIG. 35 includes five layers, including three LSTM layers. The number of hidden layers is 30.

The waveform predicted by the above algorithm is accurate; consequently, a control system that stops charge or displays warning as soon as abnormality is detected can be constructed.

EXPLANATION OF REFERENCE

81: positive electrode, 82: negative electrode, 83: solid electrolyte layer, 84: substrate, 85: wiring electrode, 86: wiring electrode, 87: positive electrode active material, 88: negative electrode active material, 100: semiconductor device, 105: insulator, 110: conductor, 112: conductor, 120: conductor, 130: power storage system, 131: control circuit, 135: storage battery, 135_$k$: storage battery, 135_$m$: storage battery, 135_S: storage battery, 135_1: storage battery, 135_2: storage battery, 135_3: storage battery, 135_4: storage battery, 137: protection circuit, 137_S: protection circuit, 137_2: protection circuit, 140: capacitor, 141: switch group, 142: switch group, 144: resistor, 145: resistor, 146: capacitor, 147: transistor, 148: transistor, 149: integrated circuit, 150: insulator, 156: conductor, 160: insulator, 166: conductor, 200: transistor, 201: transistor, 214: insulator, 216: insulator, 218: conductor, 220: insulator, 222: insulator, 224: insulator, 225: insulator, 230: oxide, 246: conductor, 248: conductor, 280: insulator, 282: insulator, 286: insulator, 300: transistor, 310: conductor, 310$a$: conductor, 310$b$: conductor, 311: substrate, 313: semiconductor region, 314$a$: low-resistance region, 314$b$: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 374: insulator, 376: conductor, 380: insulator, 382: insulator, 384: insulator, 386: conductor, 404: conductor, 404$a$: conductor, 404$b$: conductor, 405: conductor, 405$a$: conductor, 405$b$: conductor, 406: metal oxide, 406$a$: metal oxide, 406$b$: metal oxide, 406$c$: metal oxide, 412: insulator, 413: insulator, 418: insulator, 419: insulator, 420: insulator, 426$a$: region, 426$b$: region, 426$c$: region, 440: conductor, 440$a$: conductor, 440$b$: conductor, 450$a$: conductor, 450$b$: conductor, 451$a$: conductor, 451$b$: conductor, 452$a$: conductor, 452$b$: conductor, 500: secondary battery, 510: positive electrode lead electrode, 511: negative electrode lead electrode, 601: pseudo abnormality generating switch, 602: emulator, 603: controller IC, 604: OS-LSI inference chip, 605: display, 700: secondary battery, 701: positive electrode cap, 702: battery can, 703: positive electrode terminal, 704: positive electrode, 705: separator, 706: negative electrode, 707: negative electrode terminal, 708: insulating plate, 709: insulating plate, 710: gasket, 711: PTC element, 712: safety valve mechanism, 7100: portable display device, 7101: housing, 7102: display portion, 7103: operation button, 7104: storage battery, 7200: portable information terminal, 7201: housing, 7202: display portion, 7203: band, 7204: buckle, 7205: operation button, 7206: input-output terminal, 7207: icon, 7300: unmanned aircraft, 7301: storage battery system, 7302: rotor, 7303: camera, 7400: mobile phone, 7401: housing, 7402: display portion, 7403: operation button, 7404: external connection port, 7405: speaker, 7406: microphone, 7407: storage battery, 8000: display device, 8001: housing, 8002: display portion, 8003: speaker portion, 8004: control circuit, 8021: charging apparatus, 8022: cable, 8024: power storage system, 8100: lighting device, 8101: housing, 8102: light source, 8103: control circuit, 8104: ceiling, 8200: indoor unit, 8201: housing, 8202: air outlet, 8203: control circuit, 8204: outdoor unit, 8230: solar panel, 8231: wiring, 8240: charging apparatus, 8250: automobile, 8251: storage battery, 8300: power storage system, 8301: 8301, 8302: smartphone, 8400: automobile, 8401: headlight, 8406: electric motor, 8500: automobile, 8600: motor scooter, 8601: side mirror, 8602: power storage system, 8603: indicator, 8604: storage unit under seat, 8700: electric bicycle, 8701: storage battery, 8702: battery pack, 8703: display portion, 8710: electric motorcycle, 8711: storage battery, 8712: display portion, 8713: steering wheel, 9600: tablet terminal, 9625: switch, 9626: switch, 9627: power switch, 9628: operation switch, 9629: fastener, 9630: housing, 9630$a$: housing, 9630$b$: housing, 9631: display portion, 9633: solar cell, 9634: charge and discharge control circuit, 9635: power storage unit, 9636: DCDC converter, 9637: converter, 9640: movable portion This application is based on Japanese Patent Application Serial No. 2017-092024 filed with Japan Patent Office on May 3, 2017, Japanese Patent Application Serial No. 2017-124077 filed with Japan Patent Office on Jun. 26, 2017, and Japanese Patent Application Serial No. 2017-151306 filed with Japan Patent Office on Aug. 4, 2017, the entire contents of which are hereby incorporated by reference.

What is claimed is:

1. A power storage system comprising:
   a neural network; and
   a storage battery,
   wherein the neural network includes an input layer, an output layer, and one or more hidden layers between the input layer and the output layer,
   wherein the predetermined hidden layer is connected to the previous hidden layer or the previous input layer by a first weight coefficient,
   wherein the predetermined hidden layer is connected to the next hidden layer or the next output layer by a second weight coefficient,
   wherein a plurality of graphs generated by measurement data of the storage battery are converted into a plurality of images,
   wherein data of the plurality of images are input to the input layer, and
   wherein an operational condition of the storage battery is changed in accordance with a signal output from the output layer.

2. The power storage system according to claim 1, wherein a current or a voltage supplied to the storage battery is measured for the measurement data.

3. The power storage system according to claim 1, wherein a temperature of the storage battery is measured for the measurement data.

4. A vehicle comprising the power storage system according to claim 1.

5. An electronic device comprising the power storage system according to claim 1.

6. A power storage system comprising:
   a neural network; and
   a storage battery,
   wherein a plurality of graphs generated by measurement data of the storage battery are converted into a plurality of images,
   wherein data of the plurality of images are input to the neural network, and
   wherein the neural network is configured to change an operational condition of the storage battery in accordance with the data of the plurality of images.

7. A vehicle comprising the power storage system according to claim 6.

8. An electronic device comprising the power storage system according to claim 6.

9. The power storage system according to claim 6, wherein a current or a voltage supplied to the storage battery is measured for the measurement data.

10. The power storage system according to claim 6, wherein a temperature of the storage battery is measured for the measurement data.

* * * * *